US008950125B2

(12) United States Patent
Kensinger et al.

(10) Patent No.: US 8,950,125 B2
(45) Date of Patent: Feb. 10, 2015

(54) EXTENDABLE/RETRACTABLE SUPPORT COLUMN

(75) Inventors: David George Kensinger, Richfield, MN (US); Steven George Kensinger, Burnsville, MN (US); Eric T. Ohme, Brooklyn Park, MN (US); Dale A. Ohme, Dayton, MN (US)

(73) Assignee: Tower Solutions, LLC, Eden Prairie, MN (US)

(*) Notice: Subject to any disclaimer, the term of this patent is extended or adjusted under 35 U.S.C. 154(b) by 243 days.

(21) Appl. No.: 13/282,994

(22) Filed: Oct. 27, 2011

(65) Prior Publication Data

US 2012/0102850 A1 May 3, 2012

Related U.S. Application Data

(60) Provisional application No. 61/408,423, filed on Oct. 29, 2010, provisional application No. 61/412,249, filed on Nov. 10, 2010, provisional application No. 61/535,144, filed on Sep. 15, 2011.

(51) Int. Cl.

*E04H 12/18* (2006.01)
*E04H 12/34* (2006.01)
*F16M 11/38* (2006.01)

(52) U.S. Cl.

CPC ............. *F16M 11/38* (2013.01); *E04H 12/187* (2013.01); *E04H 12/185* (2013.01); *E04H 12/34* (2013.01)

USPC .................... 52/108; 52/114; 52/121; 52/632

(58) Field of Classification Search

CPC ..... E04H 12/185; E04H 12/182; E04H 12/34; E04H 12/18

USPC ........... 52/111, 123, 645, 108, 113, 114, 121, 52/632; 248/292.12, 603, 604

See application file for complete search history.

(56) References Cited

U.S. PATENT DOCUMENTS

| | | | | | |
|---|---|---|---|---|---|
| 2,130,993 | A | * | 9/1938 | Dubiller | 52/108 |
| 2,149,918 | A | * | 3/1939 | Komorous | 138/156 |
| 2,269,363 | A | * | 1/1942 | Farrand | 52/108 |
| 2,643,745 | A | * | 6/1953 | Olszewski | 52/108 |
| 2,661,082 | A | * | 12/1953 | Ziegler | 52/108 |
| 2,799,368 | A | * | 7/1957 | Alter | 52/108 |
| 2,905,282 | A | * | 9/1959 | Miller | 52/108 |
| 3,213,573 | A | * | 10/1965 | Bohr et al. | 52/108 |
| 3,242,576 | A | * | 3/1966 | Wheeler | 33/293 |
| 3,319,987 | A | * | 5/1967 | Bohr et al. | 294/210 |
| 3,385,397 | A | * | 5/1968 | Robinsky | 182/41 |
| 3,503,164 | A | * | 3/1970 | Medal et al. | 52/108 |
| 3,805,462 | A | * | 4/1974 | Caperton | 52/108 |
| 4,027,440 | A | * | 6/1977 | Hamblin | 52/108 |
| 4,089,147 | A | * | 5/1978 | Bain | 52/632 |
| 4,237,662 | A | * | 12/1980 | Kinzler | 52/108 |
| 4,386,485 | A | * | 6/1983 | Kramer | 52/108 |
| 4,651,480 | A | * | 3/1987 | Kramer | 52/108 |

(Continued)

*Primary Examiner* — James Ference

(74) *Attorney, Agent, or Firm* — Moore & Hansen, PLLC

(57) ABSTRACT

An extendable and retractable column which is formed from at least three linked sections or chains. The linked sections include a plurality of individual segments linked end to end. As the linked segments are extended, each of the individual segments of the linked chains engage individual segments of adjacent linked sections to form a column. As the linked sections are retracted, each of the individual segments of the linked sections disengage from the individual segment of the adjacent linked sections and the individual linked sections may be rolled up into a multi-sided form for compact storage.

20 Claims, 60 Drawing Sheets

(56) References Cited

U.S. PATENT DOCUMENTS

| | | | | | |
|---|---|---|---|---|---|
| 4,850,161 | A | * | 7/1989 | McGinnis | 52/108 |
| 4,866,893 | A | * | 9/1989 | McGinnis | 52/108 |
| 4,920,710 | A | * | 5/1990 | Paine | 52/108 |
| 5,056,278 | A | * | 10/1991 | Atsukawa | 52/108 |
| 5,102,375 | A | * | 4/1992 | Featherstone | 474/155 |
| 5,139,464 | A | * | 8/1992 | Lehnert | 474/155 |
| 5,168,679 | A | * | 12/1992 | Featherstone | 52/118 |
| 6,112,474 | A | * | 9/2000 | Paine | 52/108 |
| 6,571,914 | B2 | * | 6/2003 | Lee et al. | 182/69.4 |
| 7,270,619 | B2 | * | 9/2007 | Bourc'His | 474/202 |
| 7,310,915 | B2 | * | 12/2007 | Olsen | 52/111 |
| 7,357,365 | B2 | * | 4/2008 | Colman et al. | 248/439 |
| 7,448,414 | B2 | * | 11/2008 | Langeland | 138/157 |
| 7,621,078 | B2 | * | 11/2009 | Phelan et al. | 52/121 |
| 2006/0219144 | A1 | * | 10/2006 | Phelan et al. | 114/90 |
| 2008/0196323 | A1 | * | 8/2008 | Colman et al. | 52/108 |
| 2010/0038499 | A1 | | 2/2010 | Colman et al. | |
| 2011/0182066 | A1 | * | 7/2011 | Webb | 362/235 |
| 2011/0308174 | A1 | * | 12/2011 | Meyer | 52/111 |

* cited by examiner

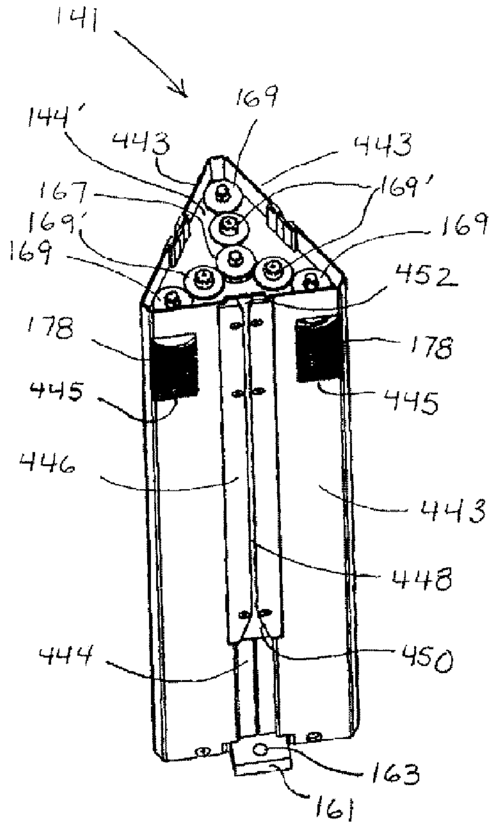
FIG. 28
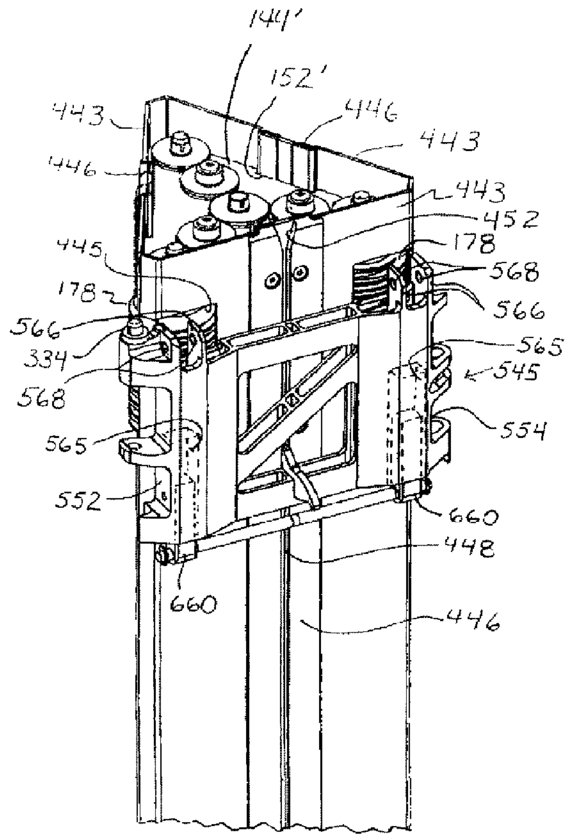
FIG 30
FIG 29
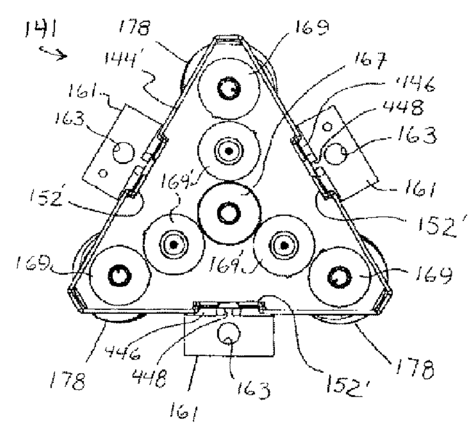

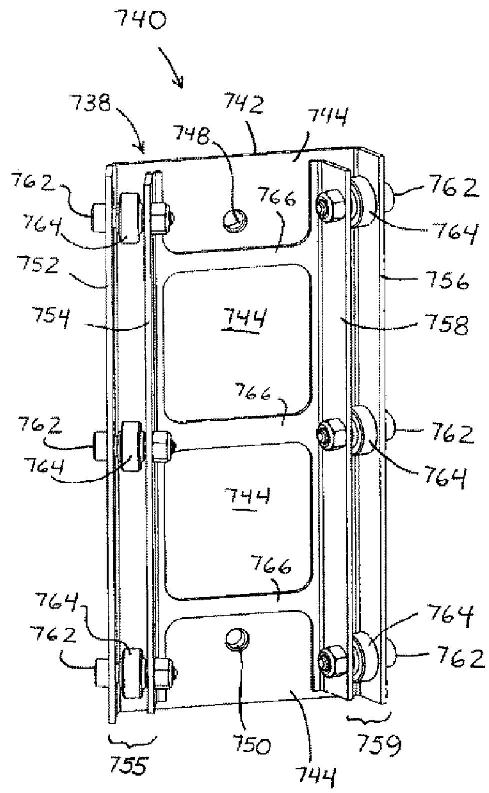
FIG 45
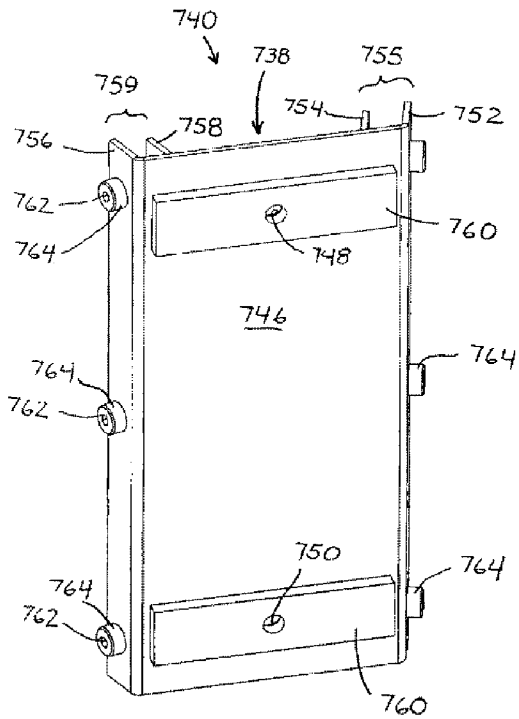
FIG 46
FIG 47
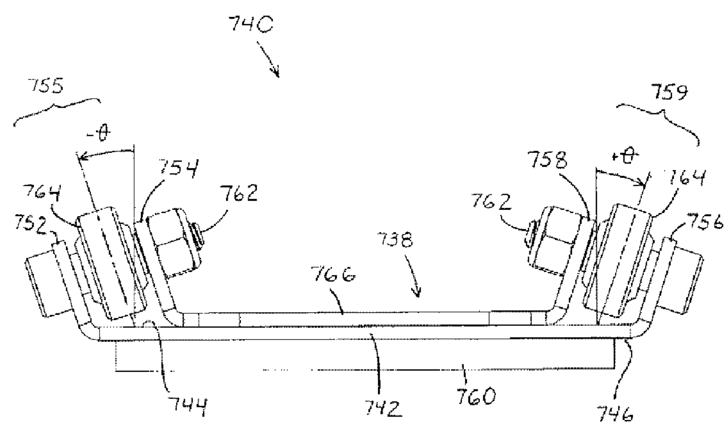

EXTENDABLE/RETRACTABLE SUPPORT COLUMN

RELATED APPLICATIONS

The present application claims benefit of U.S. Provisional Application Ser. No. 61/408,423, filed Oct. 29, 2010; claims benefit of U.S. Provisional Application Ser. No. 61/412,249, filed Nov. 10, 2010; and claims benefit of U.S. Provisional Application Ser. No. 61/535,144, filed Sep. 15, 2011; all of which are herein incorporated by reference.

FIELD OF THE INVENTION

The present invention relates generally to a support column and more specifically to an extendable/retractable column for use in lifting and supporting items in an elevated position, and to an extendable/retractable column that can be raised or lowered from a mobile structure.

BACKGROUND

Structures that comprise one or more elements that can be linked together to form a column or other structure are known in the art. Structures of this kind may be used to form an elevated platform for support of equipment or a person.

Extendable/retractable towers (or simply "retractable towers" as they may be referred to herein) of this kind may be utilized for surveillance, as mobile telecommunications towers, as supports for temporary lighting systems, or the like. In general, retractable columns or towers may be used for any application where it is desired to provide a support for a person or equipment at an elevated location relative to its surroundings.

Although existing retractable towers have been satisfactory for some applications, various shortcomings have limited their utility. For example, existing towers are often bulky, heavy and challenging to transport. This affects their ability to be delivered to remote locations where infra-structures such as bridges and roads do not exist or where infra-structures have been damaged or destroyed. Often, existing tower structures cannot be delivered until the infra-structures have first been repaired or replaced. Once a retractable tower is successfully delivered, it must still be erected. With existing retractable towers this can take upwards of 1-2 hours or longer because they often require that the erection site must be prepared and improved. Moreover, existing tower drive mechanisms are not capable of high speed operation. This presents a significant drawback where time is of the essence, such as in the wake of a natural disaster where critical services such as emergency communications need to be immediately reestablished or when monitoring a hostile, armed enemy under wartime conditions. Often, existing retractable towers will not be able to support a required payload or withstand significant wind loads unless first stabilized by a series of guy wires that prevent the tower from toppling and/or collapsing. Such additional requirements and their implementation can add significant setup time. Many existing retractable towers are often fabricated from parts that, when in motion, generate significant noise levels, which can be detrimental in situations where stealth is required. Once an existing retractable tower has been erected and operational, there is usually nothing to protect the internal mechanical and electrical components from the environment, animals, etc. over what may be an extended time period. This is a drawback where a retractable tower must operate autonomously and is deployed for an extended period of time in a remote location. With existing retractable towers, it often takes as much time to retract the tower as it does to erect it. This makes deployment and redeployment a long, time consuming process. This also presents a significant drawback because a tower may need to be refitted with different sensors, antennas, lighting, etc. or where the tower is in imminent danger of capture or destruction from a hostile enemy. Accordingly, there is a need in the art for an extendable and retractable tower or column structure that addresses these drawbacks.

SUMMARY

The present invention relates to a tower assembly having an extendable/retractable column including at least three linked or chained sections, with each linked section including a plurality of individual segments or links that are pivotally connected to one another in end-to-end relationship, and with each linked segment laterally positionable adjacent to at least two other segments of linked sections. Each individual segment may include an outwardly facing surface, an inwardly facing surface, a first end, a second end, and side walls that include connection or engagement members that engage and couple with connection or engagement members of laterally and vertically adjacent segments as the column is formed. The connection or engagement members may extend outwardly from and be oriented parallel to the side walls of each individual segment. The connection members include complementarily shaped surfaces that, when engaged and coupled with complementarily shaped surfaces of adjacent segments allow laterally adjacent and engaged segments to form a unitary columnar structure.

The present invention further relates to an extendable/retractable column including a plurality of linked or chained sections and a plurality of drive slots or ribs in at least one of said linked segments. The tower assembly also includes a guide assembly with a drive member that is able to engage the slots of a segment and move the segment to extend or retract it relative to the guide assembly. In one embodiment the drive member is rotatable about an axis generally parallel to the column. The drive member may take the form of a worm drive or a power screw configured to engage the drive slots and/or ribs of the segments. Rotation of the worm drive or power screw engages the drive slots of at least one of the linked segments and as the segment is moved, the plurality of linked sections engage each other to form the column as the linked sections are extended. The linked sections disengage from each other as the linked sections are retracted. In some embodiments, pinion gears that may be generally transverse to the column may be used instead of worm drive or power screw.

The present invention also relates to an extendable/retractable column including a plurality of linked sections each comprised of a plurality of individual segments that are pivotally connected to one another in end-to-end relationship. Each individual segment or link includes first and second ends and a pair of opposing sides. The ends of each individual segment are configured to be connected to one or more pivot support blocks that, when combined with pivot support blocks of an adjacent segment and a pivot shaft, form a hinge structure that connects adjacent segments together in an end-to-end relation.

The present invention relates still further to an extendable/retractable column including a plurality of linked sections each comprised of a plurality of individual segments pivotally connected to one another in end-to-end relationship that can be arranged into a multi-sided or faceted bale form by winding and unwinding the linked sections about a bale frame.

The present invention relates still further to a retaining member that is able to maintain a multi-sided bale form in a wound state by connecting an outer segment to a radially adjacent inner, hinged connection as the outer segment is brought to bear against the adjacent, inner, hinged connection.

The present invention relates still further to a plurality of bale support structures that are configured and arranged to feed bales of wound chain sections into a guide assembly from the side and/or to receive chain sections that exit the guide assembly and wind the chain sections about frames to form multi-sided bales.

The present invention relates still further to a cowl that may be used to protect a bale from the environment and/or which allows the tower assembly to blend in with its surroundings.

The present invention relates still further to the dynamic connection that is formed between the sections and drive unit as the sections move relative thereto.

An advantage of the present invention is that the tower assembly can be rapidly deployed and set up as part of a coordinated response to a natural disaster or force majeure, where it may be used to reestablish communications, control air traffic, provide emergency lighting, etc.

A related advantage of the present invention is that the tower assembly may be deployed as a weather station or a wildlife observation post.

An advantage of the present invention is that it can deployed to a location where it can blend in with its surrounding terrain, where it can be rapidly set up and/or struck with a minimum amount of noise and where it may be used in an unobtrusive manner to surveil the surrounding terrain.

An advantage of the present invention is that it can be associated with or assigned to a team as part of its hardware, and when the team moves from one location to another location, the tower assembly moves with the team.

These and other features, advantages and objects of the present invention will be more fully described below with reference to the accompanying drawings.

BRIEF DESCRIPTION OF THE DRAWINGS

The accompanying drawings, which are incorporated in and constitute a part of the description, illustrate aspects of the invention and together with the detailed description, serve to explain the principles of the invention. A brief description of the drawings is as follows:

FIG. 28 is a partial, perspective view of an embodiment of a drive module of a tower assembly;

FIG. 29 is a top plan view of the drive module of FIG. 28;

FIG. 30 is a partial perspective view of the drive module of FIG. 28, with an embodiment of a segment being engaged by drive members and with a projection of the segment engaging a channel in a side panel of the drive module;

FIG. 45 is an inwardly facing perspective view of a guide module that may be used with the tower assembly of FIG. 41;

FIG. 46 is an outwardly facing perspective view of the guide module of FIG. 45;

FIG. 47 an end elevational view of the guide module of FIG. 45;

DETAILED DESCRIPTION

Figure 1A:
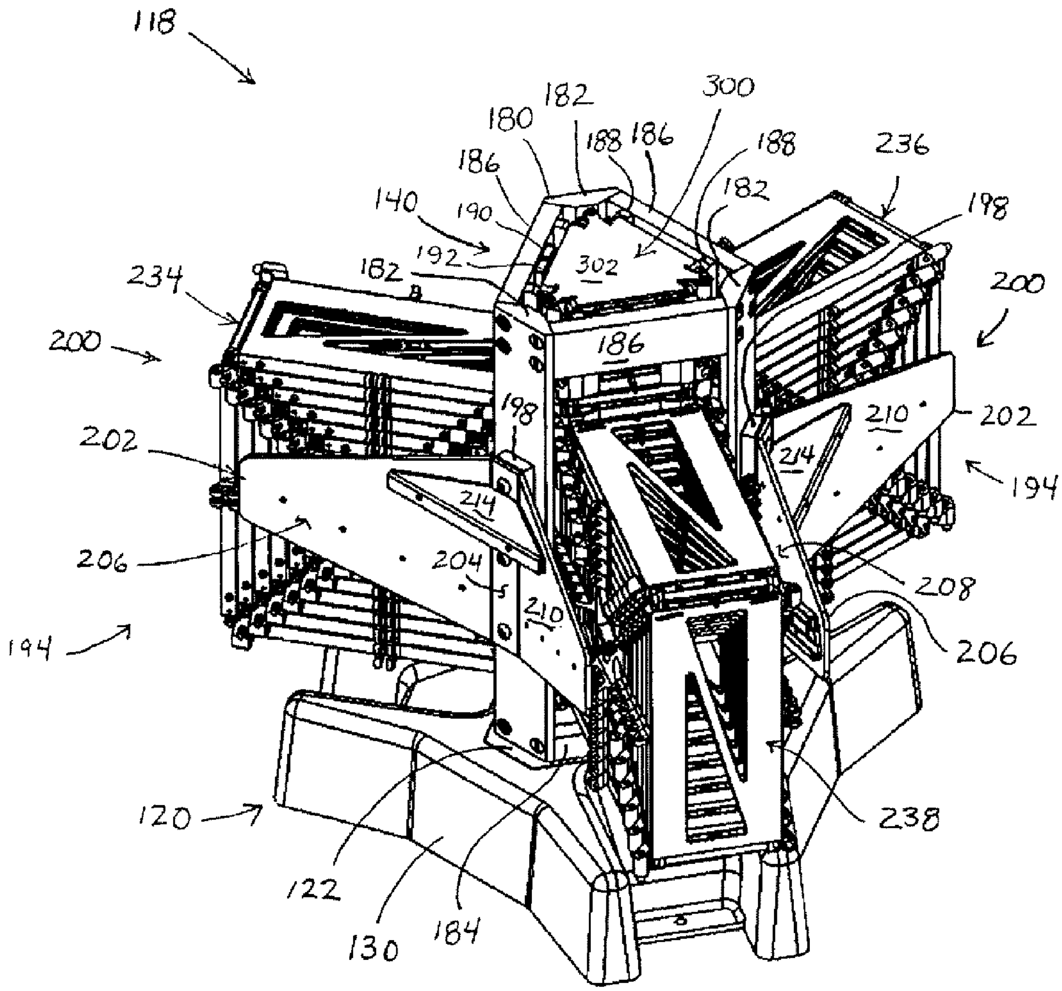
FIG. 1*a* is an isometric view of an illustrative embodiment of a tower assembly in a fully retracted position.
Figure 1B:
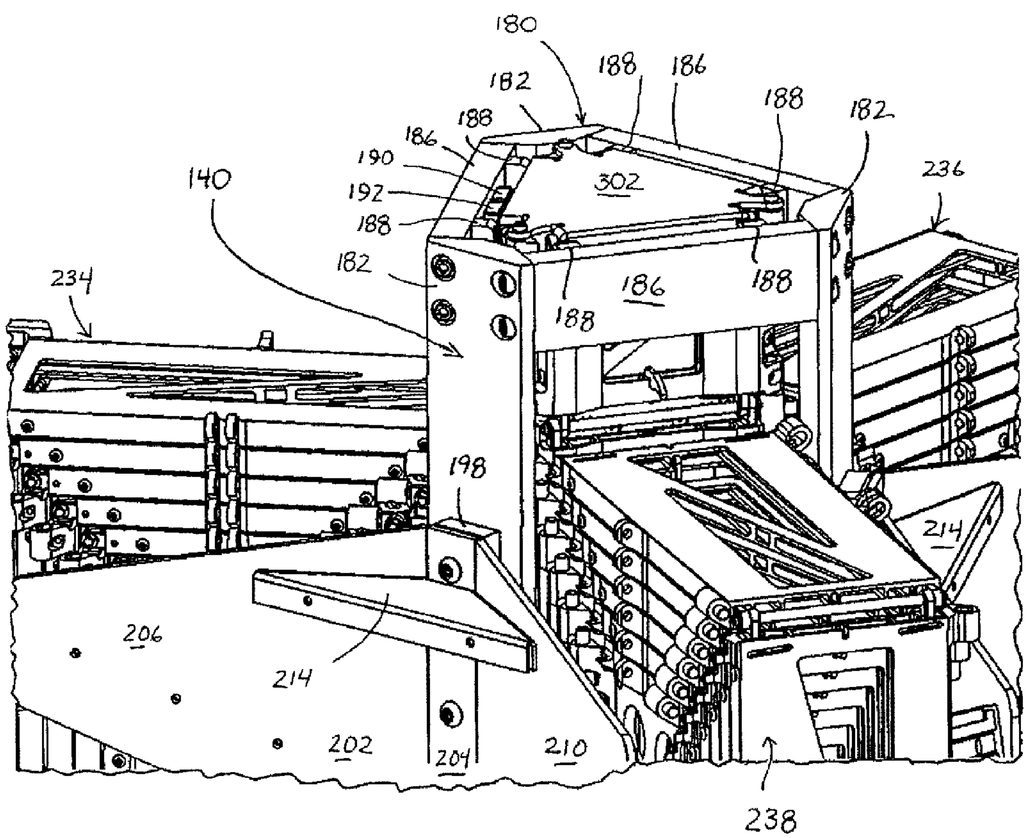
FIG. 1*b* is a partial, enlarged view of the upper end of the tower assembly of FIG. 1*a;*

Reference will now be made in detail to exemplary embodiments of the tower assembly of the present invention which are illustrated in the accompanying drawings. The same reference numbers will be used throughout the drawings to refer to the same or like parts.

The tower assembly relates to an extendable/retractable support column or tower that can be easily transported to a location, deployed, withdrawn and transported to another location. The support column of the tower assembly is of the type which includes three or more (but preferably three) linked sections each of which may be stored in a compact, transportable form on a rotatable take-up or delivery mechanism adjacent a support base of the tower assembly. In this type of extendable/retractable column, each of the linked sections is simultaneously fed into a guide assembly where they are brought into engagement with, and are connected to, an adjacent linked section to form a column. These interconnected linked sections are then driven vertically upwardly (or extended outwardly from one end of the guide assembly) to extend the column or driven vertically downwardly (or withdrawn into the guide assembly) to retract and disassemble the column. When the column is erected, the three interconnected linked sections form a column having a triangular cross-sectional configuration.

In the present tower assembly, each of the linked sections comprises a plurality of individual segments or links that are pivotally connected with one another, in end-to-end relationship. Throughout the application, various directional and positional references will be used such as upper, lower, inner, outer, etc. When used, these will generally refer to orientation of the individual segments or the linked sections in their position within an erected column. For example, the "upper" direction will be the direction toward the upper end of an extended column, while the "lower" direction will be the direction toward the lower end of an extended column. Similarly, the "inner" direction will be the direction which faces inwardly towards the column or its interior, while the direction "outwardly" will be the direction which faces outwardly from the column.

With the above general description of the present tower assembly, detailed and illustrative examples of embodiments are described with reference to the drawings. With reference to FIGS. 1*a* through 6, an embodiment 118 of a tower assembly may include a base or pedestal 120, a guide assembly 140 having an outer frame 180, a drive module 141 (see FIGS. 8 and 9*a*), and a retractable column or tower 300, with sides of the column formed by linked sections 314, 316, 318 (see, for example, FIGS. 2*b*, and 19-22). Some embodiments of the tower assembly 118 have a retracted height H1 (see FIG. 3*a*) of approximately one foot (0.3 meter), and can be extended to a height H2 of approximately 60 feet (18 meters). The tower may be provided with a cap or cover 302, with the cap serving as a platform on which equipment may be placed and/or attached. The cap 302 (FIG. 2*b*) may be provided with pairs of downwardly depending ears 304 having transverse apertures 306, with the apertures 306 configured and arranged to receive a pivot shaft 350 so that the cap 302 may be connected to pivot support blocks 320 that extend upwardly from the top most segments 245*a* of the linked sections. The cap 302 may also be secured to the tower sections by one or more fastening elements 308 that are received in apertures 332 of upper engagement members 330 of the segments 245*a* (see, for example, FIG. 11*a*, where a connecting peg 334 is inserted into an aperture 332, and FIG. 11*b*, where a connecting peg 334 has been removed from an upper engagement member 330).

Starting from the bottom of the tower assembly, the base 120 may include a plate 122 (FIG. 9*a*) with a horizontal surface that supports the guide assembly 140 and the tower 300. The plate 122 may include a first set of apertures 124 and a second set of apertures 126 that may be internally threaded so that they are able to receive fastening elements such as threaded bolts, which can extend through apertures in the guide assembly 140 and secured thereto with nuts. The fastening elements ensure that the components of the guide assembly may be securely and precisely connected to the base 120. In some embodiments, the apertures 124, 126 may have smooth bores and the guide assembly includes downwardly extending threaded fastening elements that extend through the apertures 124, 126 of the plate 122 and which are secured beneath the bottom of the base 120 by nuts. In some embodiments, the plate 122 may be received within a recess located in the top of the base 120. The plate 122 may also include an aperture 128 (see FIG. 9*a*) that may rotatably receive a vertically oriented drive shaft 176 (see FIGS. 7 and 10*a*) that extends therethrough, and which can be connected to a lower or secondary gearbox 171 located beneath the plate 122 (see FIGS. 5-7).

Figure 5:
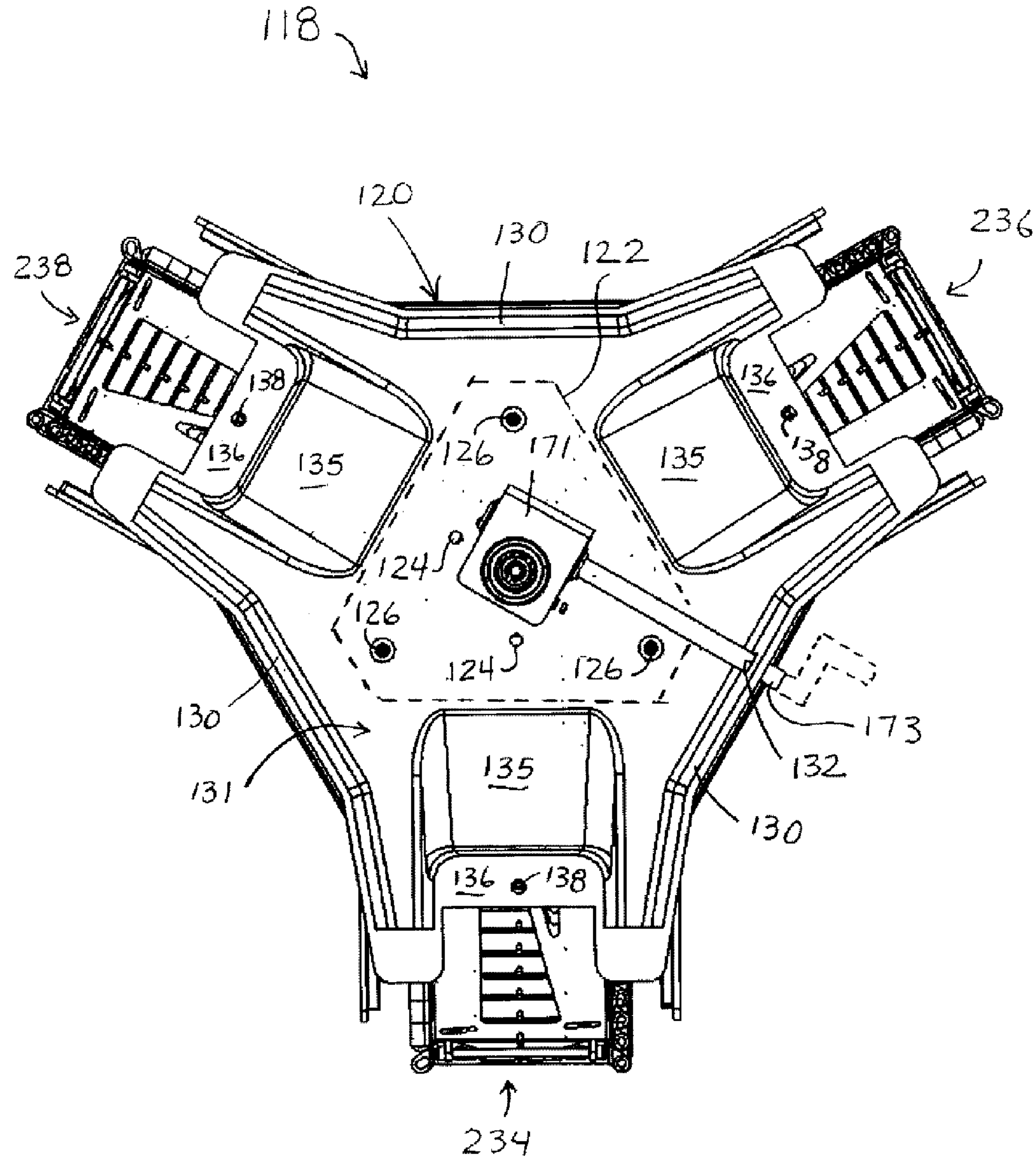
FIG. 5 is a bottom plan view of a base used with the embodiment of FIG. 1*a:*
Figure 6:
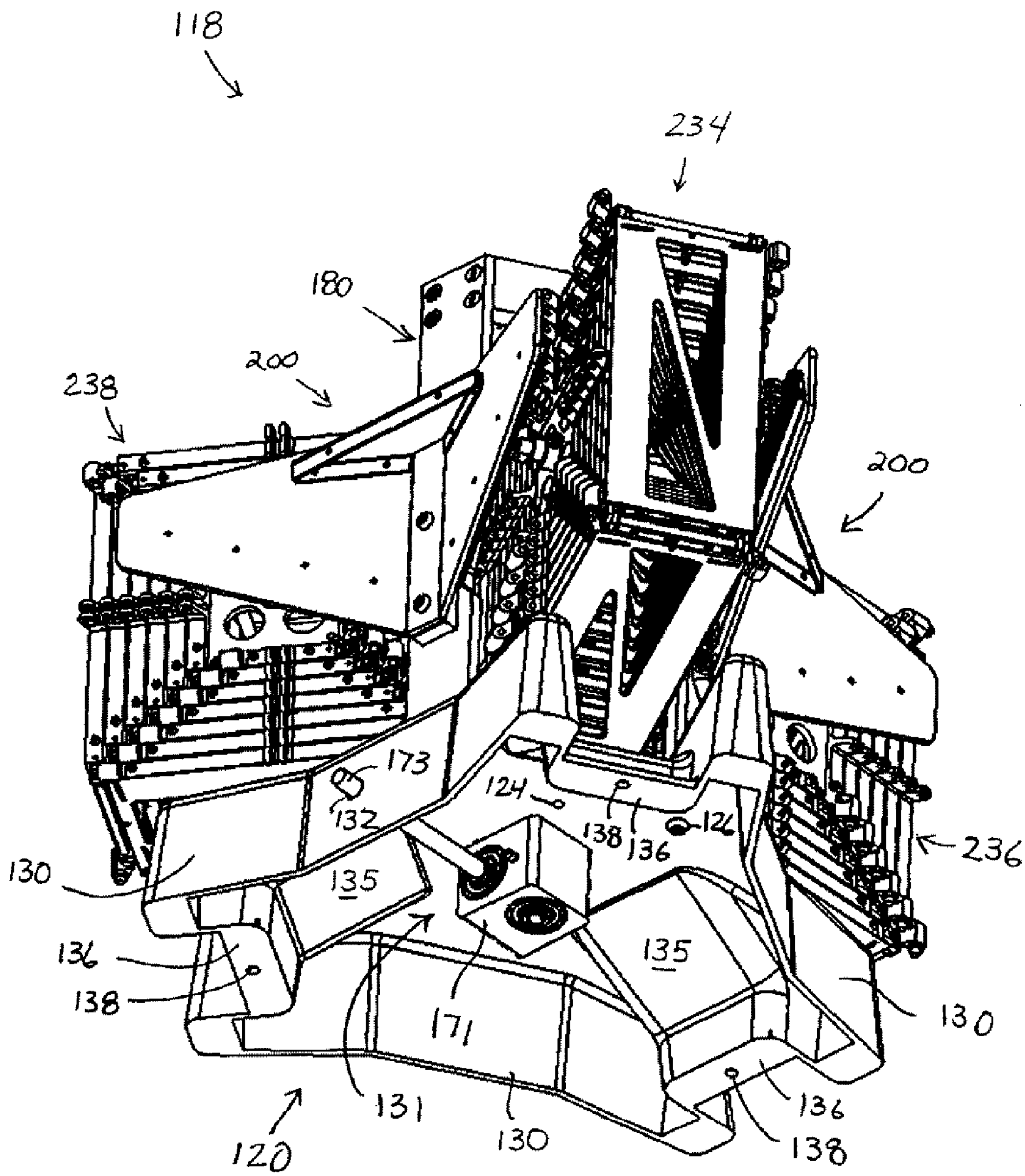
FIG. 6 is an isometric view of the bottom of the tower embodiment of FIG. 1*a*, with the view taken from below and to the side of the tower.
Figure 7:
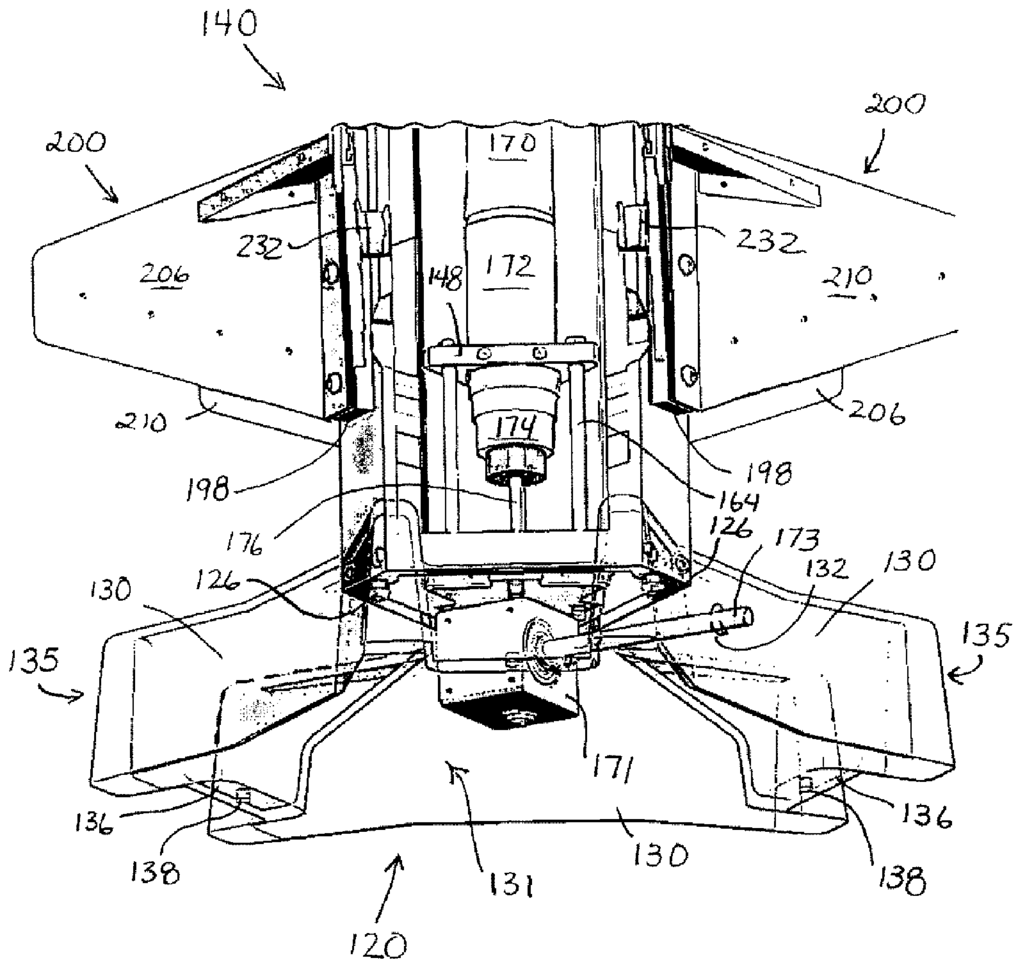
FIG. 7 is a partial cross-sectional view of the base and the guide assembly of the tower embodiment of FIG. 1*a*, with the view taken from below and to the side of the tower.

In order to accommodate embodiments that are able to house a lower or secondary gearbox 171, the plate 122 may be held in an elevated position by a skirt 130 that may form an enclosure 131 beneath the plate 122 (see FIGS. 5-7). In embodiments where the skirt 130 forms an enclosure 131, the skirt may be provided with a portal 132 (FIGS. 5-7) through which the lower or secondary gearbox 171 may be accessed and manipulated via a crankshaft 173 (FIGS. 6, 7), which in turn may be provided with a hand crank as shown in dashed lines in FIG. 5. In embodiments that include a skirt 130 or portions of skirts, the height which the plate 122 may be elevated above its support surface (ie. the surface upon the base 120 is positioned) can have a range of approximately 1.0 inches (2.5 cm) to approximately 18.0 inches (45.0 cm). In embodiments with such a portal 132, the base 120 may also include a movable cover 134 (FIGS. 8 and 9*a*) for the portal. The cover 134 may be electronically and/or mechanically interlocked with the tower assembly 118 so that when the cover is moved and the portal 132 is accessed, the cover 134 disables and/or overrides automatic operation of the tower assembly and prevents the tower from being accidentally or inadvertently extended or retracted. For example, when the motor of the tower assembly is in a disabled state, a user will be able to insert an end of a crank shaft 173 into the portal 132 so that it is able to engage the secondary gearbox 171 (see FIGS. 5-7). Engagement between the crankshaft and the gearbox may be implemented, for example, by providing the secondary gearbox with a drive socket that is configured and arranged to receive the end of the crank shaft.

In some embodiments, base or pedestal 120 may be provided with one or more radially extending feet 135 (FIGS. 5-8), with each foot 135 having a flange 136 with an aperture 138 that enables the base or pedestal 120 to be attached to another structure such as a vehicle, a building, or another tower assembly using conventional fastening elements such as threaded fasteners (not shown). In embodiments that include one or more feet 135, the height which the plate may be elevated above its surrounding surface can have a range of approximately 1.0 inches (2.5 cm) to approximately 18.0 inches (45.0 cm). In some embodiments, the base or pedestal 120 is formed from aluminum and may be constructed from individual parts that are connected together, cast as a single unit, or constructed as a combination of casting and secondary assembly. In other embodiments, the base or pedestal 120 may be formed from plastic material such as fiber reinforced resin (i.e.: fiberglass or carbon graphite matrix), structural foam, high density polyethylene (HDPE), acrylics or polyvinyl chloride (PVC). With bases or pedestals that are formed from metal such as aluminum, an upper surface may be machined so as to present a planar surface to which guide assembly 140 and other components may be attached. With bases or pedestals that are formed from plastic material, some embodiments may be provided with one or more metallic templates 122 that can be attached to an upper surface of the base 120, and which include the first and second sets of apertures 124, 126 (see FIGS. 5 and 9*a*) that can be used to precisely align and attach components of the guide assembly to the base 120. The size and weight of the pedestal or base can vary, and the size of a footprint of the above described embodiments of the base 120 can range from approximately 12 inches×12 inches to 6 feet×6 feet, or even larger. The weight of the above described embodiments of the base 120 can range from approximately 2.0 lbs (0.91 kg) to approximately 300 lbs (136.0 kg).

Figure 8:
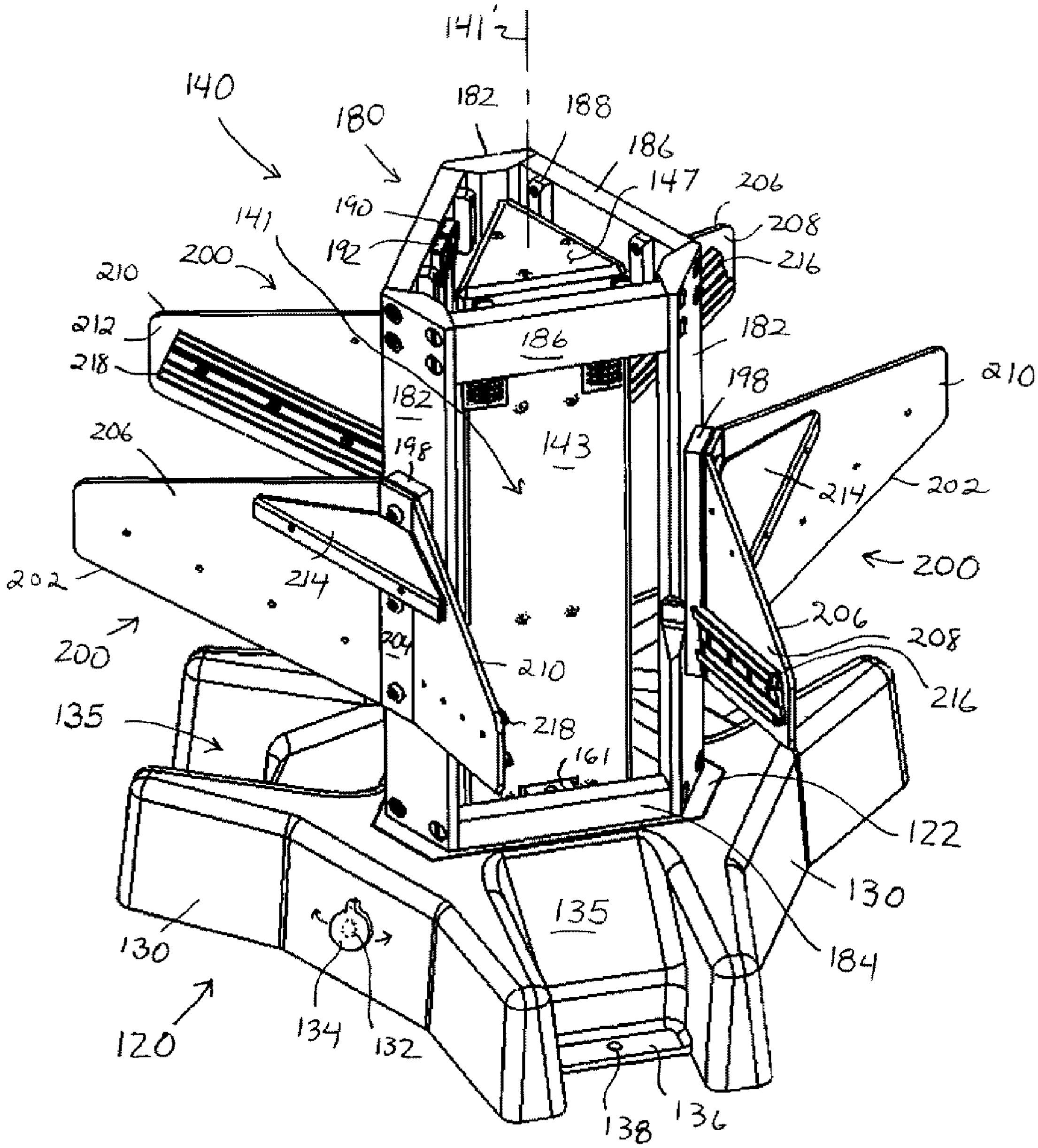
FIG. 8 is a partial, isometric view of the tower of FIG. 1 taken from above and to the side of the tower, and with the view showing a base, an outer guide frame, bale support brackets and a drive module.
Figure 9A:
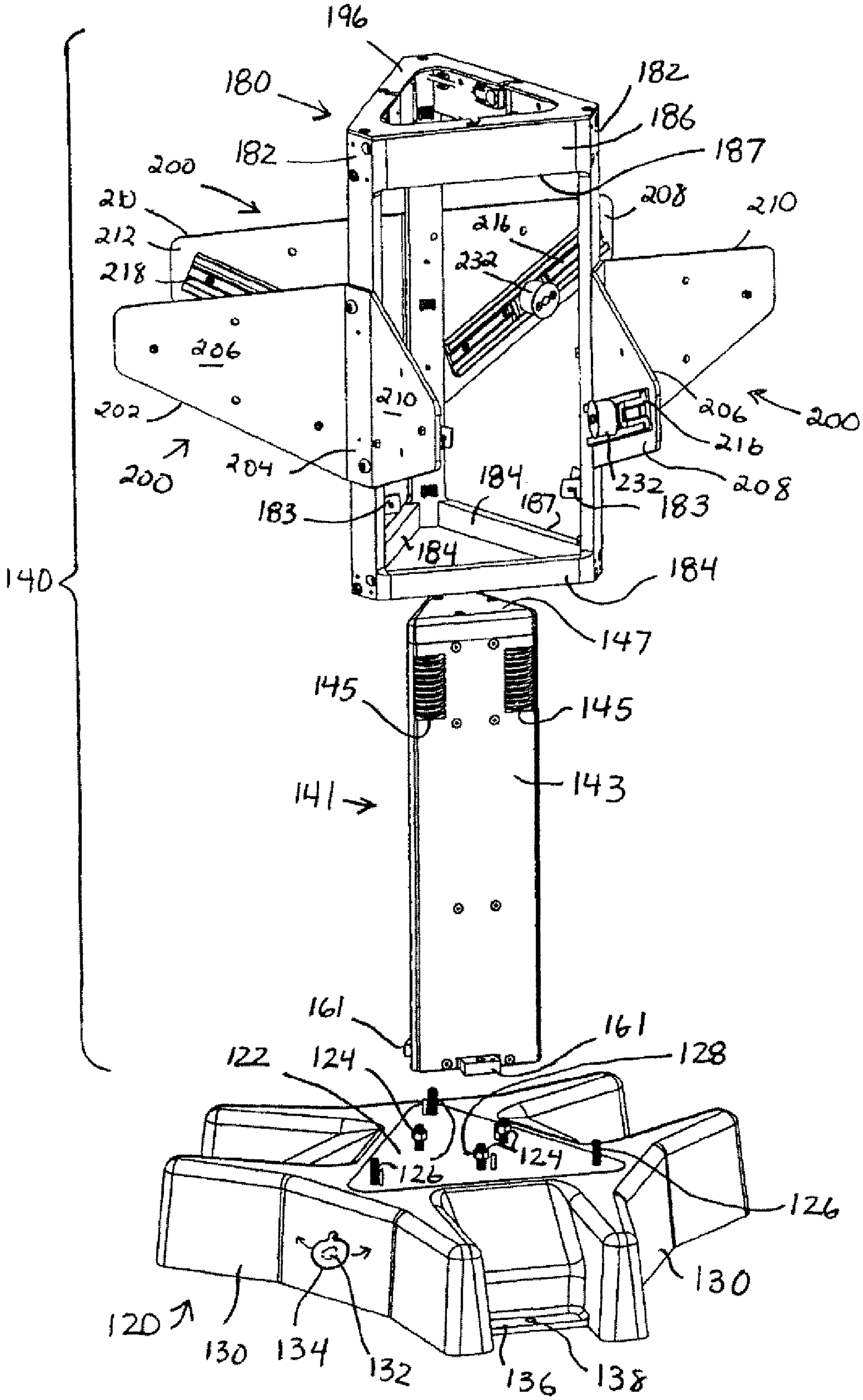
FIG. 9*a* is an exploded view of the tower assembly of FIG. 8.
Figure 9B:
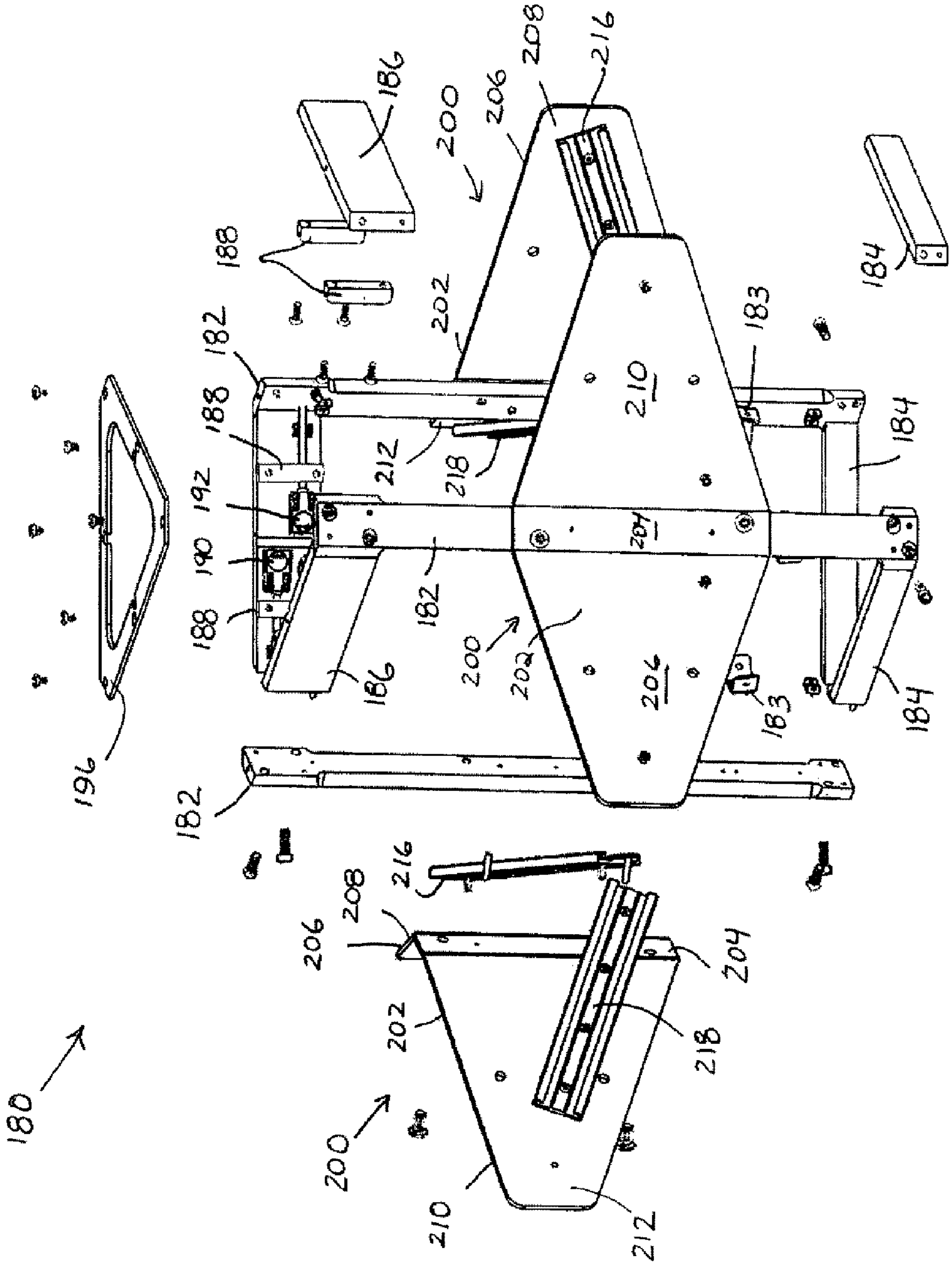
FIG. 9*b* is a partially exploded view of the outer frame and the bale support brackets of FIG. 9*a;*

The tower assembly includes a plurality of take-up (storage) and delivery (feed) arrangements 194 (FIG. 1*a*), one component of which comprises bale support frames or brackets 200. Each of these support frames or brackets 200 includes a body 202 having a center section 204 and a pair of outwardly divergent wings 206, 210, with the wings defining an angle of approximately 120 degrees therebetween (FIGS. 8, 9*a* and 9*b*). In illustrative embodiments, there are three bale support brackets or frames 200, each of which is attached to a support post 182 of the outer frame 180. The connection between the bale support brackets 200 and the support posts 182 of the outer frame 180 produces a rigid structure that maintains alignment of the bales as they are unwound and wound. In addition, the support bracket and outer frame connection also allow the chain sections (described further hereafter) to better resist torsional forces. The bale support brackets 200 are spaced circumferentially about the guide assembly 140 of the tower assembly so that wing 206 of a first bracket is substantially parallel to wing 210 of a second bracket, wing 206 of the second bracket is substantially parallel with wing 210 of a third bracket, and wing 206 of the third bracket is substantially parallel with wing 210 of the first bracket (see FIGS. 4*a*, 8, 9*a* and 9*b*). As shown best in FIGS. 1*a*-3*b*, 4*a*, 4*b* and 6, each of the bale support frames or brackets 200 partially supports a bale 234, 236, 238 that is formed from a chain section 314, 316, 318 of linked segments 245. Each of these chain sections is wound or wrapped around another component of the storage and feed arrangement 194, namely, a rotatable bale frame 220 that is supported by a center shaft 228 that extends transversely between parallel wings 206, 210 of adjacent support brackets 200 (see FIGS. 3*b*, 15*a*, 15*b* 16, 27*b* and 27*c*). In some embodiments, the bale frame 220 may include a multi-sided or faceted core structure about which the segments are wound. Referring now to FIGS. 3*c*-3*d* the ends of the center shaft 228 are connected to additional components of the storage and feed arrangement 194, namely, followers or shoes 230 with outwardly extending feet 231. The feet 231 are configured to be slidingly retained in opposing channels 217 of each guide rail 216, 218. The guide rails 216, 218 are parallel to each other and are attached to wings 206, 210 of each set of adjacent bale support brackets 200 (see FIGS. 8, 9*a*, 9*b*, 27*b*). As will be discussed later in greater detail, each guide rail 216, 218 has an outer end that is located in close proximity to the tip of a respective wing and each guide rail has an inner end that is located in close proximity to the center section 204, which is connected to a support post 182. Connecting the center section 204 of the bracket to the support post 182 positions the guide rails 216, 218 so that they are perpendicular to a portal 187 defined by two support posts 182, a lower brace 184 and an upper brace 186 (see FIGS. 8, 9*a* and 9*b*). There are three such portals with this embodiment. In practice, the center shaft 228 of each bale frame 220 is supported by rail 216 of a first support bracket and the rail 218 of a second support bracket (see FIGS. 3*a*, 4*a* and 4*b*).

Figure 15A:
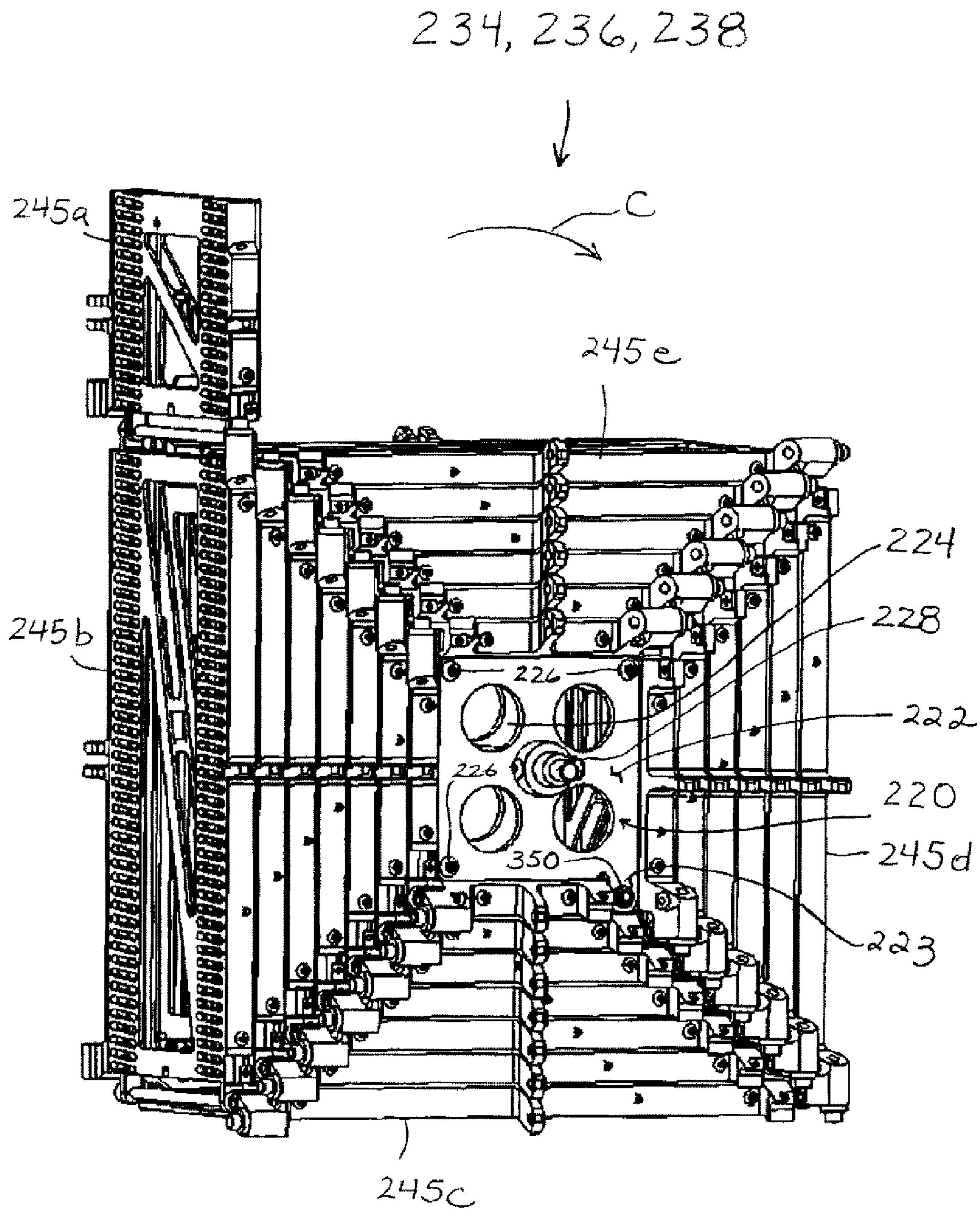
FIG. 15*a* is an isometric view showing an embodiment of a chained section of segments that have been connected to each other in an end-to-end fashion and which have been wound about itself into a bale form.
Figure 15B:
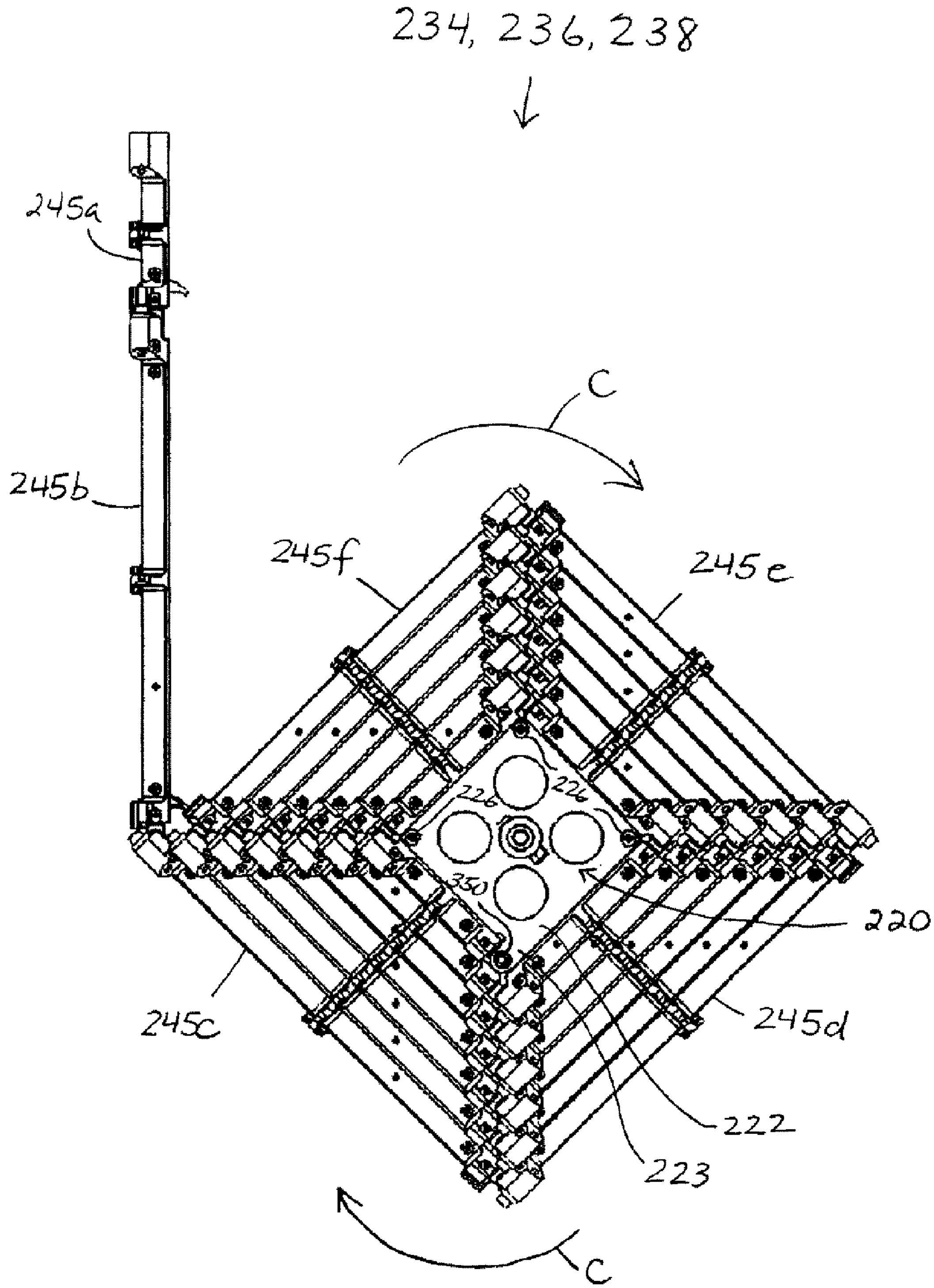
FIG. 15*b* is a side elevational view of the chained section of segments of FIG. 15*a*, wherein the bale has been rotated and the section has been extended further than shown in FIG. 15*a;*
Figure 16:
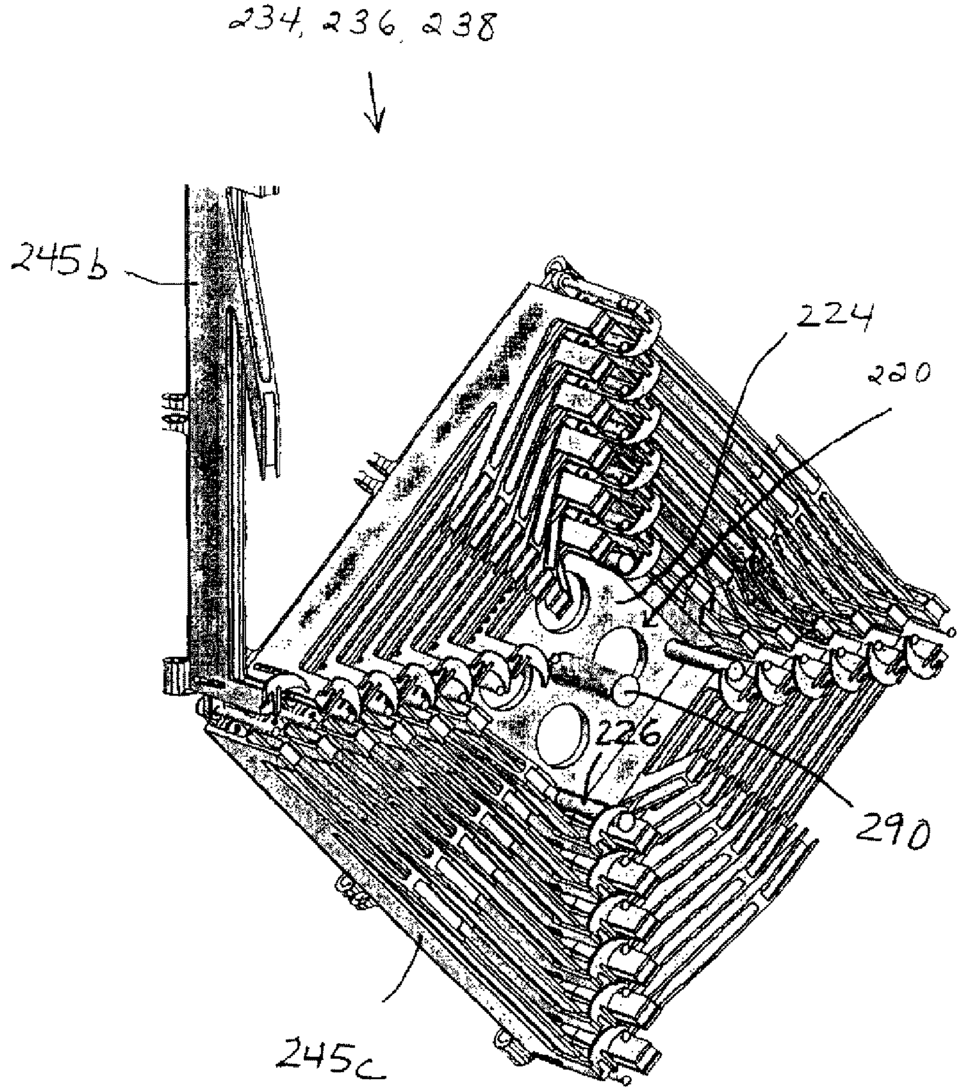
FIG. 16 is an, enlarged cross-sectional, isometric view of the bale structure of FIG. 15*b;*
Figure 17A:
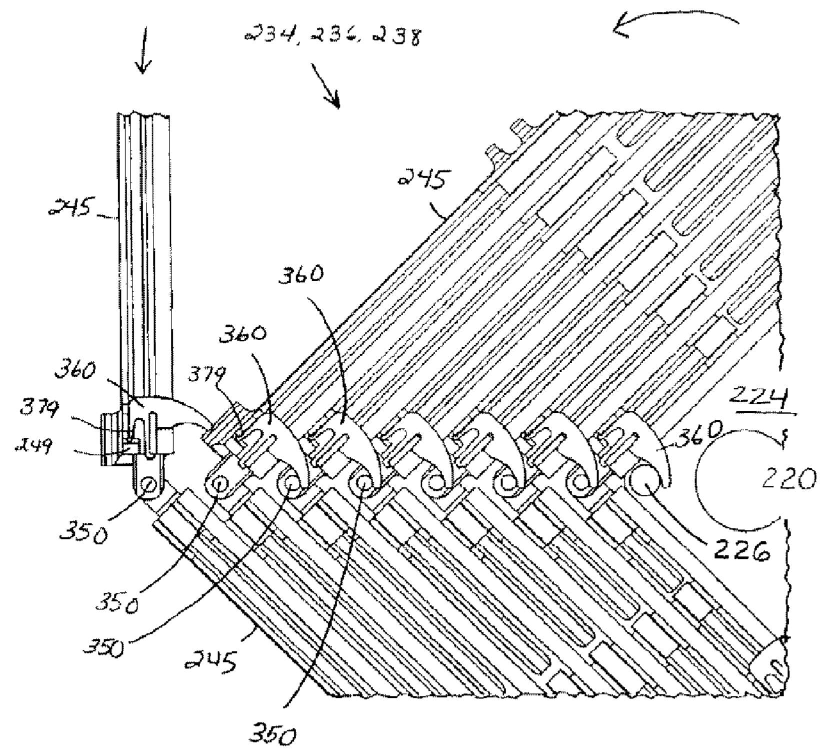
FIG. 17*a* is an enlarged, sectional, fragmentary side elevational view of an embodiment of a bale structure and an embodiment of a bale latch used to prevent the bale structure from unraveling.
Figure 17B:
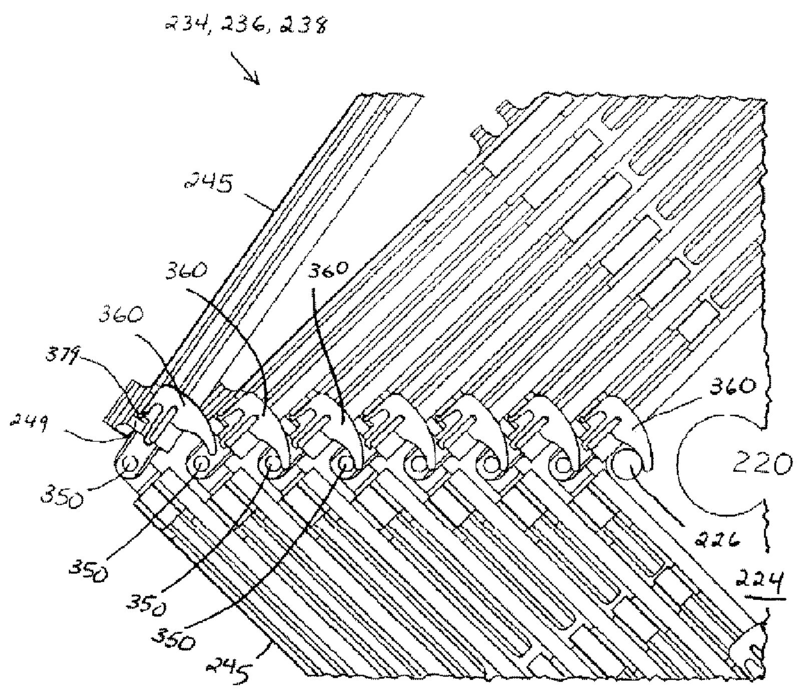
FIG. 17*b* is another enlarged, sectional, fragmentary side elevational view of the bale structure and bale latch of FIG. 17*a*, showing the bale latch of an outer segment rotating towards a pivot shaft of an adjacent segment connection.
Figure 17C:
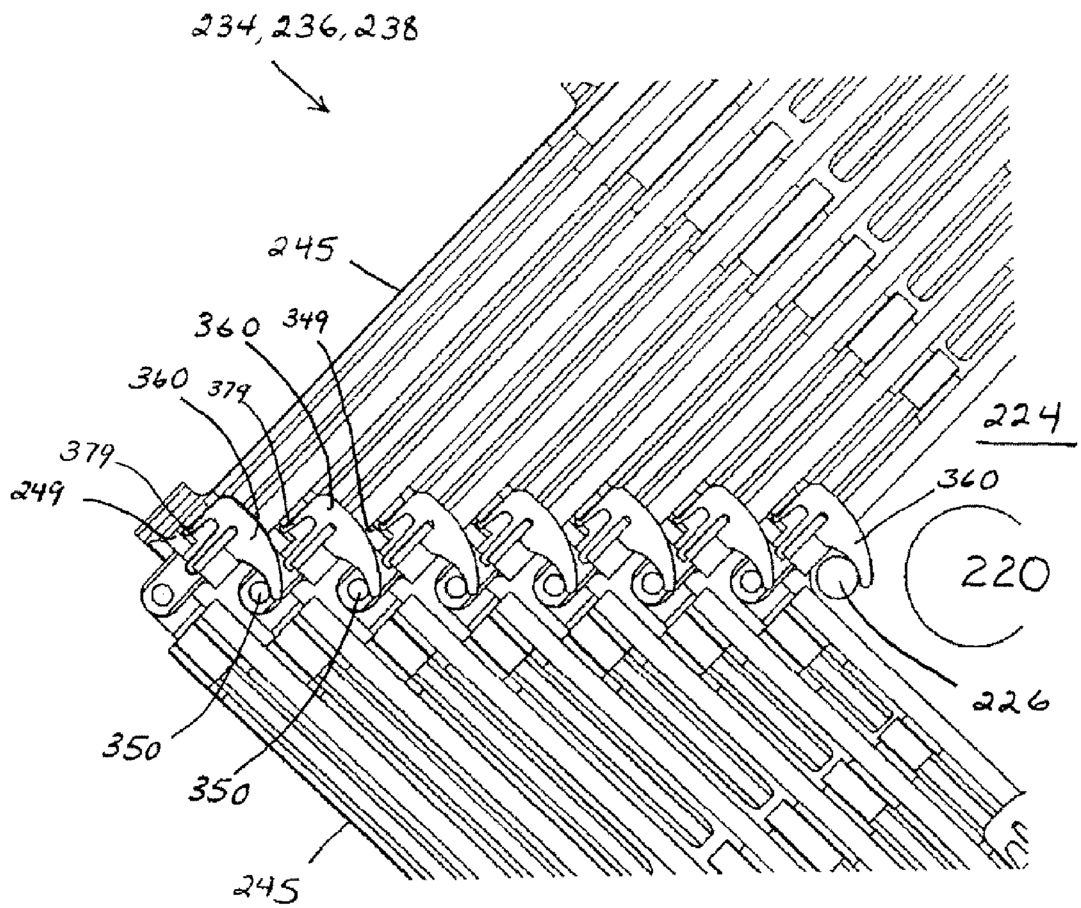
FIG. 17*c* is another enlarged, sectional, fragmentary side elevational view of the bale structure and bale latch of FIG. 17*b*, with the bale latch of an outer segment engaging the pivot shaft of an adjacent segment connection.
Figure 17D:
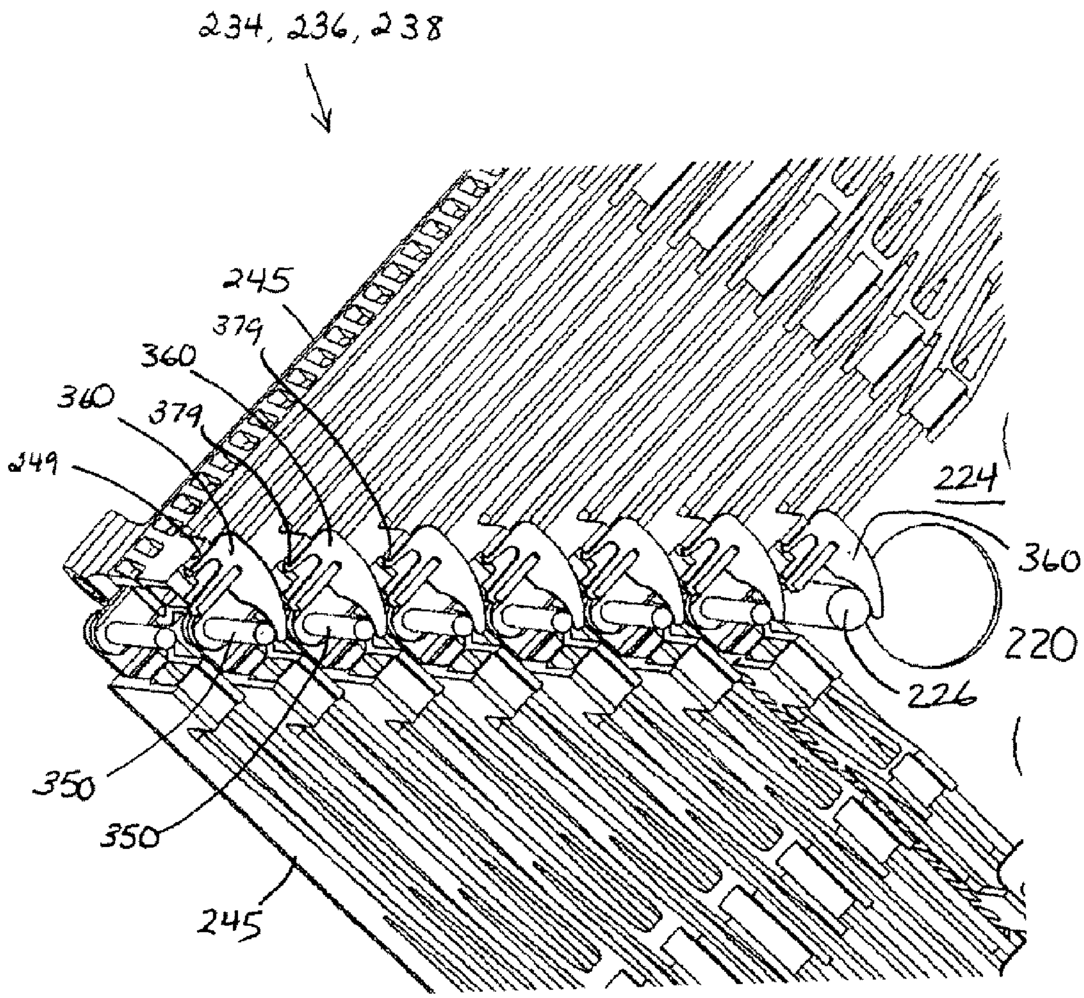
FIG. 17*d* is a partial, cross-sectional, perspective view of the bale of FIG. 17*c;*

To form and extend a column, individual segments from the linked or chain sections are simultaneously unwound from their respective bales and drawn into the guide assembly 140 from the sides, through the three portals 187 and fed into spaces defined by the drive module 141 and the outer frame 180 of the guide assembly 140. As this occurs, the center shafts 228 that support the bale frames 220 slide back and fourth along the guide rails 216, 218 in a reciprocating movement because of the angular wrapping of the segments, which in some embodiments may have different, incremental lengths between the top and bottom ends of a chain section, around the bale frames 220. This reciprocating movement is imparted to the bales because the segments are rigid and substantially planar. When a bale is wound or unwound, the bale, which is urged towards the guide assembly 140 by its own weight and, optionally, by one or more biasing elements 232 (described hereafter), tends to ride up against one of the portals 187. For example, when a bale rotates in a clockwise direction "C" (as shown in FIGS. 15*a* and 15*b*), an angled hinge connection formed by the first and second segments will ride up against a portal 187. Upon further rotation, the flat body of the second segment will ride up against the portal. Upon further rotation, an angled hinge connection formed by the second segment and a third segment will ride up against the portal, and so on. With such a rotation, the angled hinge connections will have greater distances to the center shaft 228 than distances from the flats of the segments. Thus, as the bale rotates, the bale will oscillate and slide back and forth towards and away from the guide assembly 140. As segments are removed from the bale as it is being unwound, movement of the bale as it slides will be changed by incremental steps and the total movement is ratchet-like. This same general movement occurs when the bale is being formed by segments. As a segment exit the portal an outer most end, which may includes a bale latch 360, will engage a pivot rod 350 of an adjacent hinge connection (see FIGS. 17*a*-17*d*). This allows the segment to push and rotate the entire bale counter clockwise and outwardly from the portal until the center of gravity of the bale moves past the bale latch 360/pivot rod 350 connection, at which point the bale tends to roll towards the portal of its own accord. If needed or desired, additional biasing forces can be applied to the center shaft 228 through the utilization of various types of spring members including coil springs, torsion springs, elastic cords, and the like, to urge the center shaft 228 and thus the entire bale of linked segments toward the portals 187 of the guide assembly 140. One reason for providing additional biasing is that as a bale unwinds it becomes lighter and lighter. And, as the bale becomes lighter, it exerts less force in the direction toward the portal. This reduction in force can be counteracted by providing supplementary biasing forces to the bale so that the force that the bale exerts as it rides against the portal can be more or less constant as it is unwound from the bale frame 220. An embodiment of a biasing element is depicted in FIGS. 3C-3*d* and 9*a*, wherein a biasing element 232 with a coil spring 233 may be used to pull or urge the bale of linked segments toward the guide assembly 140. As described further hereafter, an end of a center shaft 228 is received in an aperture 242 of a biasing element 232, thus operatively connecting the center shaft 228 to one end of the spring 233. The other end of the spring 233 is connected to a portion of the guide assembly 140, preferably at a tab 183 that extends from support post 182. Illustrative embodiments may include a biasing element at both ends of center shaft 228.

With general reference to FIGS. 8 and 9*a*, an embodiment of a guide assembly 140 that comprises a drive module 141 and an outer frame 180 is shown. The drive module 141 has a housing comprised of a plurality of side panels 143 and a cap 147, which are removably secured to an inner frame 142 (FIG. 9*c*) by one or more fastening elements such as set screws or countersunk screws (not shown). Each side panel 143 is provided with opposing side notches 145 that are configured to allow portions of linear drive members 178 to extend outwardly beyond the outer surfaces of the side panels 143. An embodiment of the inner frame 142 (FIG. 10*a*) may include an upper or first mounting block 144, a mid or second mounting block 146, a mid or third mounting block 148 and a lower or fourth mounting block 150. The mounting blocks are triangularly shaped because they correspond to the three chain sections that are used to form a triangularly shaped column or tower. It will be understood, however, that if four or more chain sections are used, the mounting blocks will be modified accordingly.

Figure 10A:
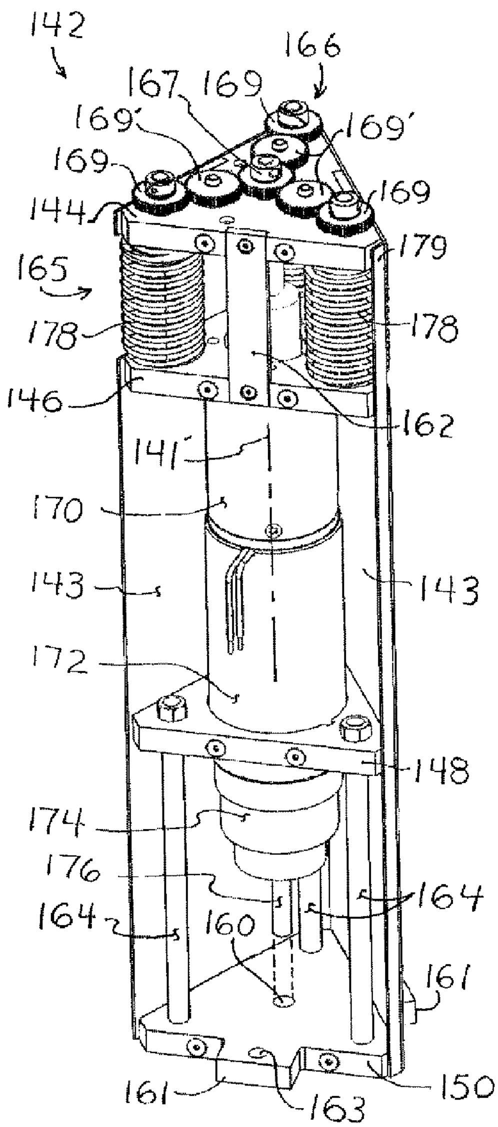
FIG. 10*a* is an isometric view of an embodiment of a drive assembly used in the drive module of FIG. 9*a;*
Figure 10C:
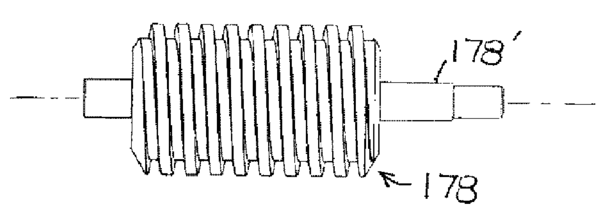
FIG. 10*c* is a side elevational view of an embodiment of a linear drive member used in the drive assembly of FIG. 10*b;*
Figure 10B:
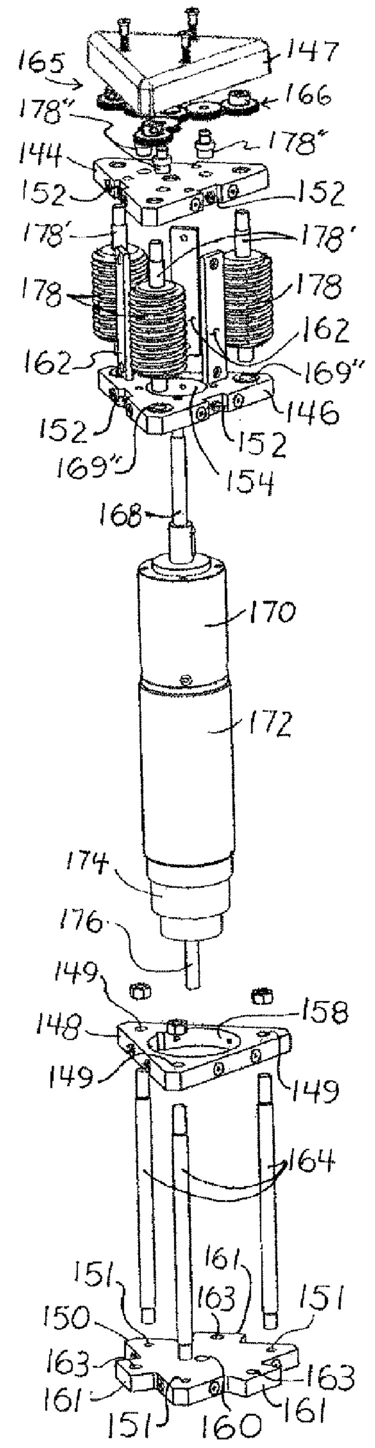
FIG. 10*b* is an exploded view of the drive assembly of FIG. 10*a:*

As depicted in FIG. 10*b*, the first or upper mounting block 144 includes a plurality of apertures that are configured and arranged to rotatably support a drive assembly 165 such as a gear train 166 that may include a center gear 167 that is connected to an upper drive shaft 168 that extends from a primary or upper gearbox 170. The primary gearbox, which is operatively connected to a motive source 172, has an input end and an output end, with the gear ratio between the input and output ends having a range of approximately 1:1 to approximately 100:1. An example of a commercially available gearbox that can be used with some of the embodiments of this tower assembly is the PLG63 model manufactured by Dunkermotoren of Bonndorf, Germany.

Referring again to FIG. 10*b*, the mid or second mounting block 146 includes an aperture 154 that is sized and configured to receive a portion of the primary gearbox 170. The first and second mounting blocks 144, 146 have a plurality of linear drive members or worm drives 178 rotatably mounted therebetween. In some embodiments, a drive member 178 may comprise plastic material such as high density polyethylene (HDPE). An example of a preferred material may include DELRIN®, but other materials such as Nylon, polyurethane, polyimide, polyphenylene Sulfide (PPS) or polyvinyl chloride (PVC) may be used. In some embodiments, the drive member 178 is provided with metallic shafts at either end, and the metallic shafts may be received by bushings 169" that are located in mounting blocks 144, 146. In some embodiments, the drive member 178 may include one metallic shaft 178' (FIGS. 10*b*, 10*c*) that extends along the rotational axis of the drive member 178 and extends beyond the ends thereof. In other embodiments, a drive member 178 may comprise a metallic core that is provided with a plastic engagement surface. In the above exemplary embodiments, the provision of a plastic engagement surface is preferable to other materials, because it tends to be self-lubricating when it contacts harder surfaces of chain segments or links 245. It has been found that a plastic engagement surface is also preferable to other materials because it provides for smoother and quieter operation. In some exemplary embodiments, the drive members 178 will each have a radius having a range of approximately 0.5 inches to approximately 4.0 inches. In some exemplary embodiments, the drive members 178 will have a pitch having a range of approximately 5 degrees to approximately 40 degrees. In yet other embodiments, the drive members 178 will have a longitudinal length in the range of approximately one inch to approximately 18 inches. The drive members 178 are substantially parallel to each other and each drive member has a shaft that may be operatively connected to the drive assembly 165.

Figure 9C:
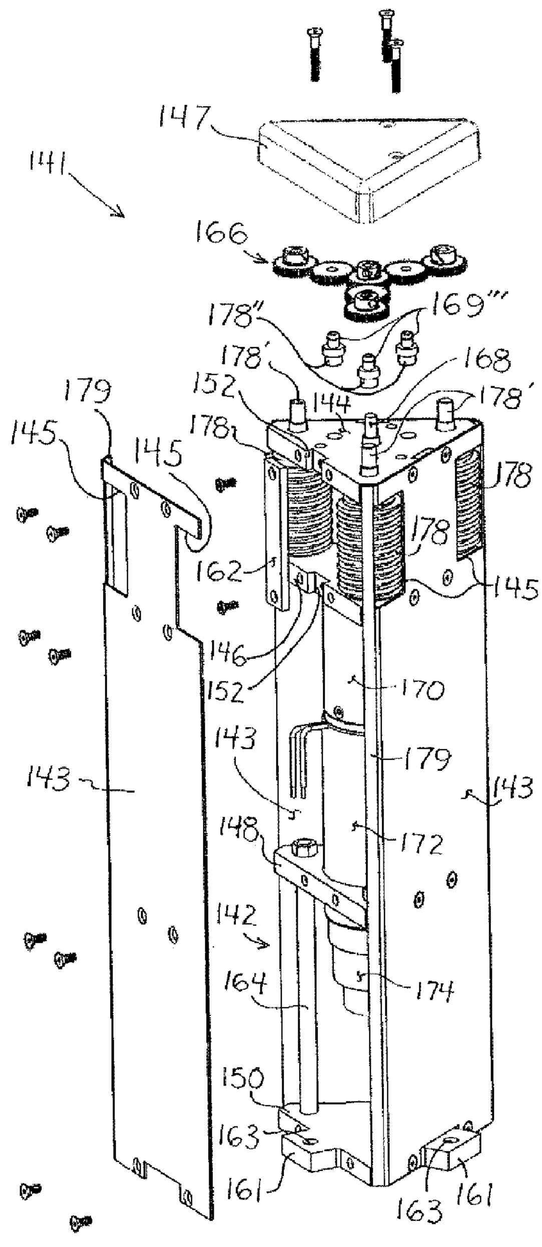
FIG. 9*c* is a partially exploded view of the drive module of FIG. 8.
Figure 9D:
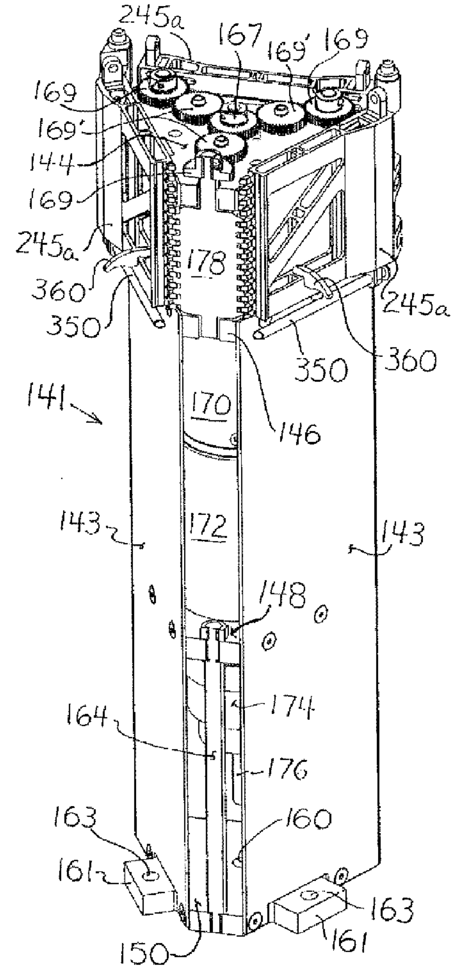
FIG. 9*d* is a partial, sectional, enlarged view of the embodiment of the drive module of FIG. 9*a;*

Referring now to FIGS. 9*c* and 9*d*, in embodiments that use a gear train 166 as a drive assembly 165, an outlying gear 169 (FIG. 9*d*) may be connected to the shaft of each drive member 178. As will be understood, idler gears 169' may be positioned between the center gear 167 and outlying gears 169 so that when the center gear 167 is rotated, all of the drive members 178 rotate in the same direction and speed (see, for example, FIGS. 9*a*, 9*c*, 9*d* and 10*a*-10*c*). As with the drive members, the idler gears 169' may be provided with metallic shafts 178" and bushings 169'" (FIG. 9*c*) to reduce rotational friction.

In operation, the drive module 141 and column 300 formed by the chain sections 314, 316, 318 has an extension/retraction or lift rate in the range of approximately 0.05 ft/sec (0.6 inch/sec) to approximately 0.5 ft/sec (6.0 inch/sec). In an alternative embodiment, the idler gears 169' (FIG. 9*d*) of the gear train 166 may be omitted and the center gear 167 used to drive the outlying gears 169. In such embodiments the lift rate can be approximately 0.25 ft per second or greater. In another embodiment, the idler gears may be omitted and outlying gears may be connected to the center gear by a drive belt or chain. When the center gear 167 is rotated, the outlying gears 169 that are operatively connected to it and the drive members 178 that are connected to the outlying gears will also rotate. In operation, the thread of each drive member or worm drive 178 simultaneously engages two laterally adjacent segments 245, preferably along vertical margins, and more preferably with sets of vertically aligned and generally horizontally oriented drive slots 290, 296 (FIG. 11*a*) located along the margins of the laterally adjacent segments.

Referring now to FIG. 10*a*, in some embodiments, the first and second mounting blocks 144, 146 may be provided with one or more strengthening struts 162 that span the mounting blocks 144, 146 and which may be positioned within notches 152 located on side edges of the blocks, and secured with fastening elements such as set screws or countersunk screws. As shown in FIGS. 10*a* and 10*b*, the third mounting block 148 includes an aperture 158 that is sized and configured to receive a portion of a motive power source 172, which is connected to the primary gearbox 170.

The motive source can be a motor having a rating in the range of approximately 0.1 hp to approximately 3 hp, and with the preferred rating depending upon the tower size and the payload to be lifted. In one illustrative embodiment, the motive source 172 is an electric motor. An example of a commercially available electric motor that can be used with some of the embodiments of this tower assembly is the BG65 model manufactured by Dunkermotoren, of Bonndorf, Germany. In some embodiments, the motive source may be powered by a power cell or battery that may be positioned within the enclosure 131 of the base 120. In other embodiments, the motive source may be connected, by wire, to a remote power source such as may be available from a vehicle or a building's electrical system. In other embodiments, the motive source may be connected to a solar cell that may be part of, or remote from, the tower assembly. In yet other embodiments, the tower assembly may be provided with its own power supply and a generator. It is even also envisioned that the tower assembly may be mechanically connected to a power-take-off (PTO) connection, such as from a vehicle.

Referring now to FIG. 10*b*, the block 148 may also include a plurality of apertures 149 that are configured and arranged to receive ends of spacers 164. The block 148 may be provided with one or more transverse fastening elements such as set screws or countersunk screws that can be used to secure the motive source 172 as it resides within the aperture 158 of the third block 148.

The lower or fourth mounting block 150 (FIGS. 10*a* and 10*b*) includes an aperture 160 that is configured and arranged to rotatably receive a lower drive shaft 176 that extends from an encoder mechanism 174 through the plate 122 of base 120 and on to a secondary gearbox 171 (FIGS. 5, 6, 7). The block 150 may also include a plurality of apertures 151 that are configured and arranged to receive ends of spacers 164.

In some embodiments, the encoder mechanism 174 is able to monitor the operation of the motive source 172 and the rotational movement of the drive shafts 168 and 176, so that the height of the cap 302 at the top of the column 300 can be precisely and automatically controlled. An illustrative embodiment of a commercially available encoder mechanism that can be used with some of the embodiments of this tower assembly is the RE20 model manufactured by Dunkermotoren, of Bonndorf, Germany. Alternatively, an encoder mechanism may be omitted and the lower drive shaft 176 may extend directly from the motive source 172 to the secondary gearbox 171. In some embodiments, Hall effect sensors, similar to sensors used in Dunkermotoren model BG65×50PI, can be used to precisely and automatically control the position of the top of column and/or cap 302.

Referring now to FIGS. 9*c* and 10, some embodiments of the mounting block 150 may be provided with one or more extensions or tabs 161 that project outwardly from the sides of the block 150. The extensions or tabs 161 are configured so that when the drive module 141 is positioned within the outer frame 180 of the guide assembly 140, the ends of the extensions 161 confront lower brace members 184 of the outer frame 180 (FIG. 8). This tends to center the lower portion of the drive module 141 and inner frame 142 within the lower end of the outer frame 180. The extensions or tabs 161 may be provided with apertures 163 (FIG. 9*c*) that are configured and arranged to receive fastening elements such as threaded bolts that extend upwardly from the first set of apertures 124 located on base 120 and which are secured by nuts (see FIG. 9*a*). This allows the inner frame to be secured to base 120.

Referring now to FIG. 10*a*, as described for the first and second blocks 144, 146, the third and fourth blocks 148, 150 may be connected to each other by one or more spacers 164. Some embodiments of the spacers 164 may include threaded ends. In some embodiments the spacers 164 may extend below the lower block 150 and into the first set of apertures 124 in the plate of base 120. In other embodiments, the lower or fourth blocks 148, 150 may be provided with downwardly extending pins that are designed to come into registry with the first set of apertures 124 of the base plate 122.

Some embodiments of the inner frame 142 may include one or more vertically aligned bars 179 (shown as dashed lines in FIG. 10*a*) that are parallel to the longitudinal axis 142' of the inner frame 142 and which can be connected to the edges of all of the blocks so as to further stabilize and strengthen the inner frame 142. In some embodiments, a vertical bar 179 may be formed as a side extension along one edge of a side panel 143 (see, for example, FIGS. 9*c* and 10*a*).

With reference to FIGS. 8 and 9*b*, an illustrative embodiment of the outer frame 180 (sometimes referred to as a reaction ring) is shown. The outer frame or reaction ring 180 includes a plurality of vertical support posts 182. Each support post 182 includes an inner facing surface, an outer facing surface, an upper end, a lower end, and angled side surfaces. In some embodiments, the support post may be rigidly connected to the inner ends of rail guides 216, 218. The support posts 182 are connected to each other by lower brace members 184 and upper brace members 186, which, collectively, define the portals 187 (FIG. 9*a*) for the chain sections. Some embodiments of the lower brace members 184 may include opposing ends that are configured to abut the side surfaces of two posts 182. As shown in FIG. 8, each end of the lower brace member 184 may be provided with a threaded aperture that receives a fastening element that is used to connect the lower brace to the posts 182. The upper brace members 186 are connected to the support posts 182 in a similar, though more robust manner. The upper brace members 186 are wider than the lower brace members and this allows additional fastening elements to be used. As shown in FIG. 8, each end of an upper brace member 186 can include two fastening elements to connect the upper brace member to the support post 182. Each upper brace member 186 may include one or more vertically aligned slide rails 188 (FIG. 8) that are used to guide the tower or column as it is being extended and retracted from vertically opening slots located at the end of the guide assembly.

The slide rails 188 may be formed from plastic material such as fiber reinforced resin (i.e.: fiberglass or carbon graphite matrix), structural foam, high density polyethylene (HDPE), acrylics or polyvinyl chloride (PVC). Alternatively, the slide rails 188 may be metallic and have a plastic engaging surface. In an exemplary embodiment, there are two slide rails for each upper brace member 186, and the slide rails are vertically oriented, parallel, and extend substantially along the width of the upper brace member 186. The slide rails 188 are configured and arranged to contact raised portions of a segment as it moves vertically relative thereto, and to ensure that the segment properly engages the drive module 141.

Figure 4A:
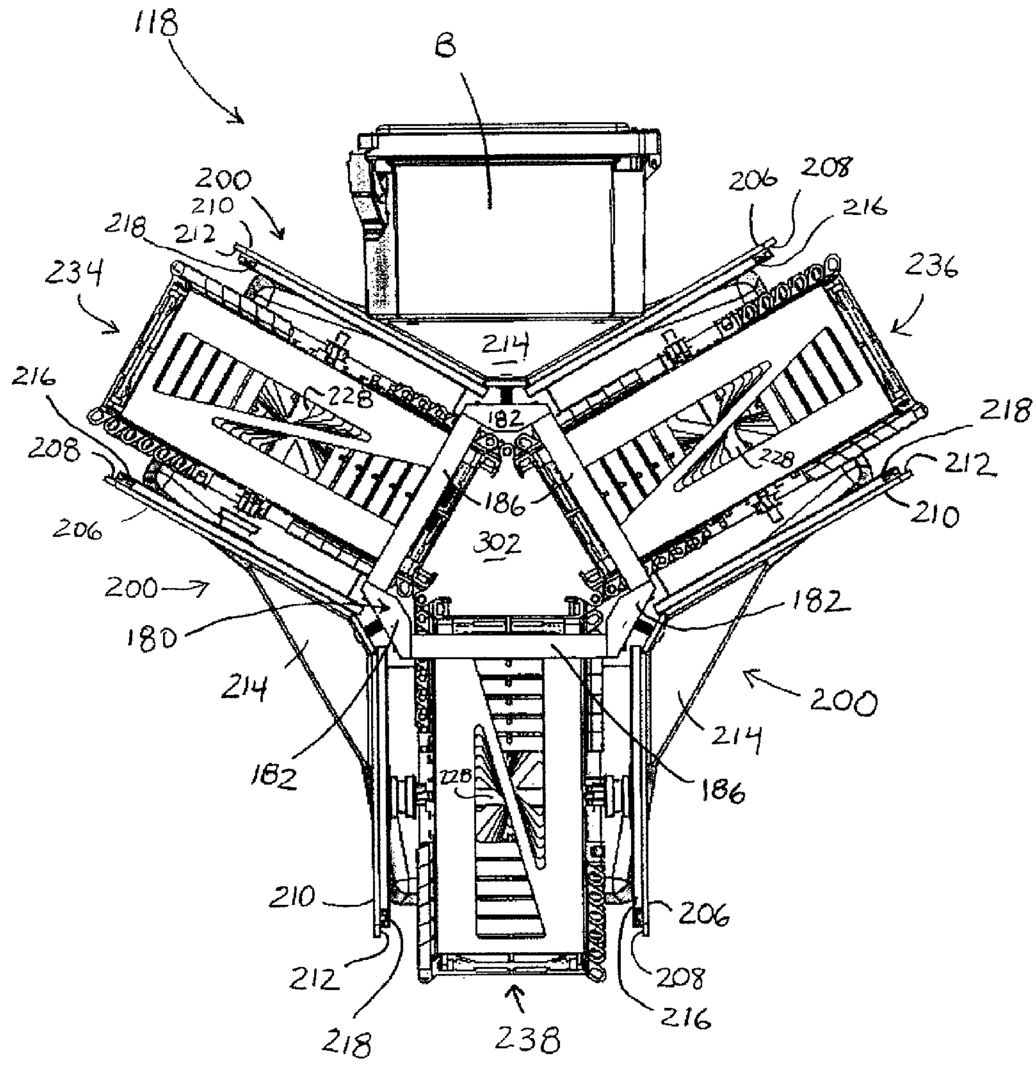
FIG. 4*a* is a top plan view of an embodiment of the tower assembly of FIG. 1*a*, with the addition of a control box "B"
Figure 4B:
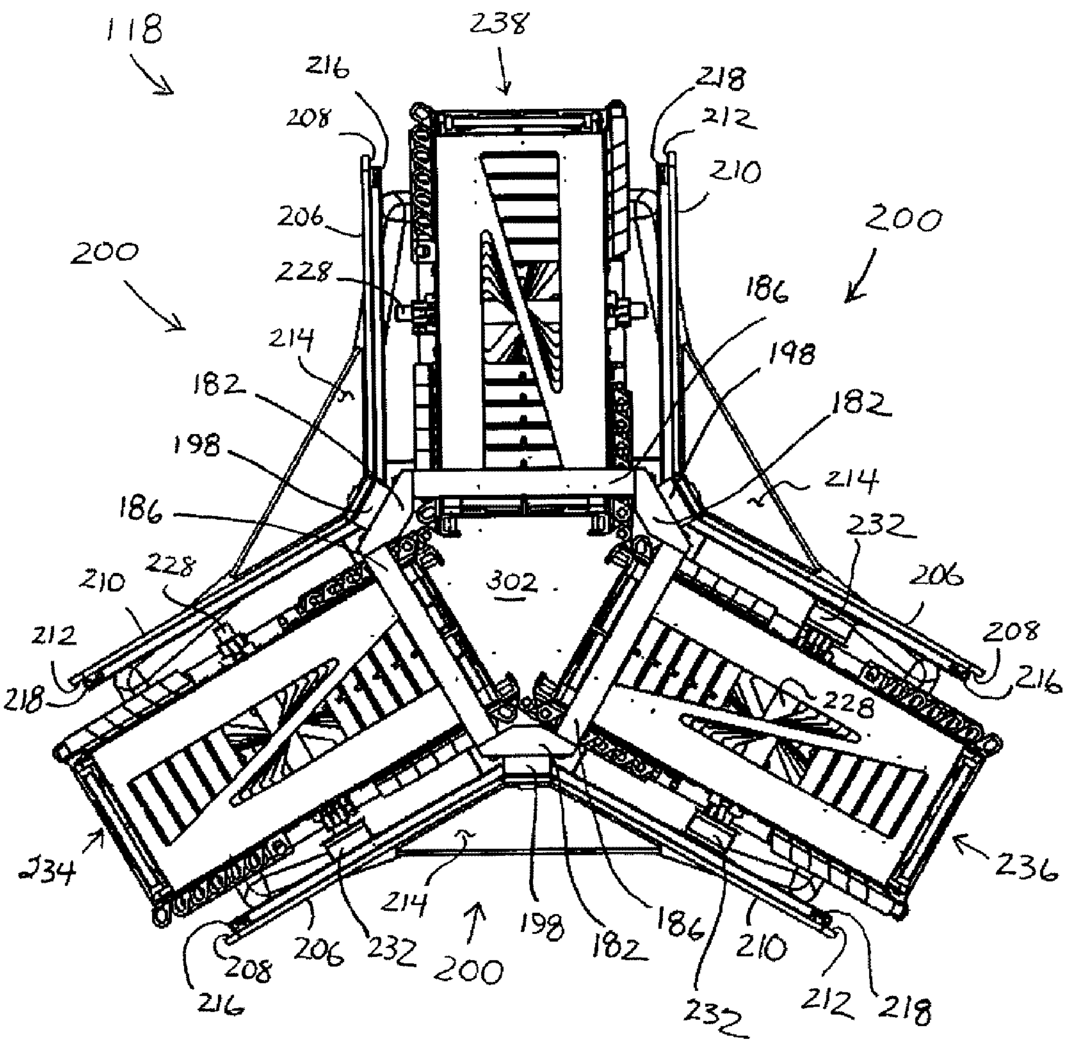
FIG. 4*b* is a top plan view of the embodiment of a tower assembly of FIG. 1*a;*

The upper brace member 186 may include one or more sensors 190, 192 (FIG. 8) that can be used to provide information regarding operation of the tower assembly and to control the tower assembly. In some embodiments, the sensors 190, 192 can be in the nature of limit switches or proximity switches that may be connected to a control box "B" that may be attached to the tower assembly 118 as depicted in FIG. 4*a*, or which may be remote from the tower assembly 118.

In some embodiments, the outer frame 180 may be provided with a top plate 196 (FIG. 9*a*) that can be attached to the upper end thereof with fastening elements such as threaded fasteners. The top plate 196, which is the shape of a triangular ring, protects the slide rails and sensors and adds strength to the frame 180. The outer frame 180 may be removably connected to the base 120 by one or more fastening elements that may be inserted upwardly through the second set of apertures 126 in the base 120 and into threaded apertures in each of the support posts 182 (see also, FIGS. 5 and 9*a*).

With continuing reference to FIGS. 1*a*-4*b* and 6-9*b*, each support post 182 includes a bale support bracket 200 that is attached thereto. In some embodiments, a spacer 198 may be interposed between the support post 182 and the bale support bracket 200. Each bale support bracket 200 is generally v-shaped and comprises a body 202 having a center section 204 a first wing 206 and a second wing 210. The center section 204 includes a plurality of apertures that receive fastening elements used to attach the support bracket 200 to the support post 182. As will be understood, the spacer 198, which is generally coextensive with the center section 204, may also include apertures that are coincident with the apertures in the center section 204. The wings 206, 210 extend outwardly from the center section 204 and are angled so that they diverge away from each other. In some embodiments, the wings and the center section of a bale support bracket may be provided with one or more gussets 214 that strengthen the bracket 200 and maintain the orientation of the wings 206, 210 with respect to each other.

As shown in FIG. 8, each wing 206, 210 includes an inner surface 208, 212, respectively, which confront the bale supported therebetween and these inner surfaces are perpendicular to a portal 187 (FIGS. 3*b* and 9*a*), whose upper and lower edges are defined by the upper and lower brace members 186, 184 of the outer frame 180, and whose side edges are defined by two vertical support posts 182 of the outer frame. Each of the inner surfaces 208, 212 supports a guide rail 216, 218, respectively. Since the guide rails 216, 218 are substantially the same, only guide rail 216 will be discussed in detail. As shown in FIGS. 8, 9*a* and 9*b*, the end profile of guide rail 216 is generally C-shaped as shown in FIG. 3*c* and includes a vertical side wall 216*a*, a horizontal upper wall 216*b*, a downwardly depending vertical arm 216*c*, a horizontal lower wall 216*d*, and an upwardly ascending arm 216*e*. The walls and arms form opposing channels 217 that are configured and arranged to slideably receive outwardly extending feet 231 of a follower or shoe 230, so that the shoe is able to move in a constrained manner therealong towards and away from the portal 187. Some embodiments of the follower and/or the channels 217 of the guide rail 216 may include friction reducing material between sliding surfaces, with preferred friction reducing materials including high density polyethylene material (HDPE) or ultra high molecular weight polyethylene (UHMWP). The guide rail 216 and follower or shoe 230, as components of the storage and feed arrangement 194 provide added stability to the chained sections, and they resist and substantially prevent the bale from walking or yawing along the rails as it is wound and unwound.

Figure 3A:
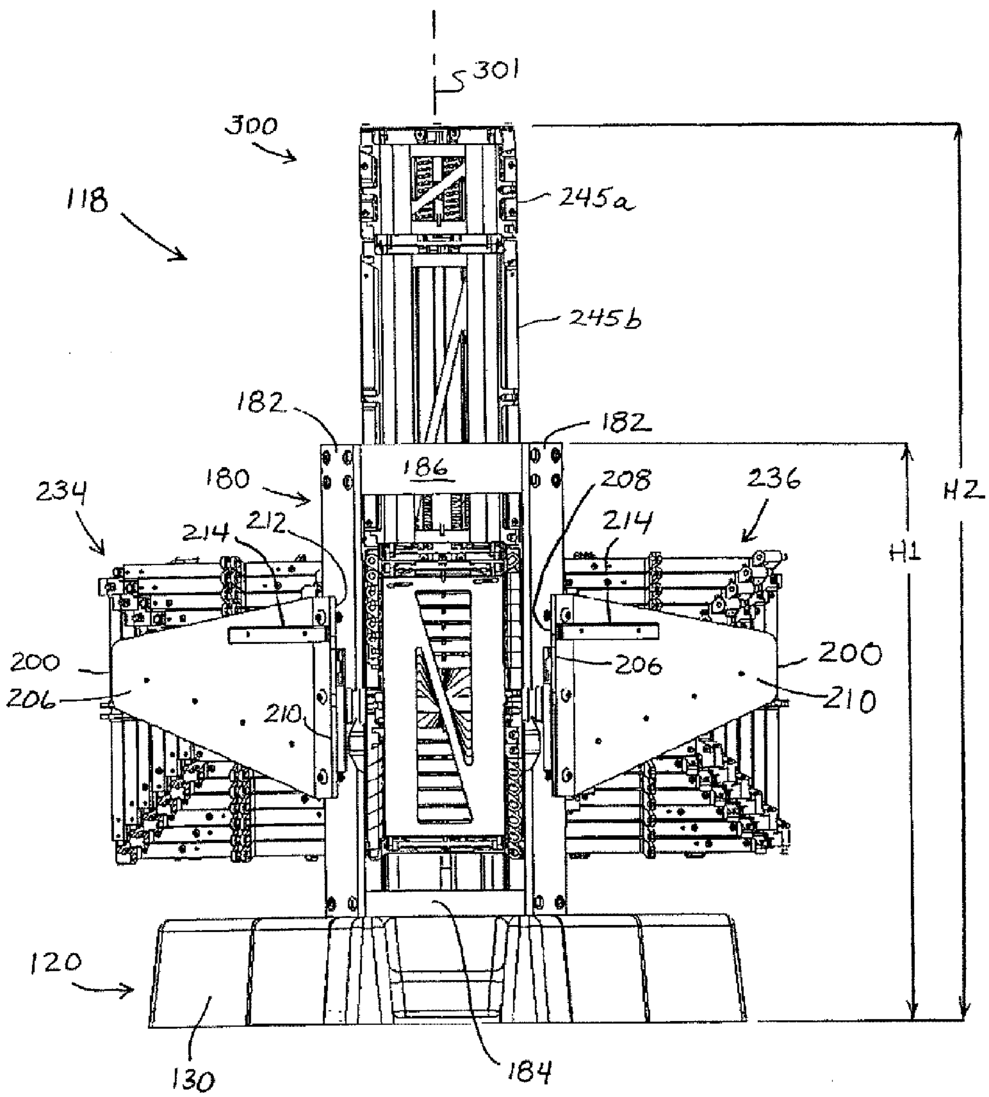
FIG. 3*a* is an elevational view of the embodiment of FIG. 2*a;*
Figure 3B:
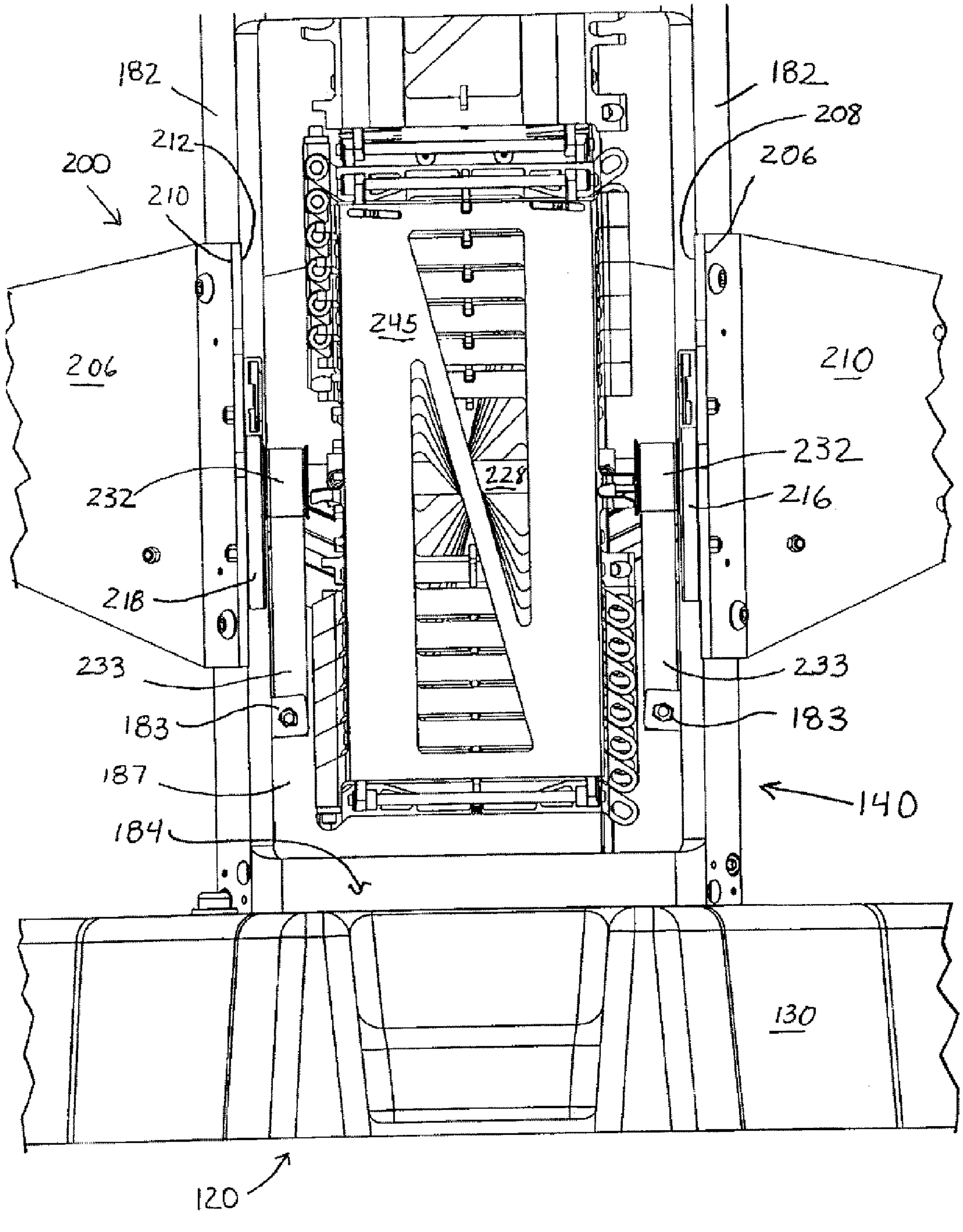
FIG. 3*b* is an enlarged, elevational view of the lower end of the tower assembly of FIG. 3*a;*
Figure 3D:
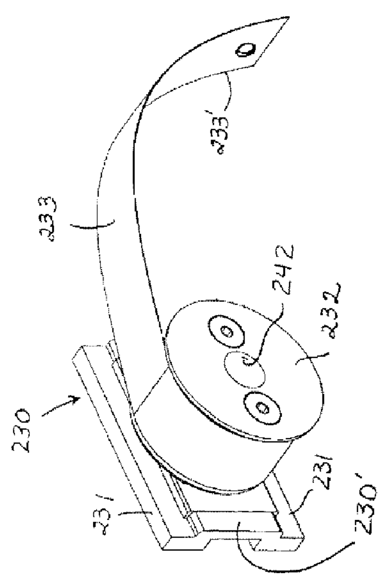
FIG. 3*d* is a partial, perspective view of a portion of the storage and feed arrangement of FIG. 3*c;*
Figure 3E:
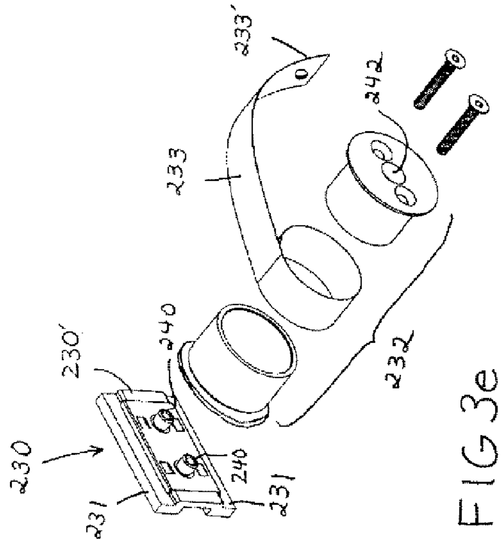
FIG. 3*e* is an exploded, perspective view of the portion of the feed and storage arrangement of FIG. 3*d;*

As seen in FIGS. 3*c*, 3*d*, and 3*e*, each follower or shoe 230 includes a raised portion 230' that stands proud of the channels 217 of the rail guide 216. The raised portion may include internally threaded bosses 240 (FIG. 3*e*) that receive threaded fasteners that are used to attach a retractable biasing element 232 to the follower 230. An embodiment of a biasing element 232 may include a spool about which a length of resilient spring type material 233 may be wound. In some embodiments, the biasing element is able to exert a constant force along the entire length of its movement. An exemplary embodiment of the resilient material 233, which is commercially available under the Neg'ator Series, manufactured by the Ametek Company of Feasterville, Pa., is spring steel tape, which is normally completely wound about a support spool. The resilient material 233 has an end 233' that may be attached to the tab 183 (described earlier in FIG. 3*b*) that is connected to a support post 182.

The force that each of the biasing elements can exert against an end of the center shaft 228 has a range of approximately 0.0 pounds (0.0 kg) to approximately 50.0 pounds (23 kg). The retractable resilient element 232 can include a transverse central aperture 242 that is configured to receive one end of the center shaft 228 of the bale frame 220. In some embodiments this aperture is large enough to allow the end of the shaft to freely rotate, in other embodiments, a bushing or bearing provides free rotation for the shaft.

Referring now to FIGS. 15*a*, 17*a*, 27*b* and 27*c*, an embodiment of a bale frame 220 may include a first plate 222, a second plate 224 and a plurality of rods 226 that connect the plates 222, 224 together in a parallel relation. In some embodiments, the plates have a thickness in the range of approximately 0.12 inches (3.17 mm) to approximately 0.5 inches (12.7 mm). In some embodiments, the plates 222, 224 are square and the rods 226 connect the corners of the plates so as to form a space frame (see FIGS. 15*a*, 15*b*, 16). Some embodiments of the plates have edges that have a length in the range of approximately 2.0 inches (50.8 mm) to approximately 24.0 inches (60.0 cm).

In some embodiments, the plates 222, 224, may each include a segment attachment tab, 223 (FIG. 15*a*), each of which may include a transverse aperture that is configured and arranged to receive a pivot shaft 350 that can be used to connect the frame 220 to an initial or bottommost segment 245 of a chain section 234, 236, 238. In one embodiment, each tab 223 is located within a plane defined by the plate to which it is connected. In a preferred embodiment, each tab has one edge that is coextensive with an edge of its respective plate and has a length in the range of approximately 0.2 inches (6.3 mm) to approximately 3.0 inches (7.6 cm).

The plates 222, 224 may each include a centrally located, transverse aperture that is configured to receive a center shaft 228. As discussed earlier, the center shaft 228 has two ends, each of which is rotatably received by a retractable resilient element 232 that is associated with a follower or shoe 230, with the follower or shoe 230 slideably received within a guide rail 216.

In operation, as a bale is wound and formed, the bale will ratchet away from or toward the guide assembly 140 as the bale is wound or unwound. In some embodiments the pitch or slope α (alpha, FIG. 3*c*) of the guide rail 216 is approximately 22 degrees from horizontal or approximately 68 degrees relative to a support post 182 against which it abuts. It is understood, however, that the pitch or slope could range from about −10 degrees to about +40 degrees from the horizontal. In some embodiments the pitch or slope of the guide rails may be adjustable, with the wings 206 and 210 provided with additional sets of linearly aligned apertures, so that operation of the storage and feed arrangement can be fine tuned and optimized for particular load requirements.

Referring now to FIG. 15*b*, the individual segments (245*a*, 245*b*, 245*c*, 245*d*, 245*e*, etc.), which are connected to one another and make up the linked sections 314, 316, 318 (FIG. 19), will now be described in detail. Referring now to FIG., 11*a*, each of the individual segments or sections 245 includes a substantially rigid body 246 that includes a first panel 248, a second panel 250, a first side wall 252, a second side wall

Figure 13A:
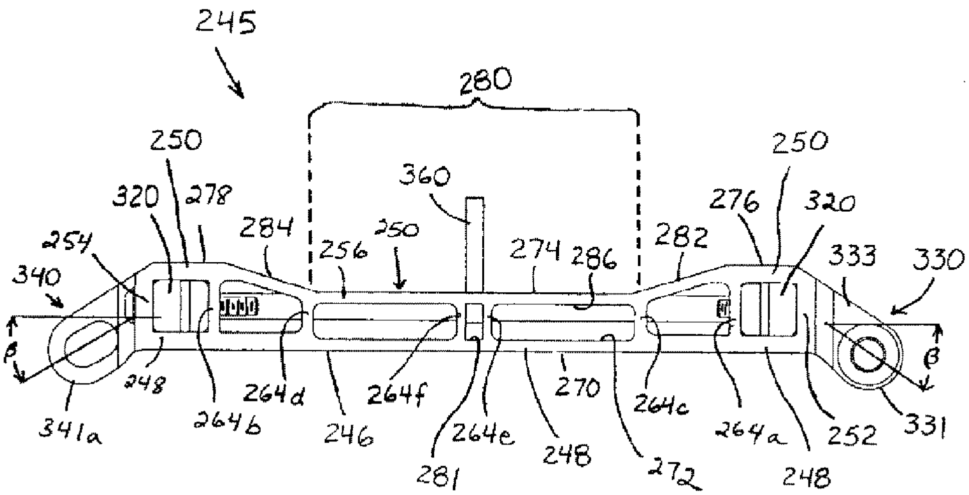
FIG. 13*a* is a top edge view of the segment of FIG. 11*a;*
Figure 13B:
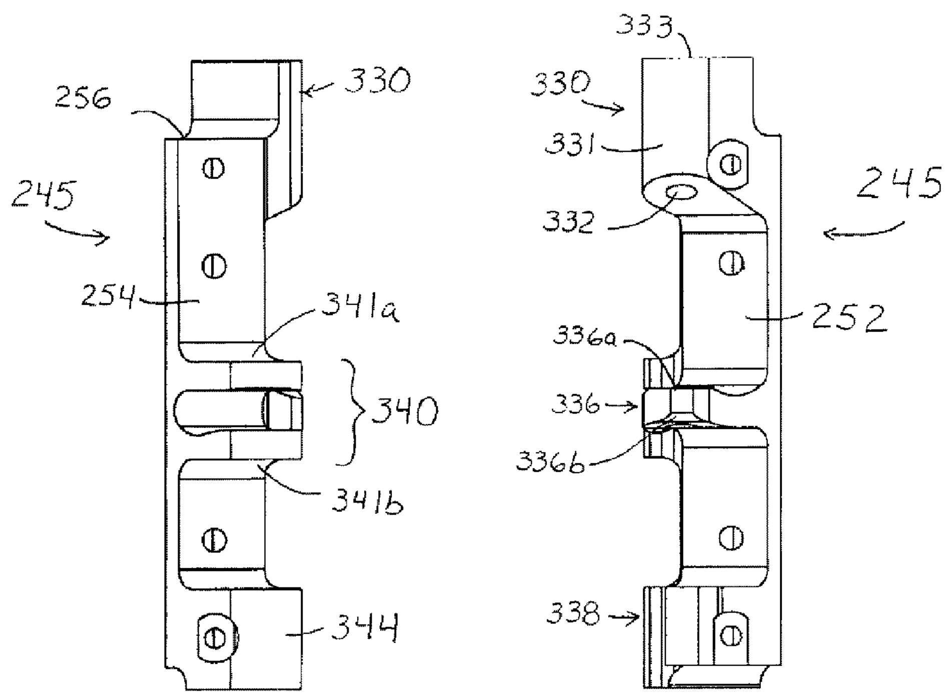
FIG. 13*b* are opposing side wall elevational views of the segment embodiment of FIG. 11*b;*
Figure 14A:
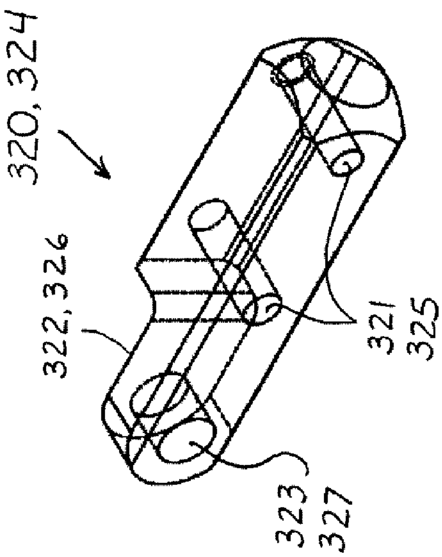
FIG. 14*a* is an isometric view of an embodiment of a pivot support block used to connect segments together in an end-to-end fashion.
Figure 14B:
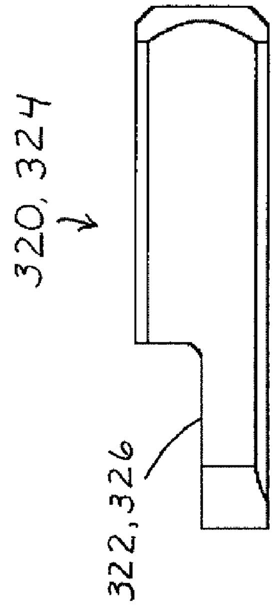
FIG. 14*b* is a front elevational view of the pivot support block of FIG. 14*a;*
Figure 14C:
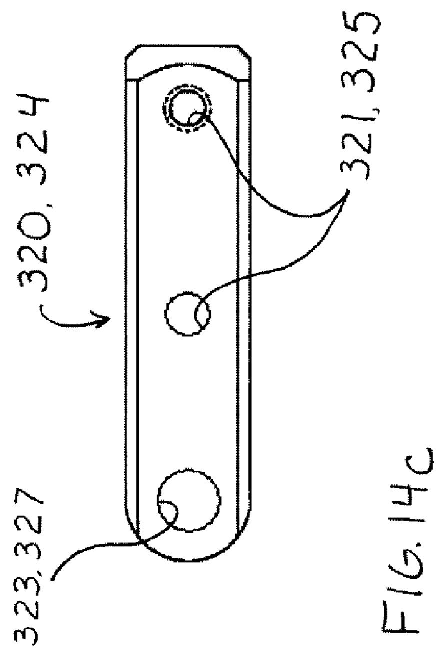
FIG. 14*c* is a side elevational view of the pivot support block of FIG. 14*a;*
Figure 14D:
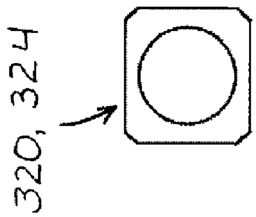
FIG. 14*d* is an end view of the pivot support block of FIG. 14*a;*

254, a top end 256 with an upper crossbeam 257 and a bottom end 258 with a lower crossbeam 259. The body 246 includes a center opening 260 and may include diagonal brace 262. In some embodiments, the panels 248, 250 of the body are spaced apart from each other by one or more webs 264*a-f*, as best shown in FIG. 13*a*. In some embodiments, the webs 264*a*-264*f* may be substantially parallel to each other. In some embodiments, the webs 264*a*-264*f* may be spaced at intervals between the side walls 252 and 254 (FIG. 13*b*), and formed by an extrusion or pulltrusion process. In embodiments that are formed by the extrusion process, the center opening 260 may be formed by removal of material, such as by machining.

The size of the segments can vary, having a width that ranges from approximately 2.0 inches (5.1 cm) to approximately 24.0 inches (60.0 cm), and a length that ranges from approximately 2.0 inches (5.1 cm) to approximately 24.0 inches (60.0 cm).

Starting with the outwardly facing portion of the segment 245, the second panel 250 includes an outer surface 274 and an inner surface 286. In some embodiments, the outer surface 274 may include spaced-apart raised portions 276, 278 (FIG. 13*a*) that are adjacent the side walls 252, 254, respectively, and which extend from the top end 256 to the bottom end 258. The raised portions 276, 278 are configured and arranged to engage the slide rails 188 (FIG. 2*b*) of upper brace members 186 of the outer frame 180 as the segments 245 are extended and retracted by the drive module 141 of the guide assembly 140. The second panel 250 may also include a recessed portion 280 (FIG. 13*a*) and transition portions 282, 284 that connect the recessed portion 280 to the raised portions 276, 278.

Referring now to the inwardly facing portion of the segment 245, the first panel 248 includes a plurality of linear drive openings that extend transversely between the side walls 252, 254. In some embodiments, the drive openings are in the form of parallel slots that are arranged in columns that extend from the top end 256 to the bottom end 258. In some embodiments, the slots (which may define ribs therebetween) have lengths that are roughly defined by the side walls and webs. In an illustrative embodiment, the drive openings may include a first set of transverse slots 290 (FIG. 11*a*) and a second set of transverse slots 296. In the illustrative embodiment, the lengths of the first set of slots 290 are defined, generally, by side wall 254 and web 264*d* and the lengths of the second set of slots 296 are defined, generally, by side wall 252 and web 264*c*. In some embodiments, one or more of the ribs defined by the slots 290 and 296 may be reinforced by webs 264*a* and 264*a*. In some embodiments, the slots are formed by machining, with the slots 290, 296 defining ribs 390, 396, respectively (FIGS. 11*c*, 11*d*).

Each set of slots may be angled with respect to the top and/or bottom ends 256 and 258 of segment 245 so that they are better able to operatively engage and more fully contact the pitched thread of a drive member 178. To accommodate drive members having different thread pitches, the angles 292 and 298, that each set of slots makes with respect to either the top or bottom ends 258 can be increased or decreased and may have a range from approximately 1.0 degrees to approximately 20.0 degrees. In some embodiments, the slots, which may be formed by milling, have a depth 293 and 299 (FIG. 11*a*) in the range of approximately 0.12 inches (3.17 mm) to approximately 0.50 inches (12.27 mm). In some embodiments, the slots may extend through the first panel 248 from the outer surface to the inner surface thereof. In other embodiments, the slots have upper and lower surfaces that converge towards each other so that the vertical width at the outer surface of the panel is greater than the vertical width of the slot as it extends deeper into the panel. In some embodiments, each slot may be chamfered or beveled. Convergent, chamfered, or beveled slots are preferred because they provide maximum contact surfaces for the drive member 178. Each slot is substantially linear and has a length 291 and 297 (FIG. 11*b*) from approximately 0.2 inches (5.0 mm) to approximately 3.1 inches (78.0 mm).

Expressed alternatively in terms of ribs, the ribs 390, 396 can accommodate drive members having different thread pitches, by varying the angle 392, 398, respectively, that each rib makes with respect to either the top end or the bottom end of a segment 245, and may have a range from approximately 1.0 degrees to approximately 20.0 degrees. In some embodiments, the ribs 390 and 396, which may be formed by milling, have a depth 393, 399 (FIGS. 11*c*, 11*d*) in the range of approximately 0.1 inches (3.2 mm) to approximately 0.5 inches (12.3 mm). In some embodiments, the ribs may communicate with the slots and collectively extend through the first panel from the outer surface to the inner surface thereof. In other embodiments, the ribs have upper and lower surfaces that extend away from each other so that the vertical width of the rib at the outer surface of the panel is less than the vertical width of the rib as extends deeper into the panel (see, FIG. 11*c*). In some embodiments, each rib may be chamfered or beveled. Convergent, chamfered, or beveled slots are preferred because they provide maximum contact surfaces for the drive member 178 (see also, FIG. 11*c*). Each rib 390 and 396 is substantially linear and has a length 391, 397 from approximately 0.2 inches (5.0 mm) to approximately 3.1 inches (78.0 mm). In some embodiments, the ribs 390, 396 may be strengthened by webs 264*b* and 264*a* (FIG. 11*b*). Alternatively, the sets of slots and ribs may be omitted and the segment provided with pre-manufactured gear racks (having pitch angles that correspond to a drive member) that extend from the top end 256 to the bottom end 258 thereof and which may be removably attached thereto. Such an implementation has significant strength and weight advantages when combined with segments that are formed from lighter, though structurally weaker material such as plastic.

Figure 12:
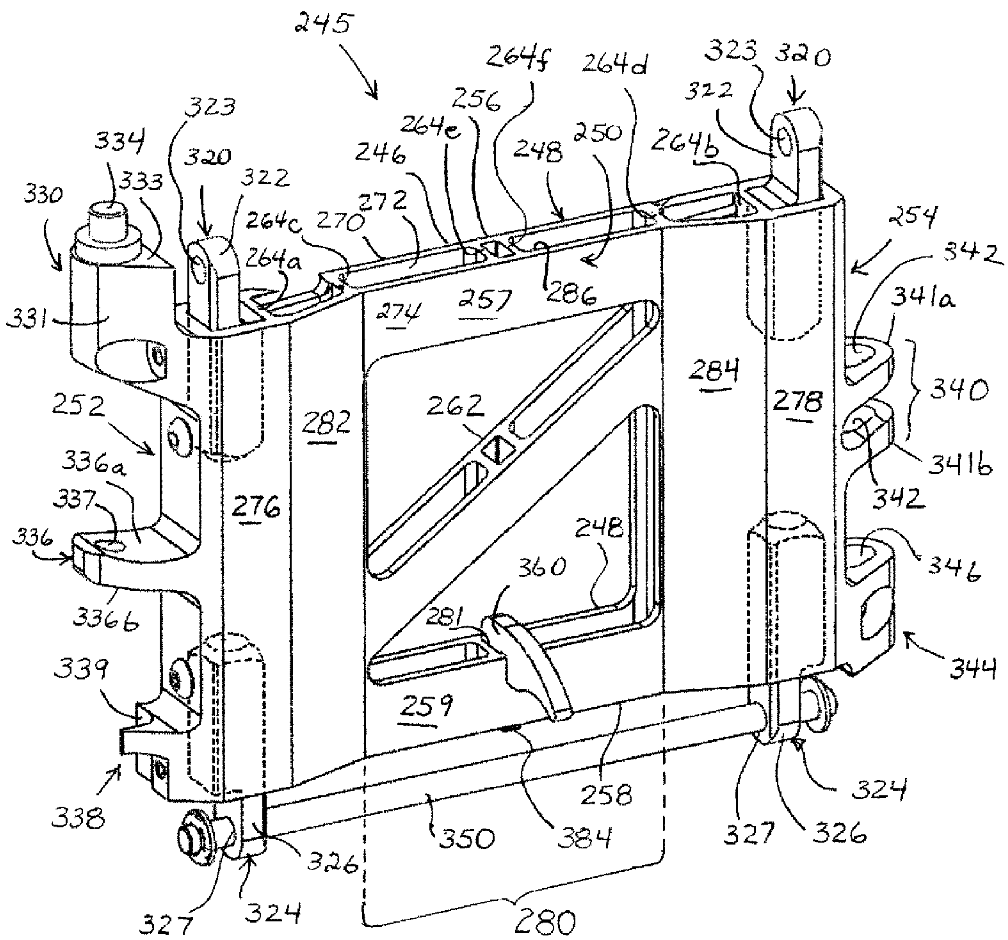
FIG. 12 is an isometric view of another surface of the segment of FIG. 11*a;*

In some embodiments, vertically adjacent segments, e.g. 245*a* and 245*b* (FIG. 15*a*) may be connected to each other by one or more pivot support blocks 320, 324 (FIG. 12). In one embodiment, as shown in FIGS. 12 and 14*a*-14*d*, each pivot support block 320, 324 is L-shaped and includes a blade 322 that includes a transverse aperture 323, 327 that is configured to receive a pivot shaft 350. The blocks are insertable into apertures located at the top and bottom ends of each segment 245. In some embodiments, the apertures may be formed by the side walls 252 and 254, webs 264*a* and 264*b*, and first and second panels 248 and 250. When the blocks 320, 324 are inserted, the blades 322, 324 will extend outwardly therefrom and within the plane of the segment. The L-shaped configuration of the pivot support blocks enables the blocks of the upper end of the segment to be oriented so that the blades 322 are adjacent the side walls 252 and 254 of the segment, while the blocks of the bottom end are oriented so that the blades 324 are spaced inwardly from the side walls of the segment and adjacent webs 264*a* and 264*b*. In some embodiments, the pivot support blocks may be secured to segments by one or more fastening elements that extend through transverse apertures in the segment side walls 252, 254 and the blocks at 321, 325, respectively. Successive segments, such as 245*a* and 245*b*, 245*b* and 245*c*, 245*c* and 245*d*, etc. are connected end-to-end to form linked sections 314, 316, 318.

Referring now to FIGS. 11*a*, 11*b*, 12, 13*a* and 13*b*, each segment 245 may include elements such as a plurality of engagement members that enable laterally and vertically adjacent segments to be coupled together. As best shown in the FIGS. 11*a* and 13*a*, an embodiment of a first side wall 252 includes an upper engagement member 330 that is angled β (beta) forwardly (or inwardly) relative to the surface 270 of the first panel 252, and which has a peg carrying portion 331 that may extend above the top end 256 of the segment 245. The peg carrying portion 331 includes an aperture 332 (FIG. 11*a*) that receives a base portion of a peg 334, while the remainder of the peg is able to extend above the segment 245 in a vertical direction. Some embodiments of the peg 334 may be formed from plastic material such as acetal, polyacetal or polyformaldehyde (POM), and press-fitted into the aperture 332. Other embodiments of the peg 334 may include an external thread that can engage an internal thread in the aperture 332. Alternative embodiments of the peg may be formed from other materials such as metal. In some embodiments, the peg 334 may be provided with a collar 335, as best seen in FIGS. 26*a*-26*e* that abuts a horizontal shoulder 333 of the peg carrying portion 331 when the peg is seated in aperture 332. The first side wall 252 (FIG. 11*a*) also includes a middle engagement member 336 that is also forwardly (or inwardly) angled β (beta) and includes upper and lower surfaces 336*a*, 336*b* that are substantially parallel to each other. In some embodiments, the upper and lower surfaces 336*a*, 336*b* may be upwardly curved. The first side wall also includes a lower engagement member 338 that is also forwardly (or inwardly) angled β (beta) and includes a curved vertical surface 339 against which a lower engagement member 344 of a laterally adjacent segment is brought into an abutting engagement, as a peg 334 of a vertically adjacent segment is translated into a slot 346 of the lower engagement member 344 from below. Note that as the peg 334 engages the slot 346 from below, the peg 334 draws the lower engagement member 344 up against the curved surface 339 of the lower engagement member 338 in a camming action, and the connection between the segments becomes tighter and tighter as the peg translates from a horizontal orientation to a vertical orientation. In some embodiments, the angle β may have a range of from approximately 10 degrees to approximately 45 degrees. In an illustrated embodiment (FIG. 13*a*), the angle β is approximately 30 degrees.

Figure 11A:
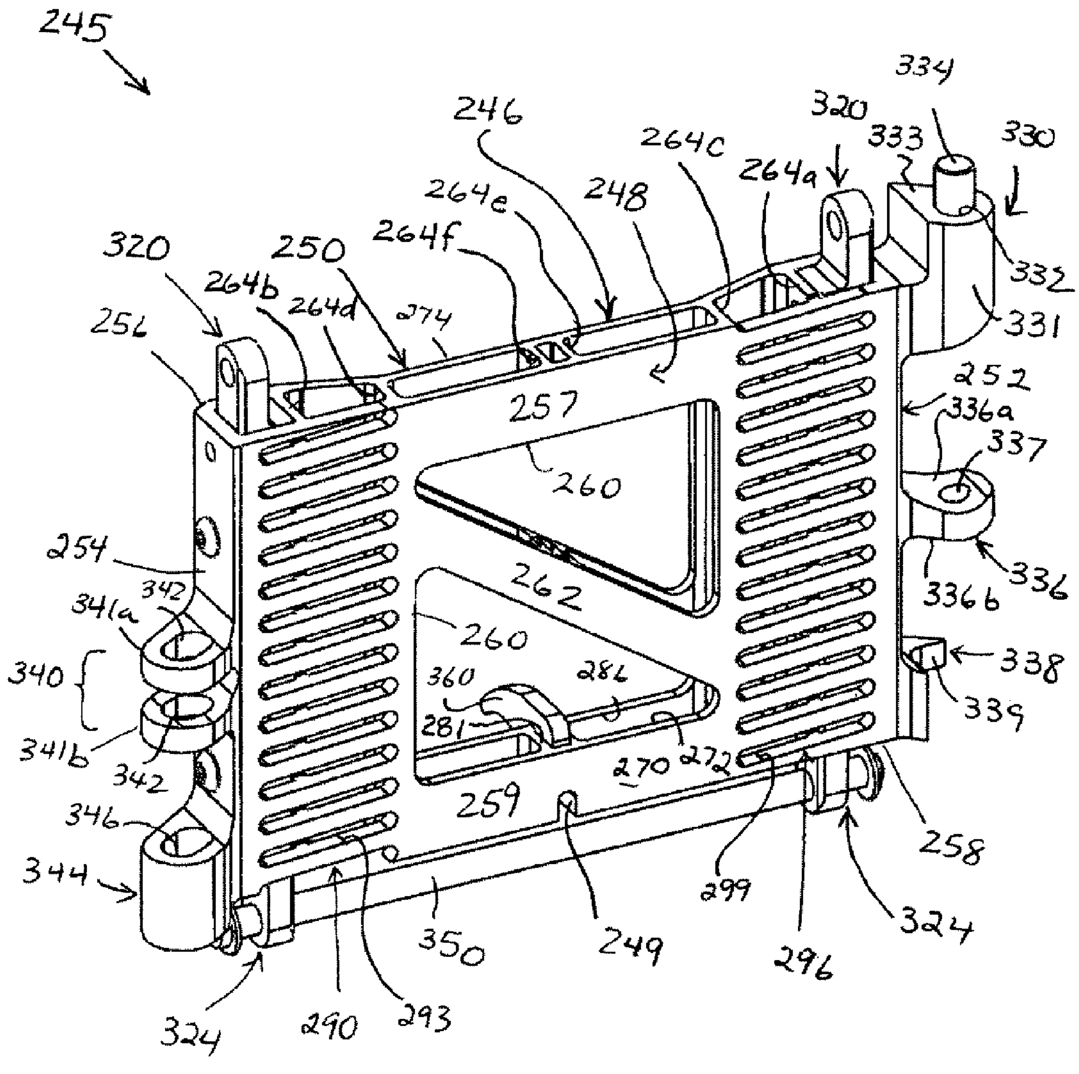
FIG. 11*a* is an isometric view of a surface of an embodiment of a segment used to form a column of the tower assembly.
Figure 11B:
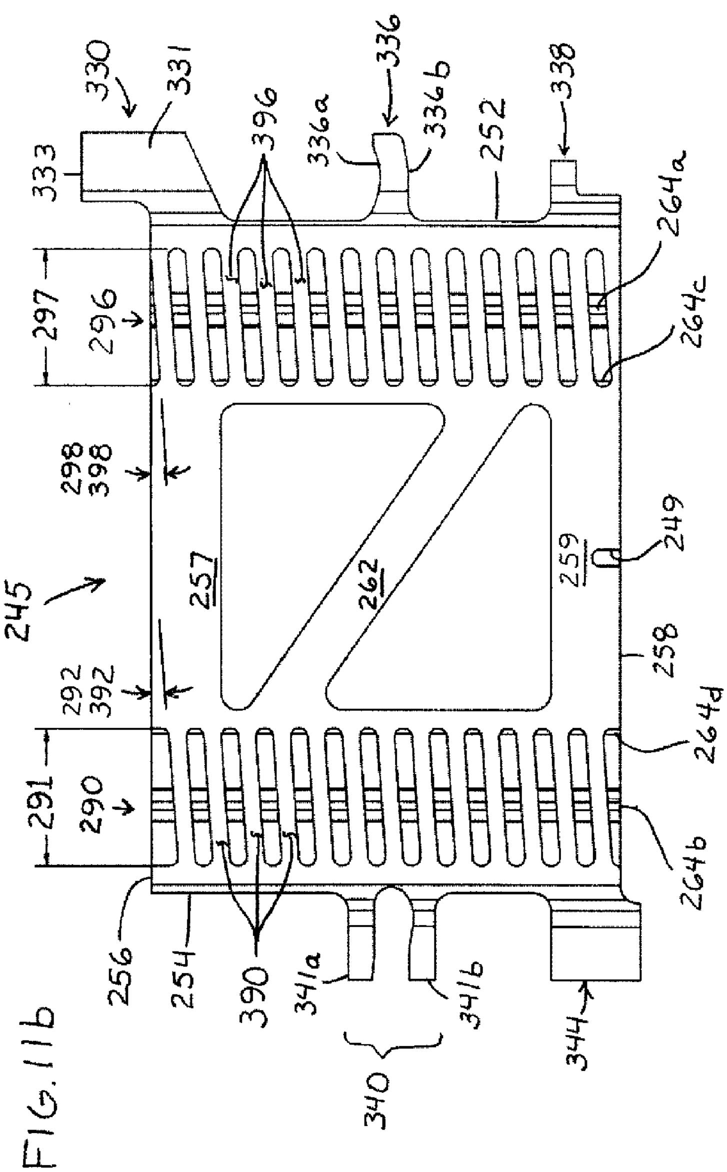
FIG. 11*b* is an elevational view of an embodiment of the segment of FIG. 11*a* without upper and lower pivot support blocks, a pivot shaft, or an upper interconnection peg.
Figure 11D:
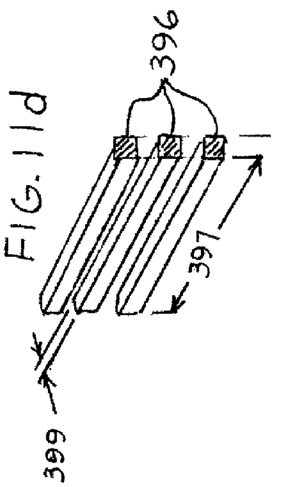
FIG. 11*d* is a partial, perspective, sectional view of another embodiment of some ribs that are formed when drive slots or openings are formed.
Figure 11C:
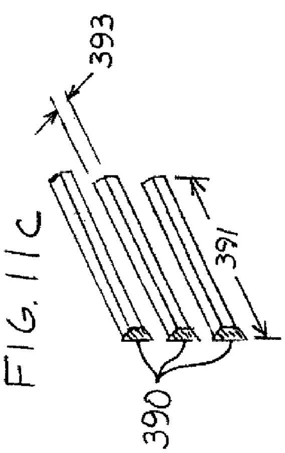
FIG. 11*c* is a partial, perspective, sectional view of an embodiment of some ribs that are formed when drive slots or openings are formed.

Referring now to FIG. 11*a*, the second side wall 254 of each segment 245 may include elements such as engagement members that enable laterally and vertically adjacent segments to be coupled together. Referring now to FIGS. 11*a*, 11*b*, 12, 13*a* and 13*b*, an embodiment of a second side wall 254 (FIG. 12) includes a middle engagement member 340 that is forwardly (or inwardly) angled β (FIG. 13*a*) and which comprises two spaced apart fingers 341*a*, 341*b*. The fingers are configured and arranged to engage and straddle the middle engagement member 336 of a laterally adjacent segment so that it is captured therebetween. In some embodiments, the fingers 341*a*, 341*b* may include curved surfaces that are configured to complement curved surfaces 336*a*, 336*b* of the middle engagement member 336 so that when laterally adjacent segments are coupled together the surfaces of the middle engagement members 336, 340 releasably interlock with each other. The second side wall 254 also includes a lower engagement member 344 that is forwardly (or inwardly) angled β (FIG. 13*a*) and which has a slot 346 that is configured to receive a peg 334 of a laterally and vertically adjacent segment as the segments 245 are coupled together to form a column. In some embodiments the middle engagement members of each side wall may be provided with vertically aligned through holes or apertures 337, 342, into which a peg, a fastener or even a padlock may be inserted so as provide a more permanent structure and/or to strengthen the structure.

Figure 2A:
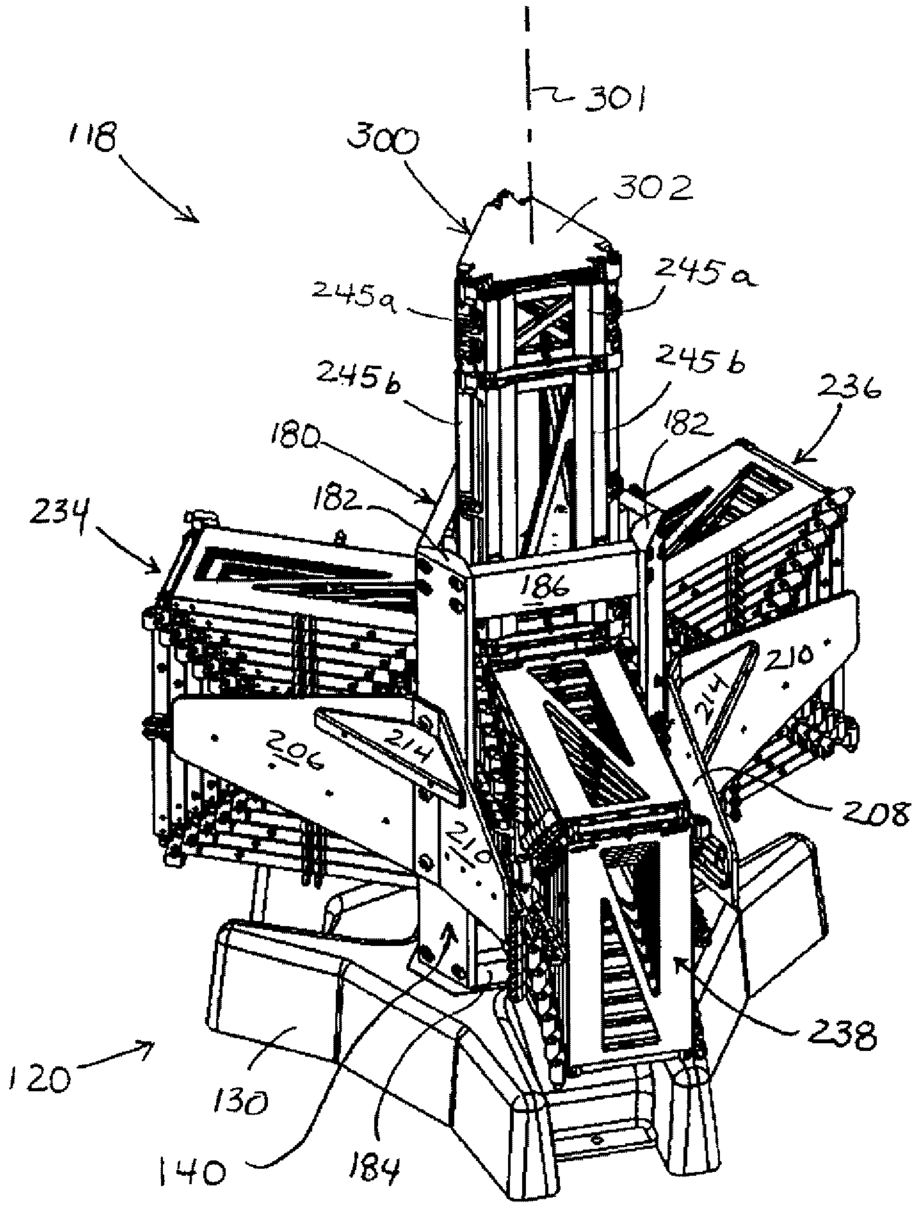
FIG. 2*a* is an isometric view of the embodiment of FIG. 1*a* in which a column of the tower assembly is in a partially extended position.
Figure 19:
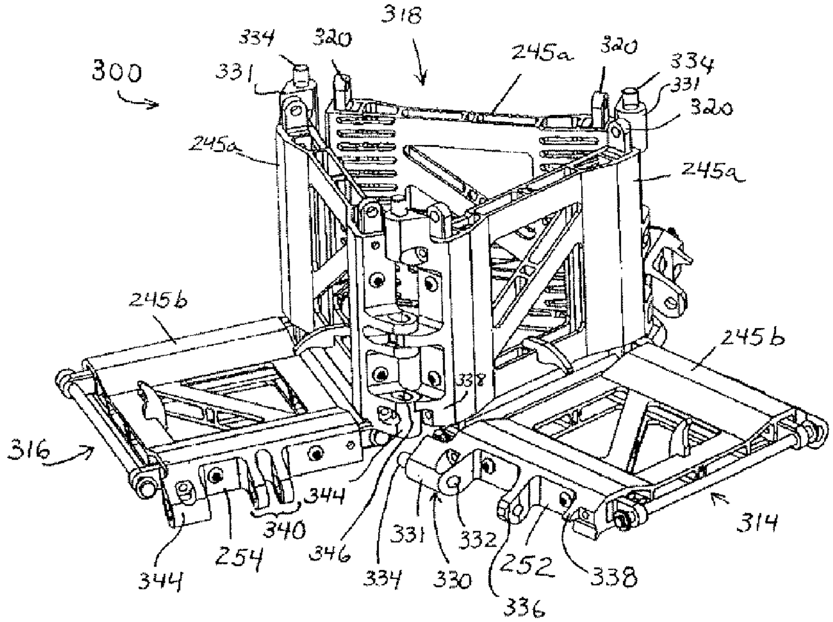
FIG. 19 is a partial, isometric view of three partial chain sections, with upper segments of the sections interconnected with each other into a tower/column configuration and with lower segments of the sections splayed away from each other.
Figure 20:
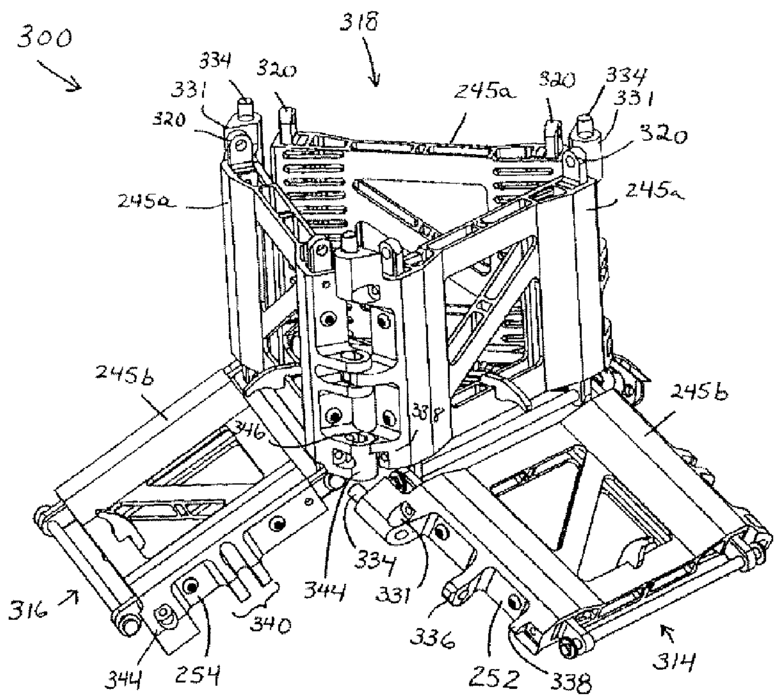
FIG. 20 is a partial, isometric view of the partial chain sections of FIG. 19, wherein the tower has been extended and the lower segments are being positioned for engagement with each other.
Figure 22:
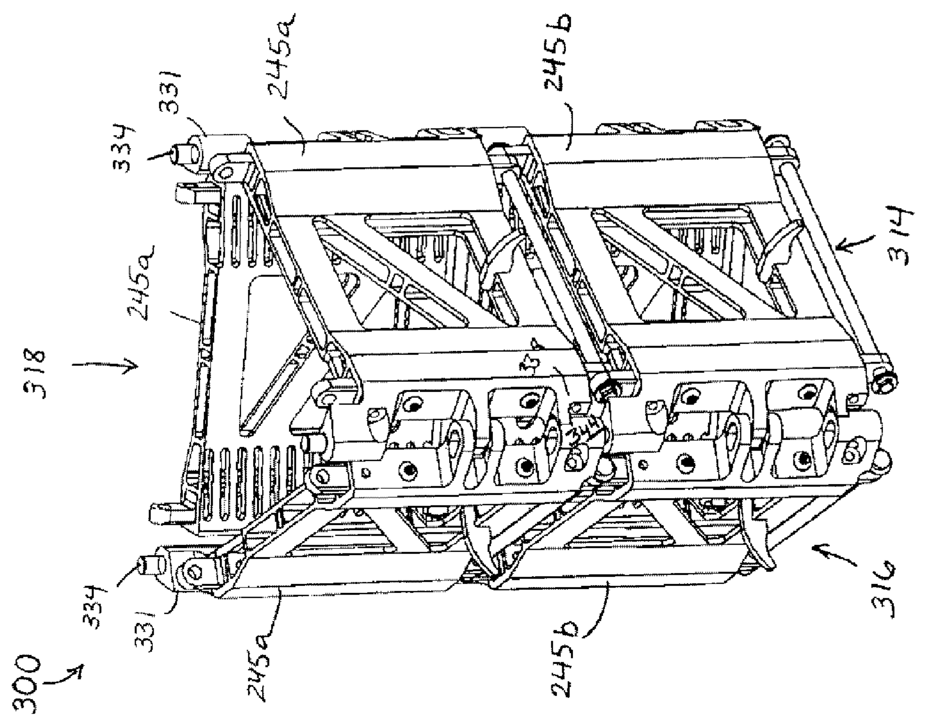
FIG. 22, is a partial, isometric view of the partial sections of FIG. 21, wherein the tower has been extended further and the lower segments have engaged each other.
Figure 21:
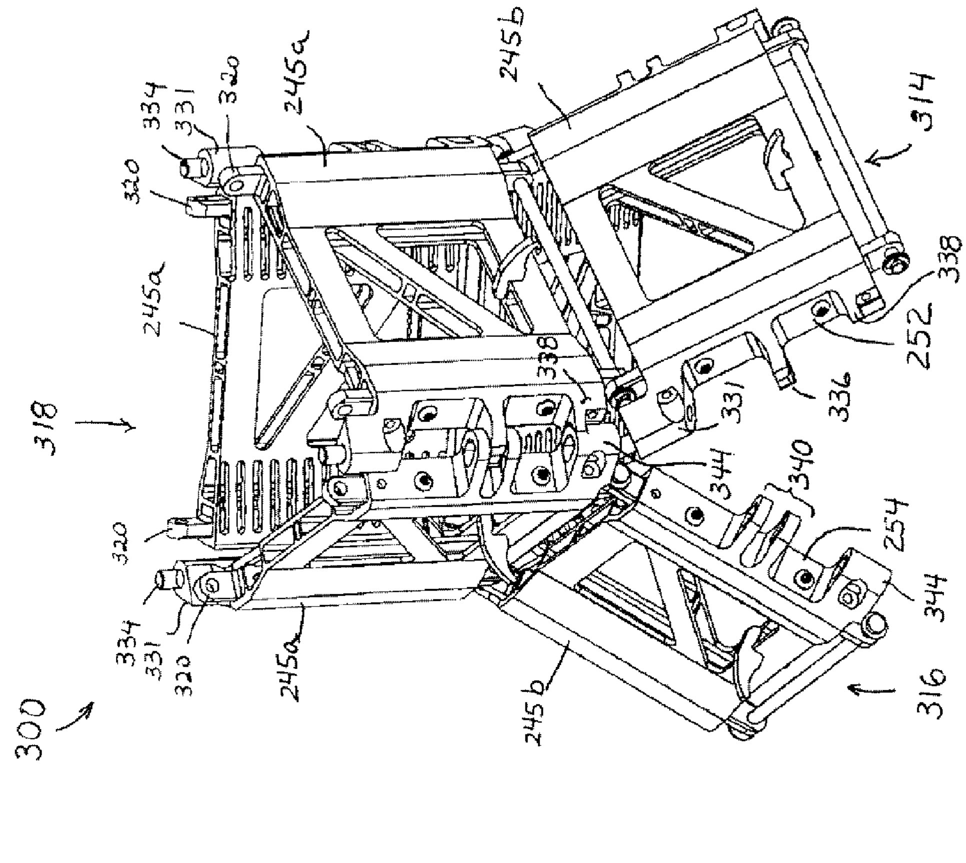
FIG. 21 is a partial, isometric view of the partial chain sections of FIG. 20, wherein the tower has been extended further and the lower segments have begun to engage each other.
Figure 23:
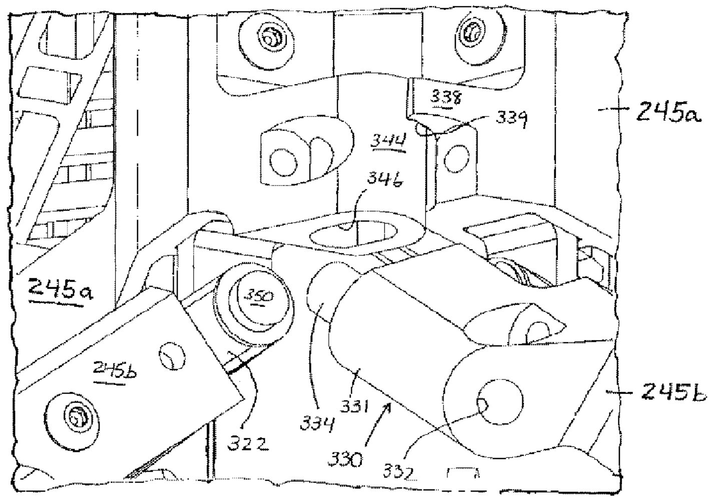
FIG. 23 is an enlarged, partial, isometric view of the segments of FIG. 20 as they are being positioned for engagement with adjacent segments.
Figure 24:
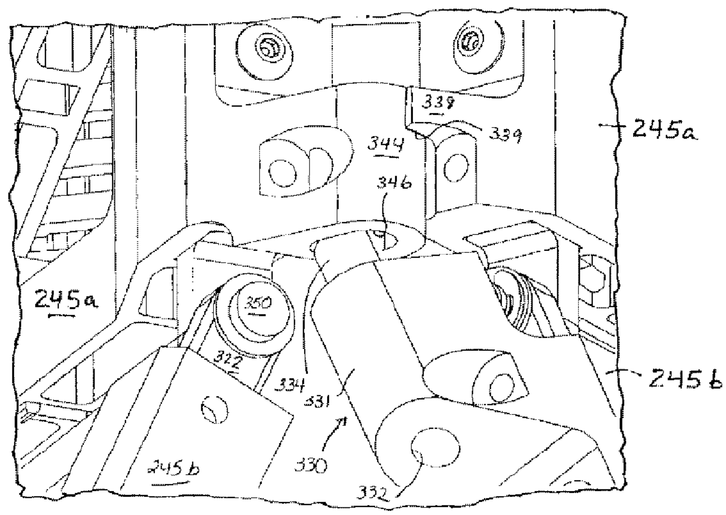
FIG. 24 is an enlarged, partial, isometric view of the segments of FIG. 23, wherein the tower has been extended and the segments have begun to engage each other.

Referring now to FIGS. 19-22, note that the upper end of the starter course of segments 245*a* may be provided with a cap that can be removably attached thereto (see, for example, cap 302 of FIG. 2*a*). A cap such as cap 302 serves to connect and tie the upper ends of the first course of the segments 245*a* together. However, in FIGS. 19-22 everything but three partial chain sections have been omitted to provide a clearer understanding of the interaction between the segments and chain sections. In FIG. 19 the upper ends of the first course would normally be connected to each other by, for example, a cap, while the lower ends of the first course have yet to be connected to each other. As will be apparent from the figures, the lower ends of the first course of the segments will be tied to each other by interaction with the next course of segments 245*b*, as shown in FIGS. 20-22. In operation, the first segment 245*a* of each bale may be simultaneously fed into one of the three portals 187 of the guide assembly 140, where it is engaged by the drive module 141 (see, for example, FIGS. 2*a*, 2*b*, and 3*a*). As each segment translates from a generally horizontal orientation to a substantially vertical orientation, laterally adjacent segments engage each other. Translation of the chain sections and segments (as shown in isolation) are depicted in FIGS. 19-26*e*, and coupling of adjacent segments is as follows. In FIG. 19, segments 245*a* of adjacent chain sections 314, 316, 318 have already been partially interconnected. That is, the upper ends of the segments have already been connected to each other. In addition, the engagement members of the first side wall of segment 245*a* of chain section 314 are coupled to the engagement members of the second side wall of segment 245*a* of chain section 316. Engagement members of the first side wall of segment 245*a* of chain section 316 are coupled to the engagement members of the second side wall of segment 245*a* of chain section 318. And, engagement members of the first side wall of segment 245*a* of chain section 318 are coupled to the engagement members of the second side wall of segment 245*a* of chain section 314.

Figure 2B:
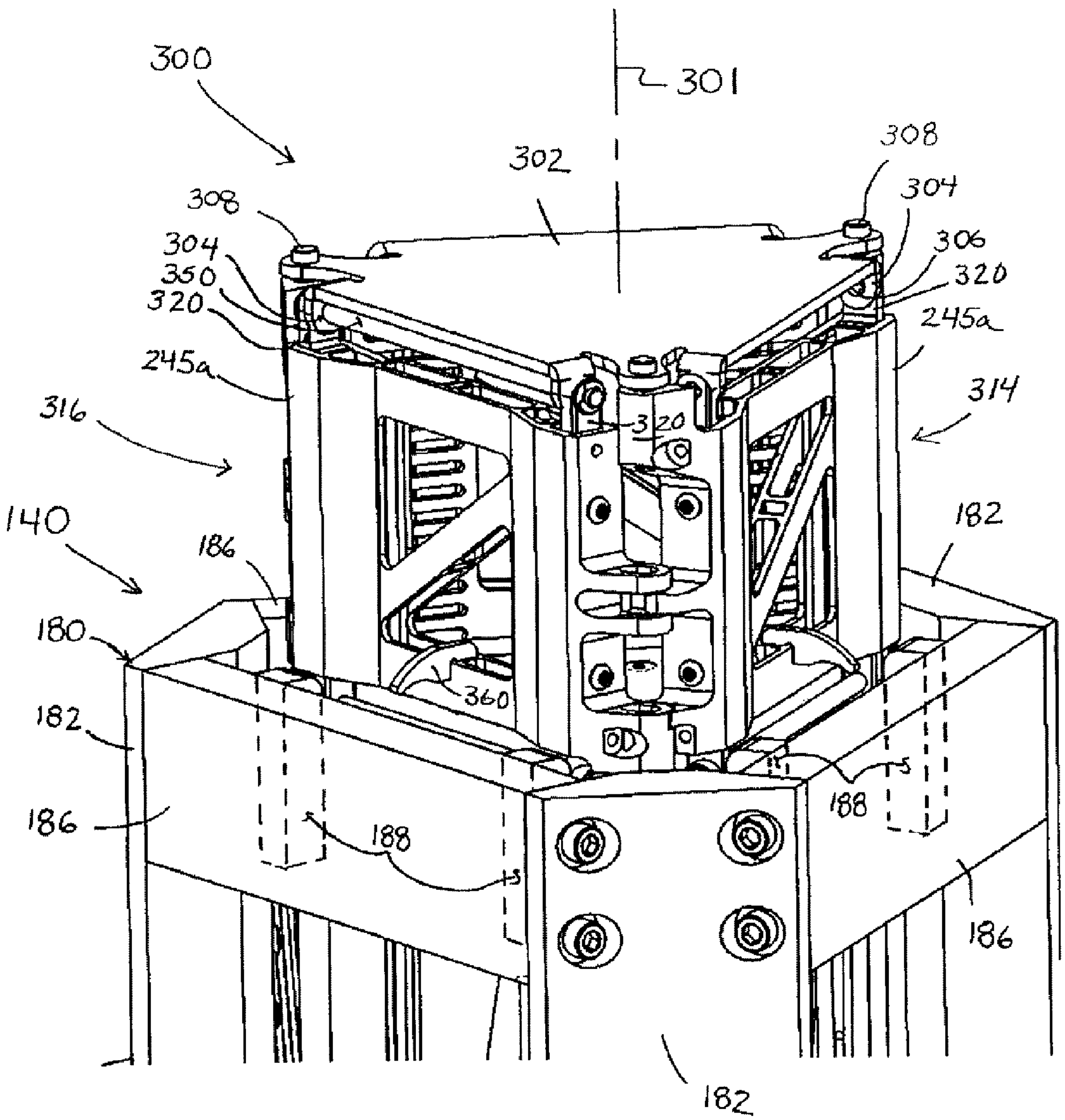
FIG. 2*b* is a partial, enlarged view of the upper end of the partially extended column of the tower assembly of FIG. 2*a;*
Figure 3C:
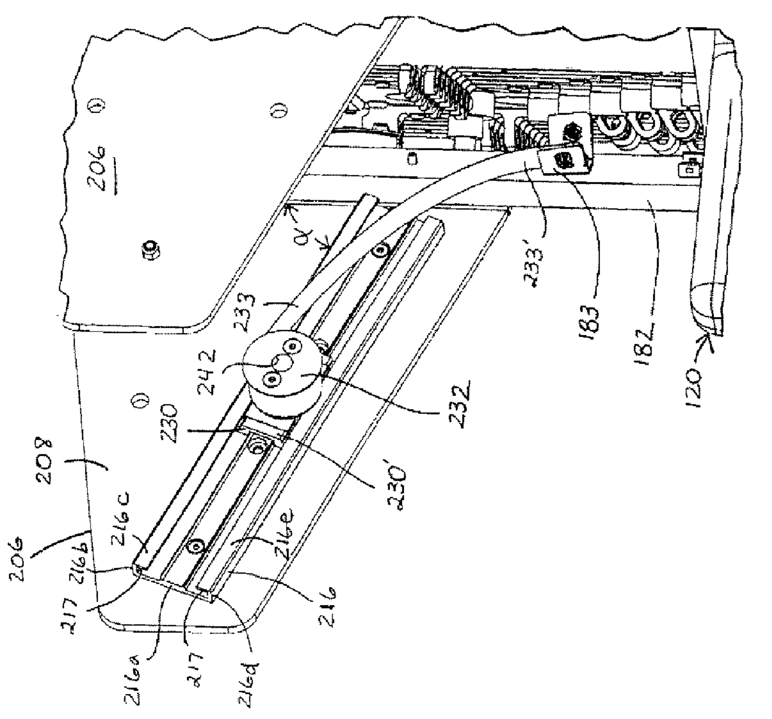
FIG. 3*c* is a partial, perspective view of a portion of the embodiment of a storage and feed arrangement of FIG. 3*b;*

As will be noted, the segments 245*a* represent the starter course of the column 300, and they will be positioned furthest from the guide assembly 140 when the column 300 is extended (see FIG. 3*a*). In some embodiments, this starter course may comprise a preassembled, unitary, rigid frame to which segments of the chain sections are attached. That is, the upper end of the starter course may be provided with a cap 302 that connects the upper ends of the segments together (FIG. 2*b*). Note that with such an embodiment the chain sections will not be able to be fully withdrawn out of the portals 187 of the guide assembly 140.

Figure 25:
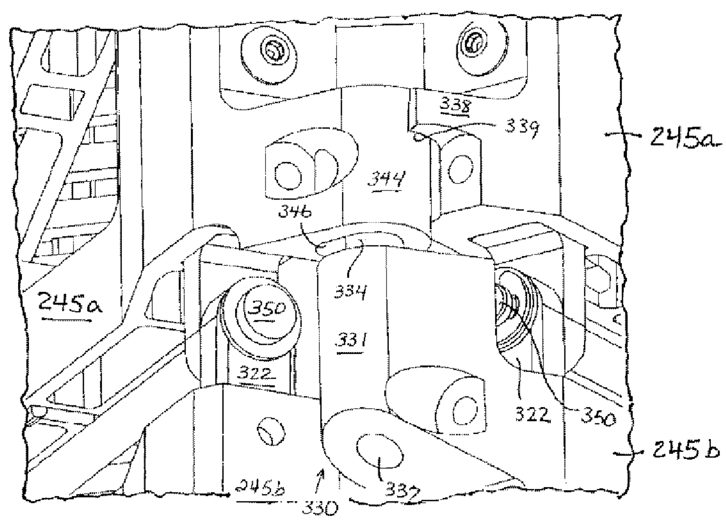
FIG. 25 is an enlarged, partial, isometric view of the segments of FIG. 24, wherein the tower has been extended further and the segments have engaged each other.
Figure 26A:
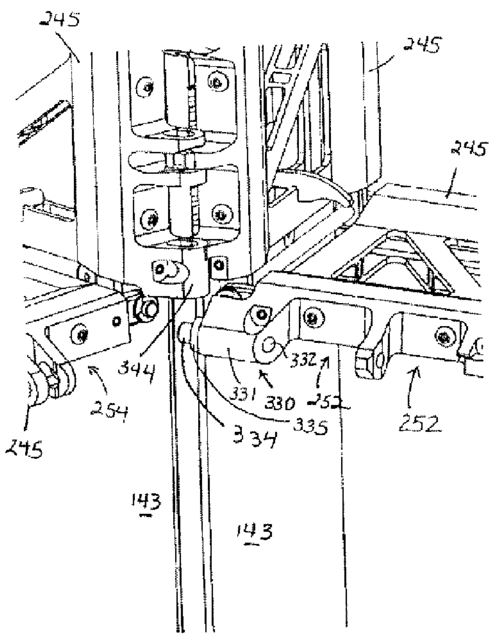
FIGS. 26*a*-26*e* are partial, isometric views of partial sections, wherein a tower that is formed from a first tier of segments is extended to form a tower formed from two tiers of segments.
Figure 26B:
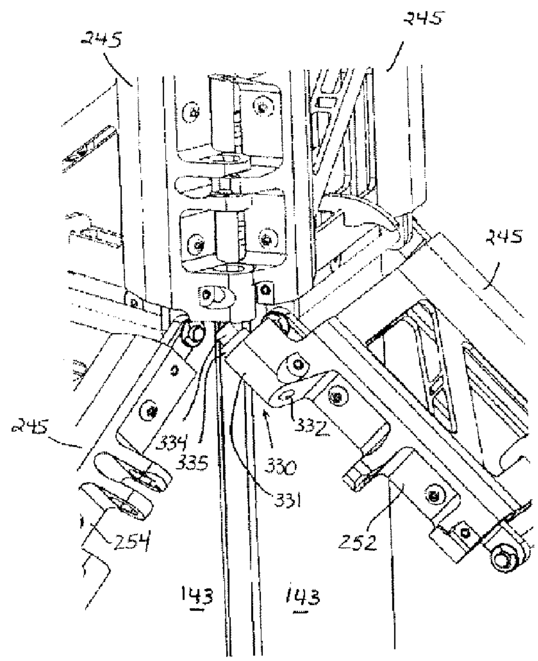
Figure 26C:
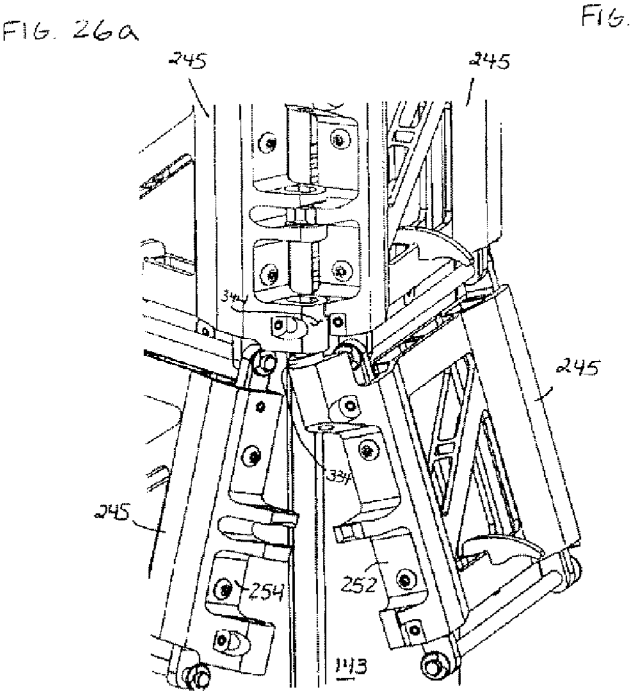
Figure 26E:
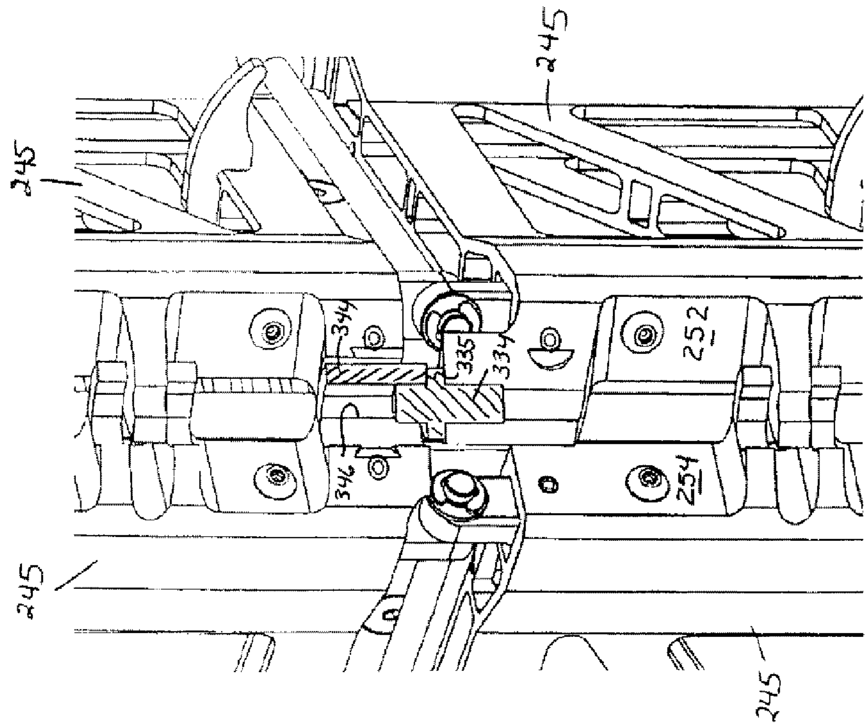
Figure 26D:
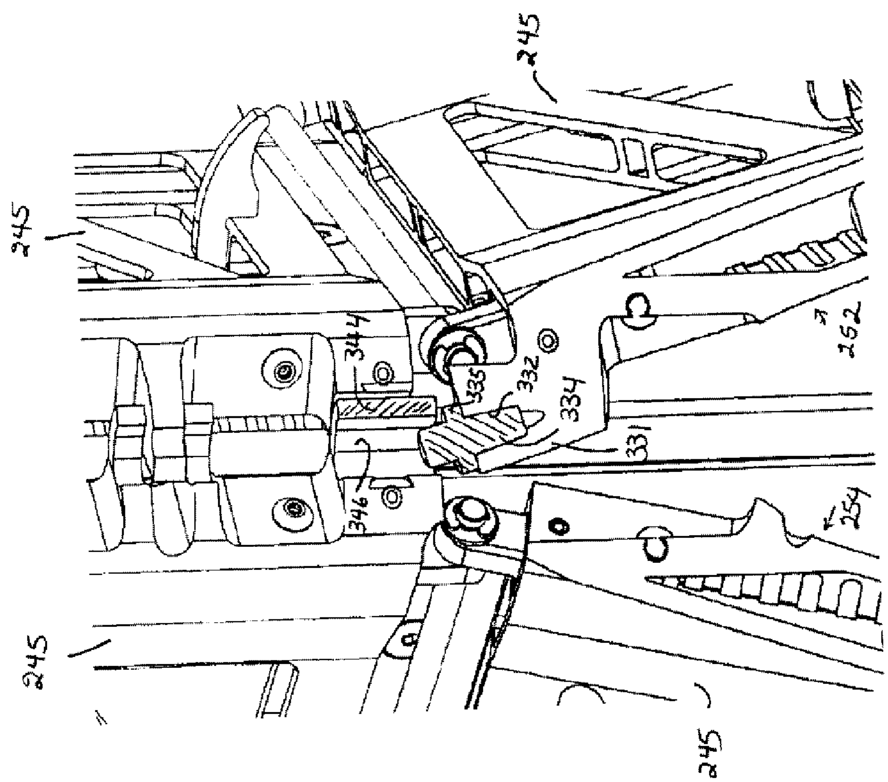

As the starter course 245*a* is engaged by the drive module 141, segments 245*b* (FIG. 19) of chain sections 314, 316, 318 are fed into the portals 187 of the guide assembly 140. In doing so, the orientation of the segments 245*b* translates from a generally horizontal orientation to a substantially vertical orientation. As can be seen in FIGS. 20, 21, 23 and 24, as the segments 245*b* are translated, the pegs 334 are brought into registry with slots 346 of the lower engagement members 344 of the segments of the preceding course of segments, which in these figures are labeled as segments 245*a*. As the segments continue to be coupled together as shown in FIGS. 22 and 25, the engagement members of the first and second side walls are brought into contact with each other. As mentioned above, when a peg 334 engages the angled slot 346 of a vertically and horizontally adjacent segment, the peg 334 will snug the lower engagement member 344 (FIG. 11*a*) of segment 245*a* of a chain section up against the vertical or stop surface 339 of lower engagement member 338 of a segment 245*a* of a laterally adjacent chain section.

When the column is retracted and the linked sections are formed into bales 234, 236, 238, the bales can be secured in their compacted state by one or more retaining members or bale latches 360, an embodiment of which is most clearly depicted in FIGS. 17*a*, 17*b*, 17*c*, 17*d*, 18*a* and 18*b*. Generally, the retaining member or bale latch 360 (FIGS. 17*a*-17*d*) comprises a body 362 (FIG. 18*a*) having an attachment section 364 and an engagement section 366. More particularly, the body 362 has a variable lateral width 361 (FIG. 18*b*), is generally triangularly shaped and includes a first edge surface 368, a first end 370 that terminates with a rounded tip, a second edge surface 372 and a second end 374. The attachment section 364 comprises a first leg 376 having a portion that adjoins the second end 374, and a second leg 382, with the legs configured to be connected to a portion of a segment 245. The legs 376, 382 are generally parallel with each other and are spaced apart from each other by a first notch 380. Preferably, at least one of the legs is resilient and can be temporarily deflected by flexing towards the other leg. In one embodiment, one of the legs 376 may include a protrusion 378 that is used to urge the other leg 382 into contact with a portion of the segment. In some embodiments, one of the legs 382 may include a hook or catch 384 that can engage a portion of the segment to retain the bale latch 360 to the segment. In some embodiments, the attachment section 364 may be inserted into an aperture or socket located in the lower crossbeam 259, and the catch 384 engages an edge of the first panel 248 at the bottom end 258 (FIGS. 11*a* and 12) of the segment 245; for example, a bottom edge of second panel 250. In some embodiments, the latch 360 is received within an aperture or socket 281 (FIGS. 11*a* and 12) formed by the first panel 248, the second panel 250, web 264*e* and web 264*f* (see, FIGS. 13*a*, 13*b*). In other embodiments, the protrusion 378 may be replaced with a hook or catch 379 that engages an edge of the second panel 250 of a segment 245. With such an embodiment, it is preferred that the catches or hooks 384, 379 point in opposite directions. With such an embodiment, it is preferred that the legs 376, 382 are both flexible and normally splay away from each other. With such an embodiment, the free ends of legs 376, 382 would be compressed towards each other prior to insertion into the aperture, then the bale latch 360 would be inserted and seated in the aperture in a snap-fit manner as the catches 379 and 384 engage the edges of the front and rear panels. The retaining member or latch 360 may be provided with a second notch 386 that is sized to receive a portion of the second panel, preferably a portion of the lower crossbeam 259 of the second panel 250, and with the notch serving to further secure the latch 360 to the segment. The first edge surface 368 spans portions of both the attachment section 364 and engagement section 366 of the body 362, beginning with the tip of the first end 370 and extending to the second end 374. In some embodiments, the first surface 368 may be generally convex and curve outwardly with respect to the legs.

Figure 18B:
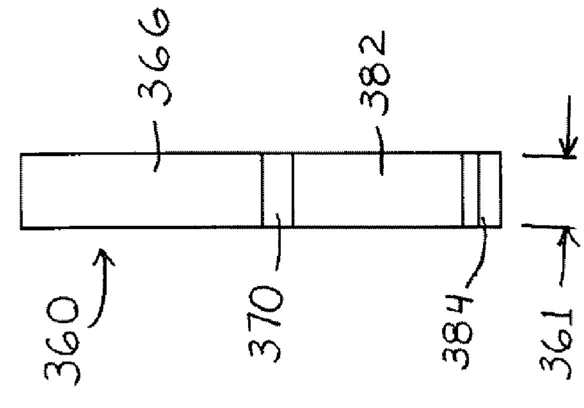
FIG. 18*b* is an end view of the bale latch of FIG. 18*a;*
Figure 18A:
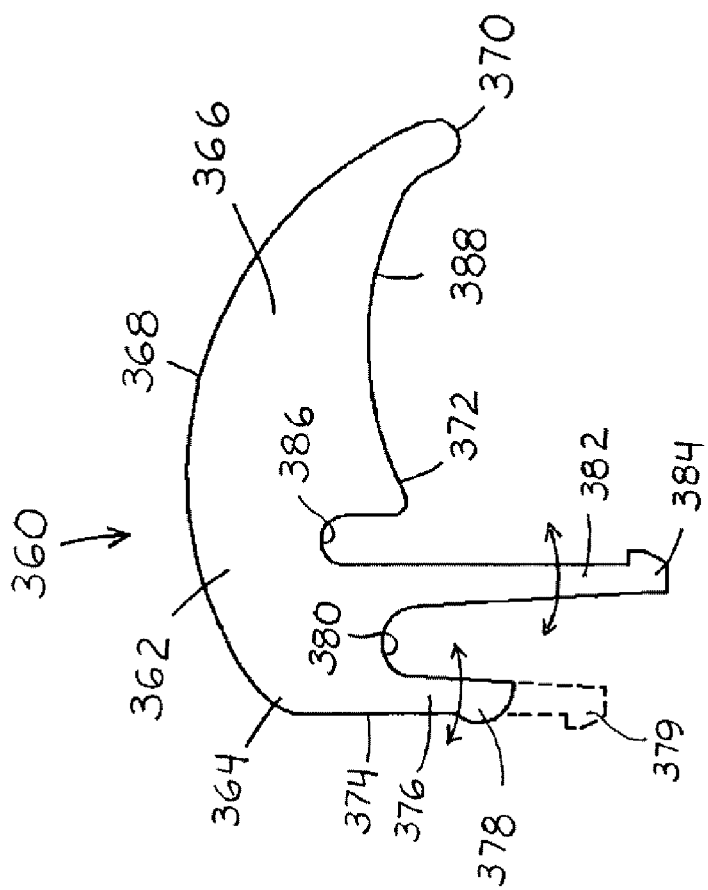
FIG. 18*a* is a side elevational view of the bale latch of FIG. 17*a;*

Referring again to FIG. 18*a*, an inner pivot shaft contacting surface 388 of second surface 372 begins at the tip of the first end 370 and terminates at the second notch 386. In some embodiments, the inner, pivot shaft engaging surface 388, which engages a pivot shaft 350 (FIG. 11*a*) of an adjacent hinge connection on the bale, is generally concave and curved inwardly. As will be noted, the innermost segments 245 that are carried near the center of the bale frame 220 do not overlay other segments. So, for these few initial segments the engaging surfaces 388 of the bale latches 360 will not engage adjacent pivot shafts 350. Instead, the engaging surfaces 388 will engage the rods 226 of the bale frame 220 (see, for example, FIGS. 17*a*-17*d*). When installed on a segment 245, the engagement section 366 of the bale latch 360 will project outwardly with respect to the second panel 254, and inwardly with respect to the center of the bale. In some instances, this may cause the tip of the first end 370 to catch on the lower crossbeam of an adjacent segment when the chain section is being wound or unwound upon the bale frame 220. In order to minimize this possibility, a notch or passageway 249 (FIG. 11*a*) may be provided in the bottom of the lower crossbeam 259, at the first panel 248. The retaining member or bale latch may be formed from thermo-plastic material such as acetal, polyacetal or polyformaldehyde (POM), or for example DELRIN®. In some embodiments, the retaining member or bale latch may be extruded and cut to a particular lateral width 361 (FIG. 18*b*). In some embodiments, there can be a plurality of latches for each segment. In some embodiments, bale latches may be inserted in the spaces between web pair 264*d* and 264*f*, and/or between web pair 264*c* and 264*e*.

Having described some of the structural details of embodiments of the tower assembly, its operation can be understood best as follows. First, three elongated linked sections are constructed from a plurality of the individual segments 245 such as those shown in the embodiments as depicted in FIGS. 1*a*-6, 11*a*-13*b*, 15*a*-16, 19-22. These individual segments 245 are pivotally linked together to form the linked sections using the pivot blocks 320, 324 and pivot shafts 350. The number of segments in any one linked section will determine the maximum height to which the column can be extended. In general, as many as 10-60 or more segments can be pivotally linked together to form an individual linked section. It should be noted that not all of the segments depicted in FIGS. 1*a*, 1*b*, 2*a*, 3*a*, 3*b*, 4*a*, 4*b*, 5, 6, and 16, depict sets of drive member engagement slots 290, 296. However, substantially all of the segments of the embodiments of the tower assemblies will have drive member engagement slots 290, 296 and/or ribs 390, 396 that can be engaged by drive members 178 (best depicted in FIGS. 11*a*, 11*b*, 13*b*, 15*a* and 19-22).

Each linked section can then be wound onto a bale frame 220 such that they assume bale forms 234, 236, and 238. Each bale is rollingly supported on a center shaft 228 that is connected to retractable biasing elements 232 and followers or shoes 230, with the followers 230 slidingly received by guide rails 216, 218 located on inner surfaces 208, 212, of wings 206 and 210. As will be understood, the retractable resilient spring-like elements 230 may be omitted under some use conditions, if desired.

To form a column, the segments 245 from each of the linked sections are simultaneously fed from the bales into the guide assembly 140 and between the outer frame 180 and the drive module 141 at portals 187. As the drive assembly 165 of the drive module 141 engages each of the segments, the segments engage each other to form the column 300, and the column 300 is extended out of a triangularly shaped, vertically opening slot defined by the drive module 141 and the outer frame 180 at the upper end of the guide assembly 140.

The tower assemblies described above are lightweight and portable, the smallest versions of which may be carried by hand. The columns of the tower assemblies can be rapidly extended and retracted so that the tower assembly can be quickly deployed and redeployed to different locations, as needed. The column of the tower assembly is quite strong and can effectively resist lateral forces such as wind. The column of the tower assembly can be used for many purposes, such as surveillance, communication, illumination, etc. and can provide a platform that supports a variety of equipment.

Figure 27A:
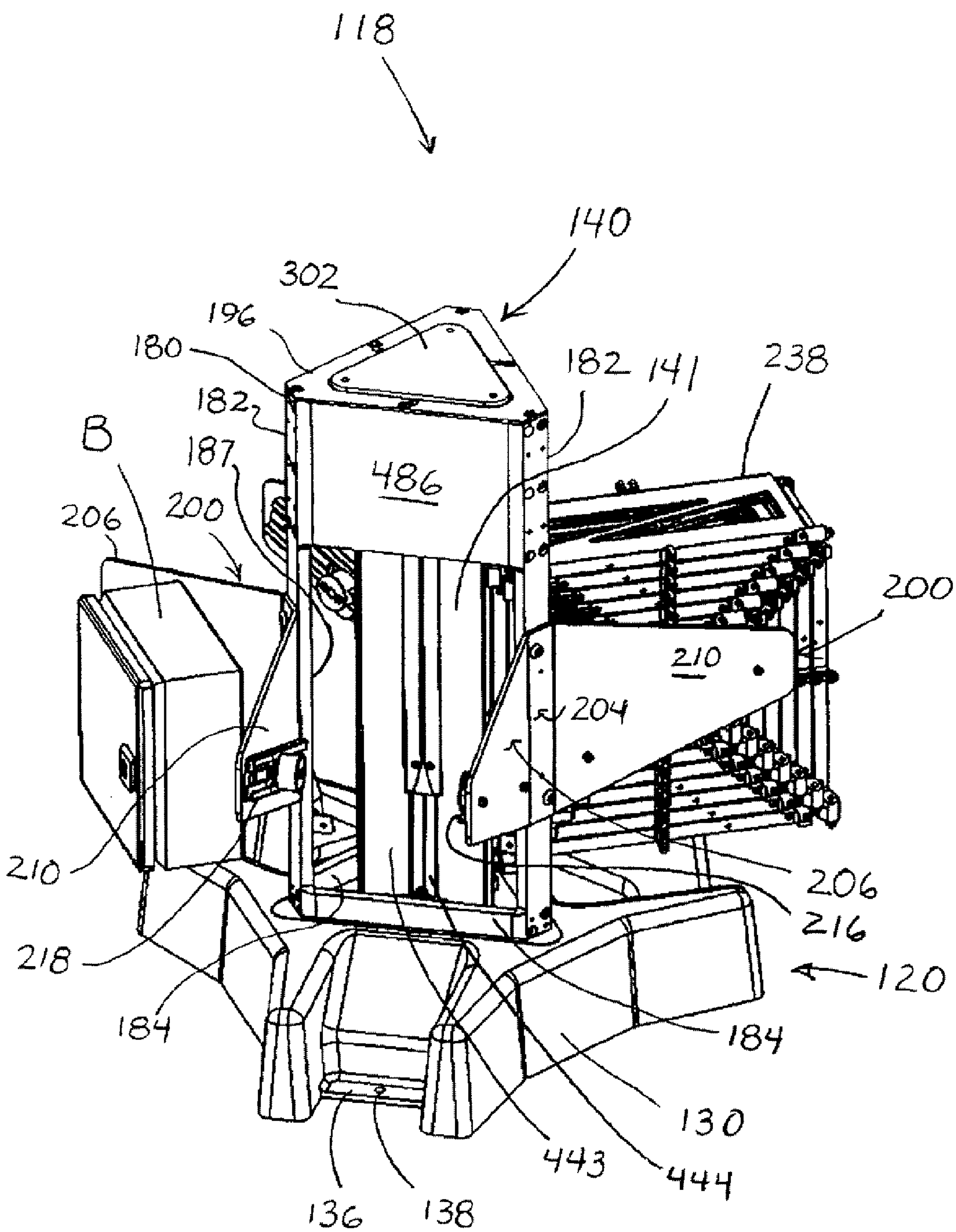
FIG. 27*a* is a partial, perspective view of an embodiment of a tower assembly that is in a fully retracted position.
Figure 27B:
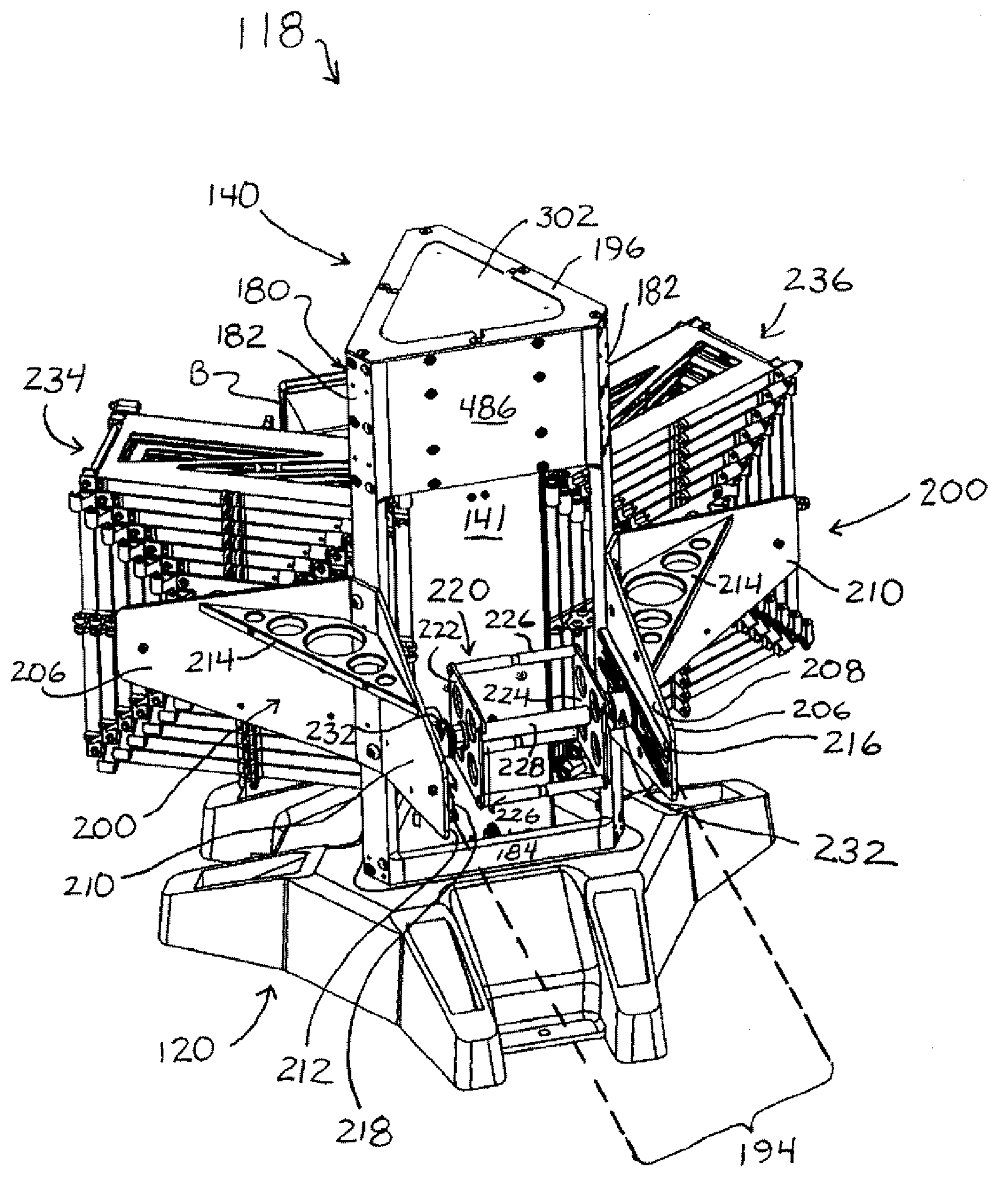
FIG. 27*b* is another partial, perspective view of an embodiment of a tower assembly that is in a fully retracted position.
Figure 27C:
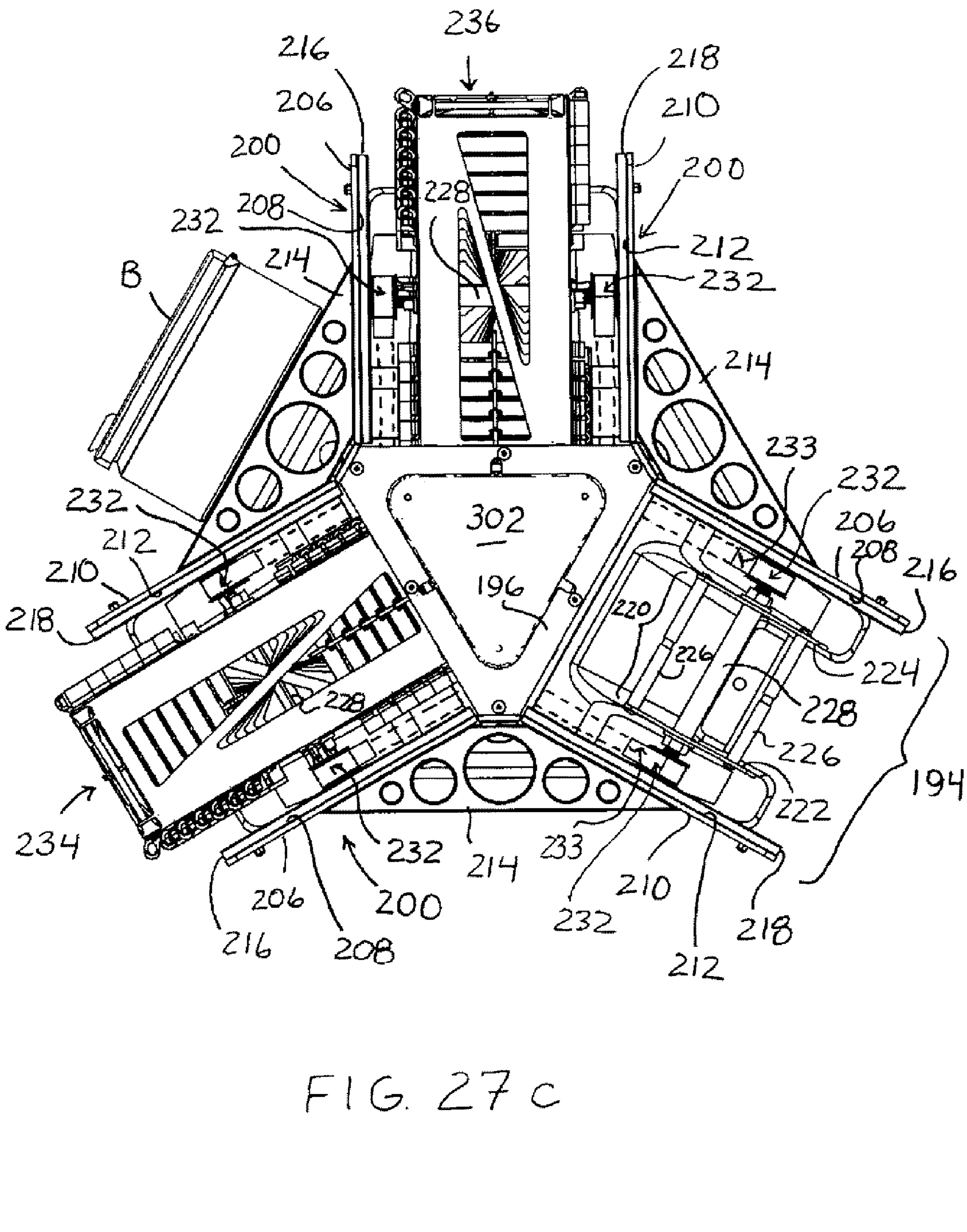
FIG. 27C is a top plan view of the tower assembly of FIG. 27*b;*

With general reference to FIGS. 27*a*-30, embodiments of a guide assembly 140 that comprises a drive module 141 and an outer frame 180 are shown. With reference to FIG. 27*a*-27*b*, an illustrative embodiment of the outer frame 180 (sometimes referred to as a reaction ring) is shown. The outer frame or reaction ring 180 includes a plurality of support posts 182. As with a previously described embodiment, each support post 182 includes an inner facing surface, an outer facing surface, an upper end, a lower end, and angled side surfaces. In some embodiments, the support post may be rigidly connected to the inner ends of rail guides 216, 218 (see also FIG. 8). The support posts 182 are connected to each other by lower brace members 184 and upper brace members 486, which together define a portal 187 that can receive segments of chain sections, as the chain segments are fed into a space defined by the drive module 141 and the outer frame 180. Some embodiments of the lower brace members 184 may include opposing ends that are configured to abut the side surfaces of two posts 182. As shown in FIGS. 27*a* and 27*b*, each end of the lower brace member 184 may be provided with a threaded aperture that can receive a fastening element that is used to connect the lower brace to the posts 182. The upper brace members 486 are connected to the support posts 182 in a similar, though more robust manner. The upper brace members 486 are considerably wider than the lower brace members so that the upper brace member 486 is able to substantially overlay and protect portions of the linear drive members 178 that extend through notches 445 (FIG. 28) in the side panels or side walls of the drive module 141. This arrangement allows additional fastening elements to be used, and results in a stronger outer frame (or reaction ring) 180. As shown in FIGS. 27*a* and 27*b*, each end of an upper brace member 486 can include more than two fastening elements to connect the upper brace member to the support post 182. As with a previously described embodiment, each upper brace member 486 may include one or more vertically aligned slide rails 188 that are used to guide the tower or column as it is being extended and retracted from vertically opening slots located at the end of the guide assembly (see, FIG. 8).

With reference to FIGS. 28, 29 and 30, an illustrative embodiment of a drive module 141 of a guide assembly 140 is shown. With this embodiment, the drive module 141 has a housing comprised of a plurality of side panels 443, which are removably secured to an inner frame 142 by one or more fastening elements such as set screws or countersunk screws (not shown). Generally, some embodiments of the side panels 443 may be configured to operatively engage a segment 545 as it is being retracted or extended. More specifically, one or more side panels 443 may include a channel or slot 448 that is configured to operatively engage a projection that extends from a segment 545. The channel or slot 448, which extends inwardly and which is substantially parallel to the longitudinal axis of the drive module 141, is configured and arranged to slidingly receive and guide a projection 676 of a retaining member 660 that is operatively connected to a segment 545 (see, also, FIGS. 33 and 34). In some embodiments, the channel may have a cross-section that includes a bottom wall and side walls that are substantially parallel to each other. In some embodiments, the channel may have a cross-section that includes side walls that converge towards each other as they extend away from the base, or which diverge away from each other as they extend away from the base. With channels having convergent side walls, a projection that extends from a segment could be configured with similarly configured walls, so that the projection may be slidingly retained by the channel. In other embodiments, the channel may have a generally circular cross-section with convergent or divergent ends. In operation, when a segment 545 is unwound from a bale to form a column and brought into engagement with the drive unit 141, the projection 676 of the retaining member is fed into the channel 448 at bottom end 450 and slid therealong until it exits a top end 452 of the channel 448. When a column is retracted and a segment 545 is wound onto a bale, the interaction between the projection 676 of the retaining member and the channel 448 of the side panel is reversed. That is, the projection is fed into the channel 448 at top end 452 and is slid therealong until it exits the bottom end 450. In some embodiments, the bottom and top ends of the channel may be flared to facilitate initial operative engagement between a segment and a side panel. In general, this operative engagement between the segment and the side panel has been found to add rigidity to the tower structure as it is being extended or retracted, and to an erected column as a whole. As depicted in an illustrative embodiment, the channel or slot 448 is formed in an insert 446, which fits into a recess 444 in a side panel 443. In some embodiments, the insert may be formed from plastic material, such as an acetal polymer, HVP-13, DELRIN® AF. In other embodiments, materials such as Nylon, polyurethane, polyimide, PPS or PVC may be used. In some embodiments, a channel may be formed by two parallel strips of material.

In alternative embodiments, the channel or slot 448 of some side panels may be omitted and replaced with a rail that is substantially parallel to the longitudinal axis of the drive module 141, and the projection of the retaining member may be omitted and replaced with a slotted shoe portion that rides along the rail. As will be understood, some embodiments of a side panel may include more than one set of channels and projections, if desired. As with previous side panels such as depicted in FIGS. 9*a* and 9*c*, each side panel 443 may include elements such as opposing side notches 445 (FIG. 28) that are configured to allow portions of linear drive members 178 to extend outwardly beyond the outer surfaces of the side panels.

Referring again to FIGS. 28-30, an embodiment of the inner frame of a drive module 141 may include an upper or first mounting block 144', a mid or second mounting block (not shown), a mid or third mounting block (not shown) and a lower or fourth mounting block (not shown) (see, for example, FIGS. 9*c*, 9*d*, 10*a* and 10*b*). As shown, the first mounting block may be provided with a notch 152' that is configured to receive side wall embodiments 443 that include an insert 446 with a channel or slot 448. As will be understood, the second and subsequent mounting blocks may also be provided with similar notches so that the insert 446 can extend partially or along the entire length of the drive module 141.

Figure 31:
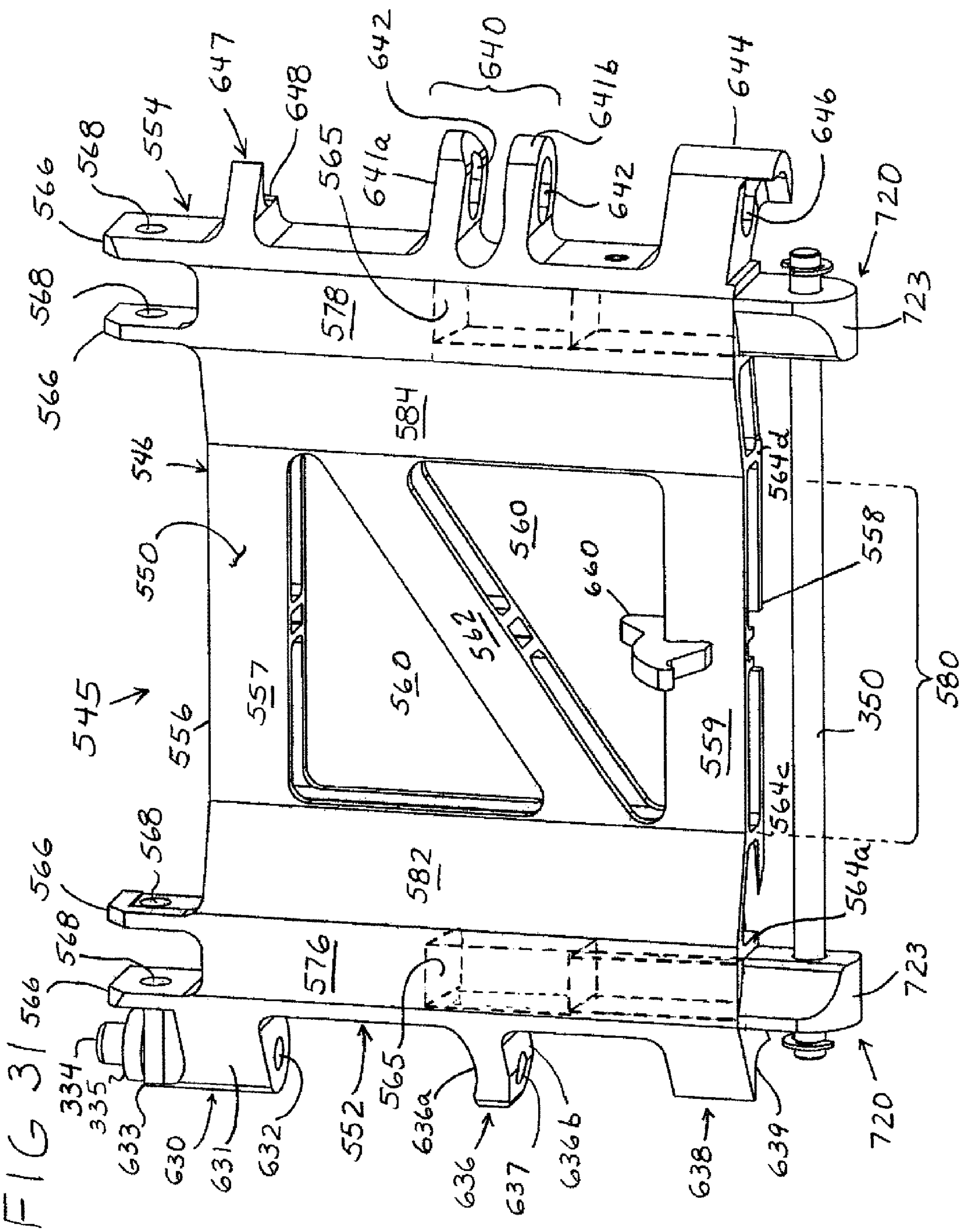
FIG. 31 is a perspective view of the outwardly facing surface of the segment depicted in conjunction with the drive module of FIG. 30, and an embodiment of pivot support blocks and a pivot shaft connected thereto.
Figure 32:
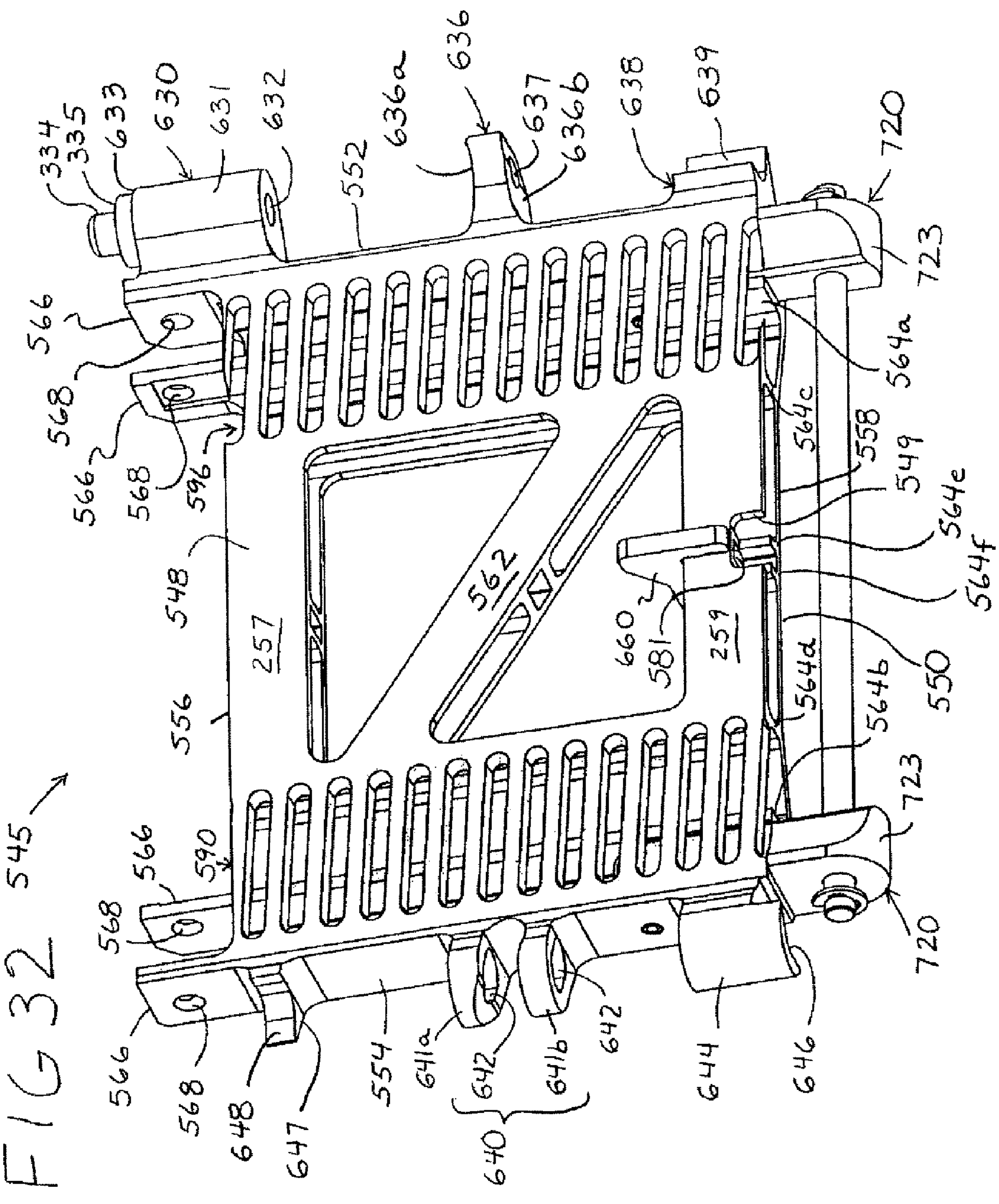
FIG. 32 is a perspective view of the inwardly facing surface of the segment of FIG. 31.
Figure 33:
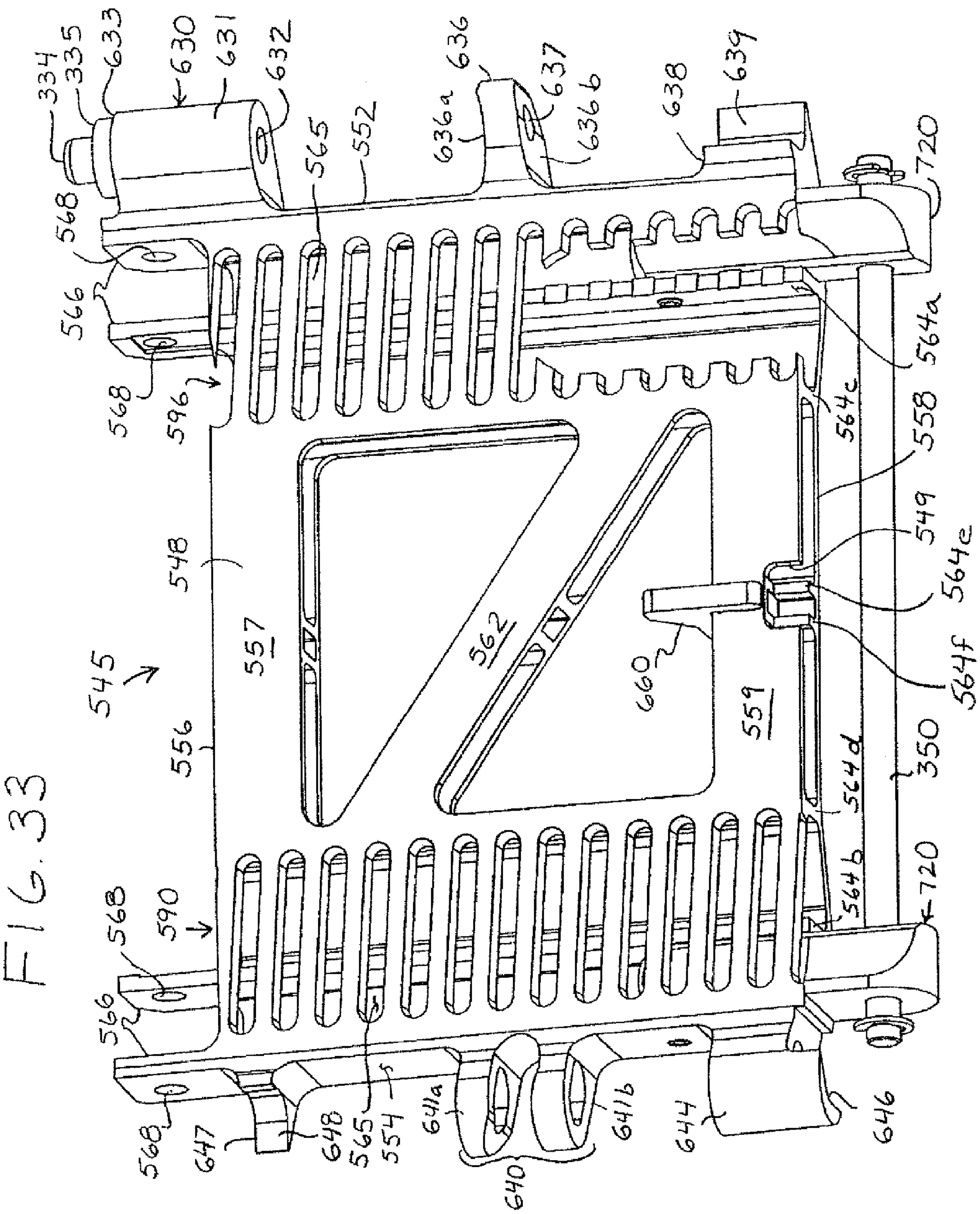
FIG. 33 is a partial, perspective view of FIG. 32, in which some of the ribs that define a slot set have been removed to reveal a pivot block and a reinforcing web therebelow.

Referring generally to FIGS. 31-33, each of the individual segments 545 includes a substantially rigid body 546 that includes a first panel 548, a second panel 550, a first side wall, 552, a second side wall, 554, a top end 556 with an upper crossbeam 557, and a bottom end 558 with a lower crossbeam 559. The body 546 may include a center opening 560 and may include a diagonal brace 562. In some embodiments, the panels 548, 550 of the body are spaced apart from each other by one or more webs 564*a-f* (see also, for example, FIG. 13*a*). In some embodiments, the webs 564*a-f* may be substantially parallel to each other. In some embodiments, the webs 564*a-f* may be spaced at intervals between the side walls 552 and 554, and formed by an extrusion or pulltrusion process. In embodiments that are formed by the extrusion process, the center opening 560 may be formed by removal of material, such as by machining.

With reference to FIG. 31, the second panel 550 includes an outer surface and an inner surface. In some embodiments, the outer surface may include spaced-apart raised portions 576, 578 that are adjacent the side walls 552, 554, respectively, and which extend from the top end 556 to the bottom end 558. The raised portions 576, 578 are configured and arranged to engage the slide rails 188 of upper brace members 186 of the outer frame 180 (FIG. 8) as the segments 545 are extended and retracted by the guide assembly 140. The second panel 550 may also include a recessed portion 580 and transition portions 582, 584 that connect the recessed portion 580 to the raised portions 576, 578. When a retaining member 660 is installed on a segment 545 (FIGS. 34 and 35), the engagement section 666 will project outwardly with respect to the second panel 550, and inwardly with respect to the center of the bale. In some instances, this may cause the tip of the first end 670 to catch on the lower crossbeam of an adjacent segment when the chain section is being wound or unwound upon the bale frame 220 (FIGS. 15*a*-17*d*). In order to minimize this possibility, a notch or passageway 549 (FIG. 33) may be provided in the bottom of the lower crossbeam 559, at the first panel 548.

With reference to FIGS. 32 and 33, the first panel 548 includes a plurality of linear drive openings that extend transversely between the side walls 552, 554. In some embodiments, the drive openings are in the form of parallel slots that are arranged in columns that extend from the top end 556 to the bottom end 558. In some embodiments, the slots (which may define ribs therebetween) have lengths that are defined by the side walls and webs. In an illustrative embodiment, the drive openings may include a first set of transverse slots 590 (FIG. 32) and a second set of transverse slots 296 (FIG. 32). In the illustrative embodiment, the lengths of the first set of slots 590 are defined, generally, by side wall 554 and web 564*d* and the lengths of the second set of slots 596 are defined, generally, by side wall 552 and web 564*c*. In some embodiments, one or more of the ribs defined by the slots 590 and 596 may be reinforced by webs 564*a* and 564*a*. In some embodiments, the slots are formed by machining, with the slots 590, 596 defining ribs (see, for example, FIGS. 11*c*, 11*d*).

Referring now to FIGS. 31-33, the first side wall 552 will now be discussed. An embodiment of a first side wall 552 includes an upper engagement member 630 that is angled forwardly (or inwardly) relative to the surface of the first panel 550, and which has a peg carrying portion 631 that may extend above the top end 556. The peg carrying portion includes an aperture 632 that receives a peg 334 that extends above the segment 545 in a vertical direction. In some embodiments, the peg 334 may be formed from plastic material such as acetal, polyacetal or polyformaldehyde (POM), and press-fitted into the aperture 632. Other embodiments of the peg 334 may include an external thread that can engage an internal thread in the aperture 632. Alternative embodiments of the peg may be formed from other materials such as metal. In some embodiments, the peg 334 may be provided with a collar 335 that abuts a horizontal shoulder 633 of the peg carrying portion 631 when the peg is seated in aperture 632. The first side wall 552 also includes a middle engagement member 636 that is also forwardly (or inwardly) angled and includes upper and lower surfaces 636*a*, 636*b* that are substantially parallel to each other. In some embodiments, the upper and lower surfaces 636*a*, 636*b* may be upwardly curved. The first side wall 552 also includes a lower engagement member 638 that is also forwardly (or inwardly) angled and includes a curved vertical surface 639 against which a lower engagement member 644 of a laterally adjacent segment 545 is brought into an abutting engagement as a peg 334 of a vertically adjacent engagement member 630 is translated into and engages a respective slot 646 from below (see, for example, FIGS. 20-26*e*). Note that as the peg 334 engages the slot 646 from below, the peg 334 draws the lower engagement member 644 up against the curved surface 639 of the lower engagement member 638 in a camming action, and the connection between the segments becomes tighter and tighter as the peg translates from a horizontal orientation to a vertical orientation.

Referring again to FIGS. 31-33, the second side wall 554 will now be discussed. The second side wall 554 of each segment includes engagement members that enable laterally and vertically adjacent segments to be coupled together. An embodiment of a second side wall 554 includes a middle engagement member 640 (FIG. 31) that is forwardly (or inwardly) angled and which comprises two spaced apart fingers 641*a*, 641*b*. The fingers are configured and arranged to engage and straddle the middle engagement member 636 of a laterally adjacent segment so that it is captured therebetween. In some embodiments, the fingers 641*a*, 641*b* may include curved surfaces that are configured to complement curved surfaces of the middle engagement member 636 so that when laterally adjacent segments are coupled together the surfaces releasably interlock with each other. The second side wall 554 also includes a lower engagement member 644 that is forwardly (or inwardly) angled and which has a slot 646 that is configured to receive a peg 334 of a laterally and vertically adjacent segment as the segments 545 are coupled together to form a column. In some embodiments the middle engagement members of each side wall may be provided with vertically aligned through holes or apertures 637, 642, into which a peg, a fastener or even a padlock may be inserted so as provide a more permanent structure and/or to strengthen the structure. Some embodiments of the side wall 554 may include an additional upper engagement member 647 that is also forwardly (or inwardly) angled and includes a curved vertical surface 648 that engages and positions an upper engagement member 630 of a laterally adjacent segment.

Figure 35:
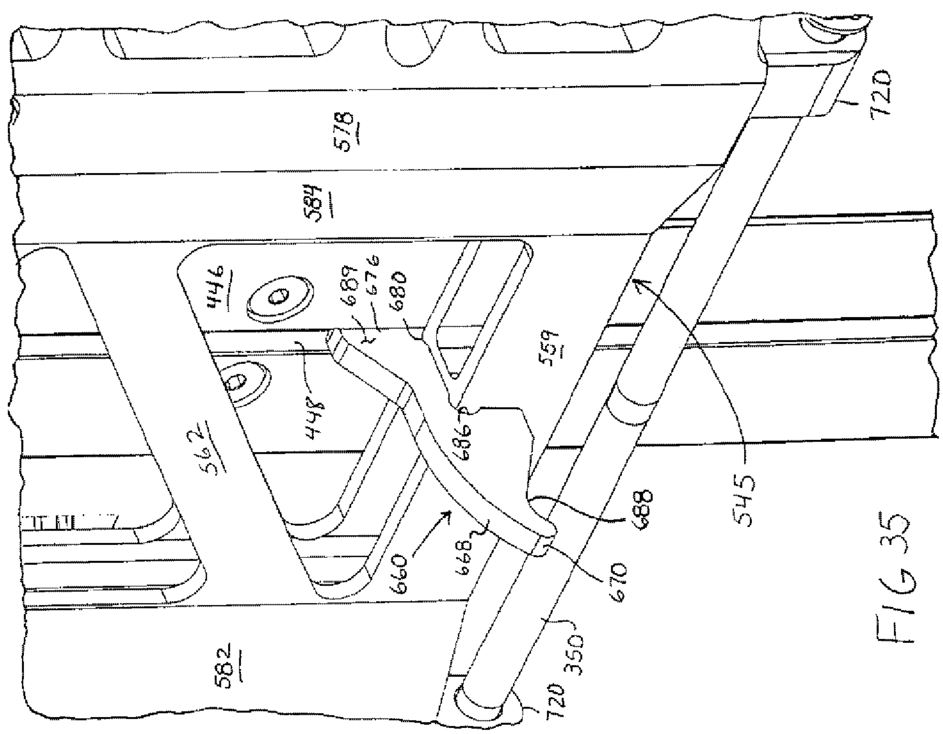
FIG. 35 is a front perspective view of the projection and channel engagement of FIG. 34.
Figure 34:
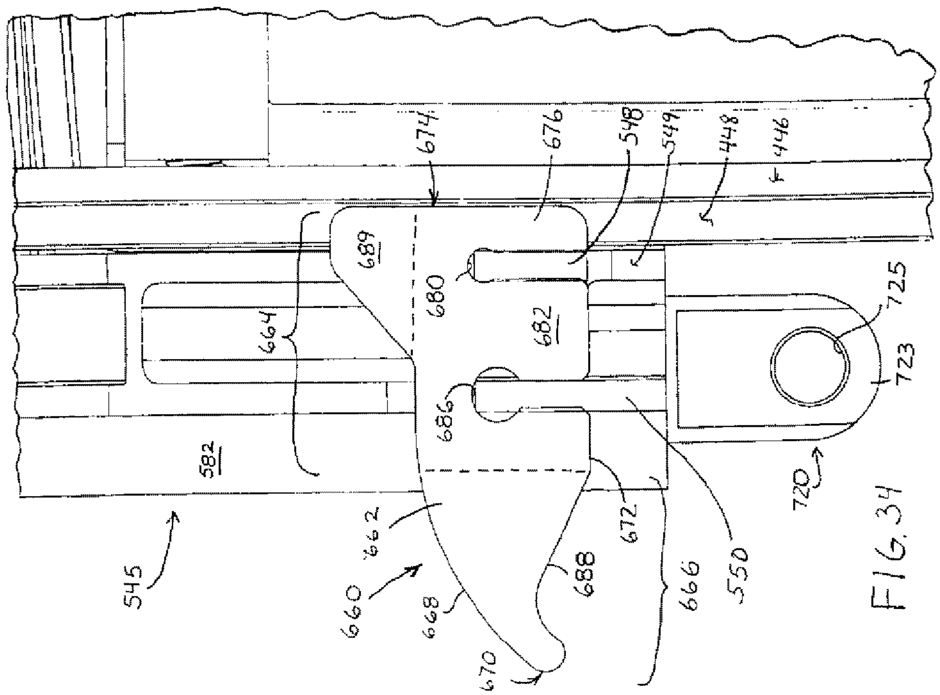
FIG. 34 is a side elevational view of the projection of the segment and the channel of the side panel of FIG. 30.

Turning now to FIGS. 34-35, an illustrative alternative embodiment of a retaining member or bale 660 comprises a body 662 (FIG. 34) having an attachment section 664 and an engagement section 666 is shown. The embodiment includes a body 662 that is generally triangularly shaped and may include elements such as a first edge surface 668, a first end 670 that terminates with a rounded tip, a second edge surface 672 and a second end 674. The first edge surface 668 spans portions of both the attachment section 664 and engagement section 666 of the body 662, beginning with the tip of the first end 670 and extending to the second end 674. In some embodiments, the first edge surface 668 may be generally convex and curve outwardly with respect to the legs. An inner pivot shaft contacting surface 688 of second edge surface 672 begins at the tip of the first end 670 and terminates at the second notch 686. In some embodiments, the inner, pivot shaft engaging surface 688, which engages a pivot shaft 350 of an adjacent hinge connection, is generally concave and curved inwardly. As will be noted, the innermost segments that are carried near the center of the bale frame 220 do not overlay other segments. So, for these few initial segments the engaging surfaces 688 of the bale latches 660 will not engage adjacent pivot shafts 350. Instead, the engaging surfaces 688 will engage the rods 226 of the bale frame 220 (see, for example, FIGS. 17*a*-17*d*). When installed on a segment, the engagement section 666 of the retaining member or bale latch 660 will project outwardly with respect to the second panel 550, and inwardly with respect to the center of the bale. The attachment section 664 may also include elements such as a first leg or projection 676 having a portion that adjoins the second end 674, a second leg 682, a first notch 680 and a second notch 686. As shown, the legs 676, 682 may be generally parallel with respect to each other and are spaced apart from each other so as to define the first notch 680 that can receive a portion of a first panel 548 of a segment 545. Note that the second leg 682 may span the distance between the first and second panels 548, 550. The attachment section 664 may also include elements such as a second notch 686 that can receive a portion of a second panel 550 of the segment 545. In some embodiments, the retaining member 660 can be received by an aperture or socket in a segment, where the aperture or socket is defined and formed by panels 548, 550 and webs 564*e* and 564*f* as depicted in FIGS. 32 and 33. As shown, the first leg or projection 676 can extend outwardly beyond the first panel 548 so that it is able to slidingly engage the channel or slot 448 of side wall 443 (FIGS. 34 and 35). In some embodiments the retaining member 660 may include a fin or extension 689 (FIG. 34) that allows the projection to engage a larger portion of the slot, and thus provide additional guidance and stability to the segment and the column. In some embodiments, the retaining member 660 may be rigidly connected to the segment, as for example, by welding or by the use of fastening elements such as threaded bolts.

Figure 36:
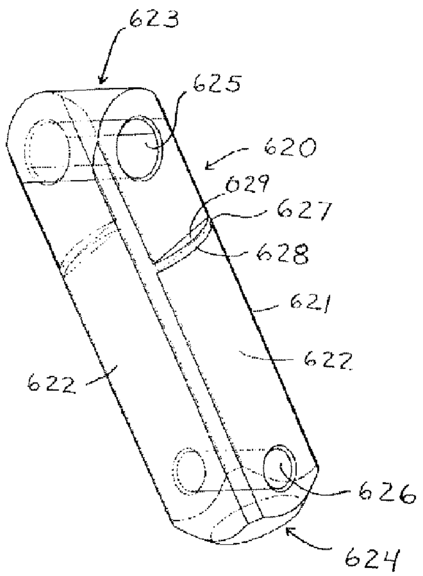
FIG. 36 is a perspective view of an embodiment of a pivot support block.
Figure 37A:
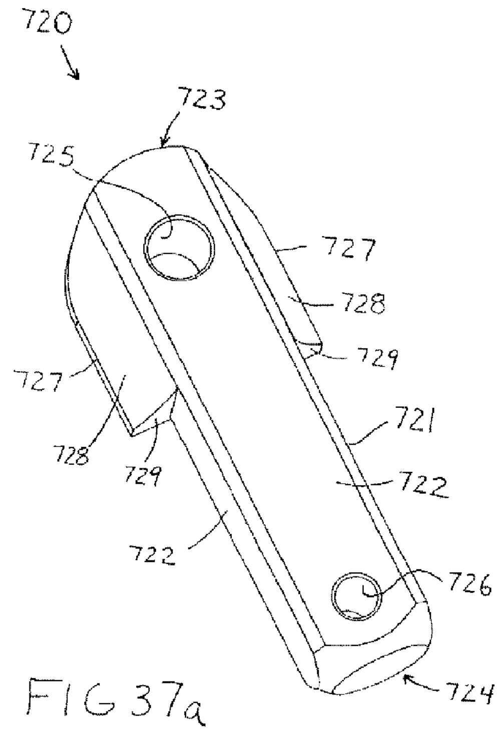
FIG. 37*a* is a perspective view of an embodiment of a pivot support block.
Figure 37B:
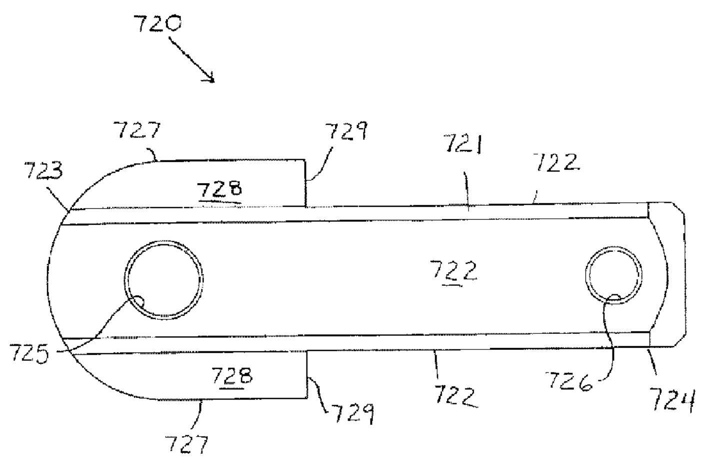
FIG. 37*b* is a top plan view of the pivot support block of FIG. 37*a;*
Figure 37C:
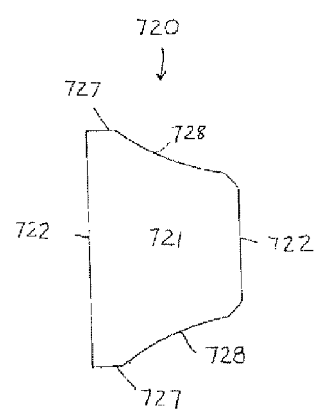
FIG. 37*c* is an end view of the pivot support block of FIG. 37*a;*

In some earlier described embodiments, vertically adjacent segments, e.g. 245 are connected to each other by one or more pivot support blocks 320 (in a manner as shown in FIGS. 20-22, for example). An alternative embodiment of a pivot support block 620 is shown in FIGS. 36 and 30, where each pivot support block 620 is generally rectangularly shaped and includes a body 621 having sides 622, a first end 623 and a second end 624. Alternatively, the body may be generally cylindrically shaped. The first end 623 includes a transverse aperture 625 that is configured and arranged to receive a pivot shaft 350, while the second end 624 includes a transverse aperture 626 that is configured and arranged to receive a fastening element such as a threaded bolt that is used to secure the block 620 to a segment 545. In the illustrative embodiment, the second end of block 620 may be insertable into a longitudinally aligned aperture 565 located at the bottom end of each segment 545. Some embodiments of the block 620 may be provided with one or more outwardly extending elements such as flanges 627 that include engagement surfaces 628, 629. The second end 624 can be attached to a segment by insertion into aperture 565, and when inserted, one or more of the engagement surfaces 628 may contact portions of the segment 545 and position the body 620 so that the transverse aperture 626 is brought into alignment with a transverse aperture in the segment 545, thus facilitating insertion and attachment of the fastening element. The support block(s) need only be connected at one end of each segment. The other end of each segment may include connecting arms 566 that are formed by extending the side walls 552, 554 and webs 564*a*, 564*b*, respectively. In some embodiments, the arms 566 receive a first end 623 of the pivot support block 620 therebetween. The arms 566 include transverse apertures 568 that are configured and arranged to be aligned with the transverse aperture 625 of the first end 623 of the support block 620, so that a pivot rod 350 may be inserted therethrough and adjacent segments may be pivotally connected together.

Another alternative embodiment of a pivot support block 720 as shown in FIGS. 37*a*-37*c* and 31-33. Each pivot support block 720 includes a body 721 having sides 722, a first end 723 and a second end 724. Alternatively, the body may be generally cylindrically shaped. The first end 723 includes a transverse aperture 725 that is configured and arranged to receive a pivot shaft 350, while the second end 724 includes a transverse aperture 726 that is configured and arranged to receive a fastening element such as a threaded bolt that is used to secure the block 720 to a segment 545. In illustrative embodiments, the second end 724 of a block 720 may be insertable into a longitudinally aligned aperture 565 located at the bottom end of each segment 545, and secured with a transverse fastening element such as a threaded bolt. The block 720 may be provided with one or more laterally extending elements such as flanges 727 that may include curved surfaces 728, and which may include one or more engagement surfaces 729. As the second end 724 is attached to a segment, as by insertion, one or more of the engagement surfaces 729 may contact portions of the segment 545 and position the body 720 so that the transverse aperture 726 is brought into alignment with a transverse aperture in the segment 545, thus facilitating insertion and attachment of the fastening element. The flanges 727 provide additional strength as well as clearance for adjacent, pivotally connected segments. The support block(s) 720 need only be connected at one end of each segment. The other end of each segment may include connecting arms 566 that are formed by extending the side walls 552, 554 and webs 564*a*, 564*b*, respectively. In some embodiments, the arms 566 receive a first end 723 of the pivot support block 720 therebetween. The arms 566 include transverse apertures 568 that are configured and arranged to be aligned with the transverse aperture 725 of the first end 723 of the support block 720, so that a pivot rod 350 may be inserted therethrough and adjacent segments may be pivotally connected together.

Figure 38:
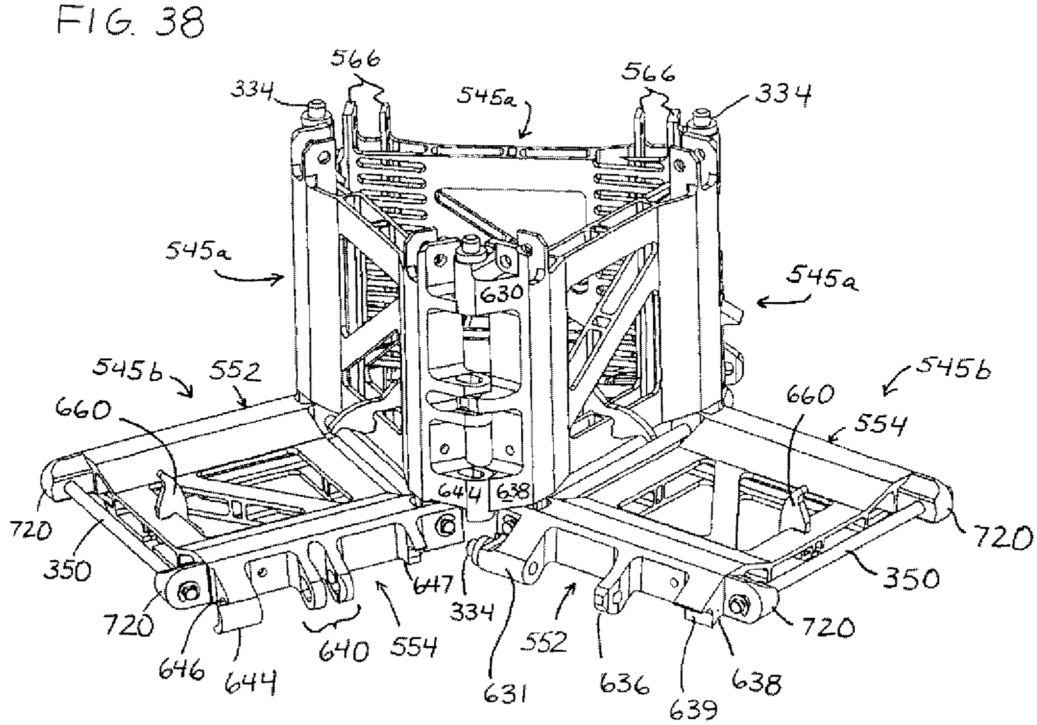
FIG. 38 is a partial, isometric view of three partial chain sections, with upper segments of the sections interconnected with each other into a tower/column configuration and with lower segments of the sections splayed away from each other.
Figure 39:
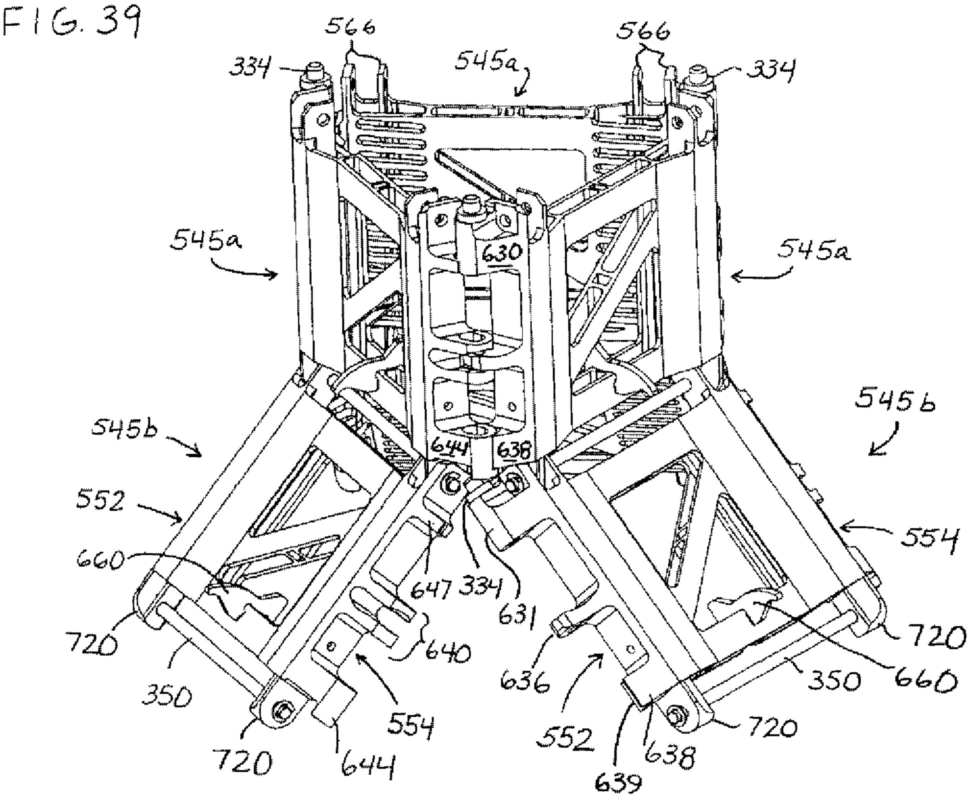
FIG. 39 is a partial, isometric view of the partial chain sections of FIG. 38, wherein the tower has been extended and the lower segments are being positioned for engagement with each other.
Figure 40:
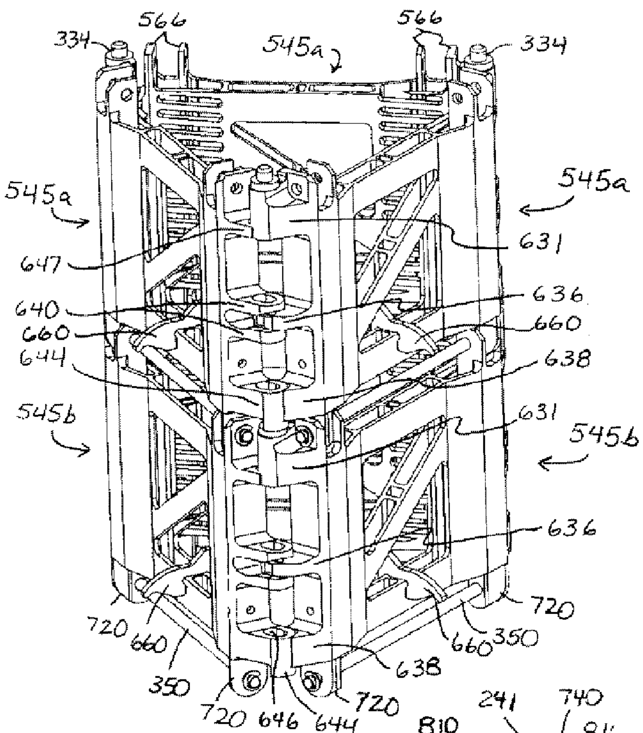
FIG. 40 is a partial, isometric view of the partial chain sections of FIG. 38, wherein the tower has been extended further and the lower segments have engaged each other to form a tower that is two courses tall.

Referring now to FIGS. 38-40, in operation, the first segment 545*a* of each bale is positioned so that it can be engaged by the drive module 141. As the drive module engages each segment, it pulls in a successive segment through a portal. As each successive segment 545*b* translates from a generally horizontal orientation to a substantially vertical orientation, the successive segments 545*b* engage the first segments 545*a* and bring the lower ends of the first segments 545*a* together in a camming action. The coupling of adjacent segments is as follows. In FIG. 38, segments 545*a* of adjacent chain sections have already been partially interconnected. That is, the upper ends of the segments have already been connected to each other, for example, by a cap (not shown). In addition, the engagement members of the first side wall 552 of segment 545*a* of a first chain section are coupled to the engagement members of the second side wall 554 of segment 545*a* of a laterally adjacent second chain section. Engagement members of the first side wall 552 of segment 545*a* of the second chain section are coupled to the engagement members of the second side wall 554 of segment 545*a* of a third chain section. And, engagement members of the first side wall 552 of segment 545*a* of the third chain section are coupled to the engagement members of the second side wall 554 of segment 545*a* of the first chain section. Thus, forming a column having a height of one course.

As will be noted, the segments 545*a* may represent the starter course of the column 300, and they may be positioned furthest from the guide assembly 140 when the column 300 is extended (see FIG. 3*a*). In some embodiments, this starter course may comprise a preassembled, unitary, rigid frame to which segments of the chain sections are attached. That is, the upper end of the starter course may be provided with a cap 302 that connects the upper ends of the segments together (FIG. 2*b*). Note that such an embodiment the chain sections will not be able to be fully withdrawn out of the portals 187 of the guide assembly 140.

As the starter course 545*a* is engaged by the drive module 141, segments 545*b* (FIG. 38) of the three chain sections are fed into the portals 187 of the guide assembly 140 (not shown). In doing so, the orientation of the segments 545*b* translates from a generally horizontal orientation to a substantially vertical orientation. As can be seen in FIGS. 38-40, as the segments 545*b* are translated, the pegs 334 are brought into registry with slots 646 of the lower engagement members 644 of the segments of the preceding course of segments, which in these figures are labeled as segments 545*a*. As the segments continue to be coupled together as shown in FIGS. 39 and 40, the engagement members of the first and second side walls are brought into contact with each other. As mentioned above, when a peg 334 engages the angled slot 646 of a vertically and horizontally adjacent segment, the peg 334 will snug the lower engagement member 644 (FIG. 40) of segment 545*a* of a chain section up against the vertical or stop surface 639 of lower engagement member 638 of a segment 545*a* of a laterally adjacent chain section. This interconnection between vertically adjacent segments adds to the rigidity of a column by allowing a portion of the torsional forces that may be exerted on the column to be distributed in a generally helical manner. This interconnection is further strengthened with the provision of an upper engagement member 647 of a second sidewall 554 that engages the upper engagement member 630 of a first side wall 552 as the side walls of all of the chain sections come into registry with each other to form a column.

Figure 41:
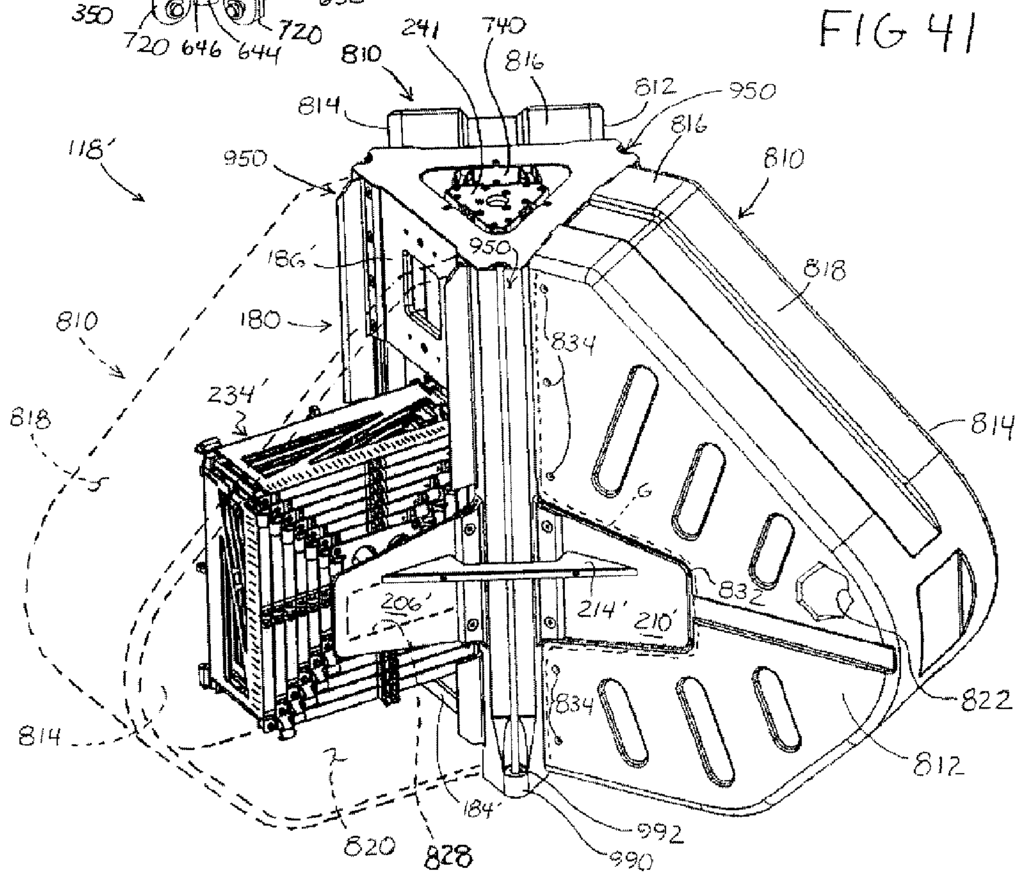
FIG. 41 is a perspective view of an embodiment of a tower assembly that may include one or more protective cowls.

An illustrative embodiment of a tower assembly 118' is depicted in FIG. 41. In this embodiment, the tower assembly 118' may include elements such as one or more protective cowls or shrouds 810. Each cowl or shroud 810 is essentially a protective shell that substantially encloses a chain section 234' and its associated bale assembly and provides a safety barrier between the chain section and nearby personnel. In addition, the cowl protects the internal components from externalities such as inclement weather, sand and dirt contamination, foreign objects, animals, insects, etc. In exemplary embodiments, a single cowl covers and protects a single bale assembly. However, if there is more than one bale assembly, each bale assembly may be provided with its own cowl, if desired. In an illustrative embodiment (FIG. 41), a cowl 810 may include a first side wall 812, a second opposing side wall 814, a top portion 816 an edge portion 818 and a bottom portion 820, with the top, edge and bottom portions, and the first and second side walls forming an enclosure with an internal cavity 822 having an opening (see, for example, opening 824' of FIG. 64) into which the bale is received. The cavity 822 is configured and arranged so as to be able to protectively cover a bale frame and a chain section of tower assembly 118' as a tower is extended and retracted. To that end, each side wall of the cowl may be provided with a slot 826, 828, which accommodates a guide rail 216, 218 that is attached to an inner surface of a wing or winglet 206', 210'. In some embodiments, each side wall 812, 814 may also be provided with a recess 830, 832 (recess 832 of side 814 not shown) that is sized to receive a wing 206', 210' in a nesting relation. With such an embodiment, the inner surfaces of the wings 206', 210' are in a confronting relation with portions of the external surfaces of the first and second side walls 812, 814. If desired, the wings 206' and 210' may be secured to the cowl 810 by one or more fastening elements. Alternatively, the side walls of the cowl may be provided with one or more tabs, slots or a channel which is able to engage the edge of a wing when the cowl is attached to a tower assembly. The cowl or shroud 810 may include one or more apertures 834 located adjacent the opening (see, for example, 824' of FIG. 64). The apertures 834 are positioned to come into registry with threaded apertures in a frame post (950 to be discussed hereafter) when the cowl is positioned about a bale frame and chain section, prior to connecting the cowl to the tower assembly 118'. In an exemplary embodiment edges of the opening (see, for example, 824' of FIG. 64) are sized so that they are able to confront two vertical frame posts 950 and upper and lower transverse brace members 184' and 186' (see FIGS. 41 and 42). In an illustrative embodiment, a cowling 810 is attached to upper ribs 996, 997 and lower ribs 998, 999 of adjacent frame posts 950 (see FIG. 42). In some embodiments, a cowl may be provided with one or more elements such as gaskets and/or sealing and/or caulking material "G" (FIG. 41) which further prevent infiltration of undesirable external elements. As will be understood, the cowl may be removably attached to the tower assembly by fastening elements such as threaded screws.

In some embodiments, a cowl may be fabricated from sound deadening material and/or may include sound deadening material that reduces the sound level of the device during operation. In some embodiments, the external surfaces of one or more cowls may act as runners that enable the device to be dragged or pushed to a location. In other embodiments, one or more cowls may be manufactured from material or include an external coating or covering that has a thermal signature that is similar to its surroundings. In other embodiments, one or more cowls may be fabricated and/or provided with additional material so that it may blend in with its surroundings (i.e. camouflage). For example, the cowls could be configured so as to simulate a rock or pile of rocks. Or, the cowls could be configured so as to simulate a tree stump with roots. Or, the cowls could be configured so as to simulate a shrub, a cactus, a termite mound, or even an entrance to an animal's underground lair. In the latter instance, a user could deposit earth around the cowls to form a mound. The provision of cowls also enables the device to be partially or substantially embedded or buried into the environment in which it is sited (for example, sand, snow, ice, etc.). Conversely, in those instances where the geographical location of the device needs to be known, a cowl may be fabricated from material that can be easily detected, such as fluorescent material, radar reflective material, or the like. Further, the tower assembly and/or one or more cowls may be provided with one or more electronic sensors, monitors and/or signaling/receiving devices such as a global positioning transmitter (GPS). A GPS would be desirable in situations where a device is implanted in a location and left to operate autonomously, but which may be retrieved at a later date (for example, a weather station).

Figure 42:
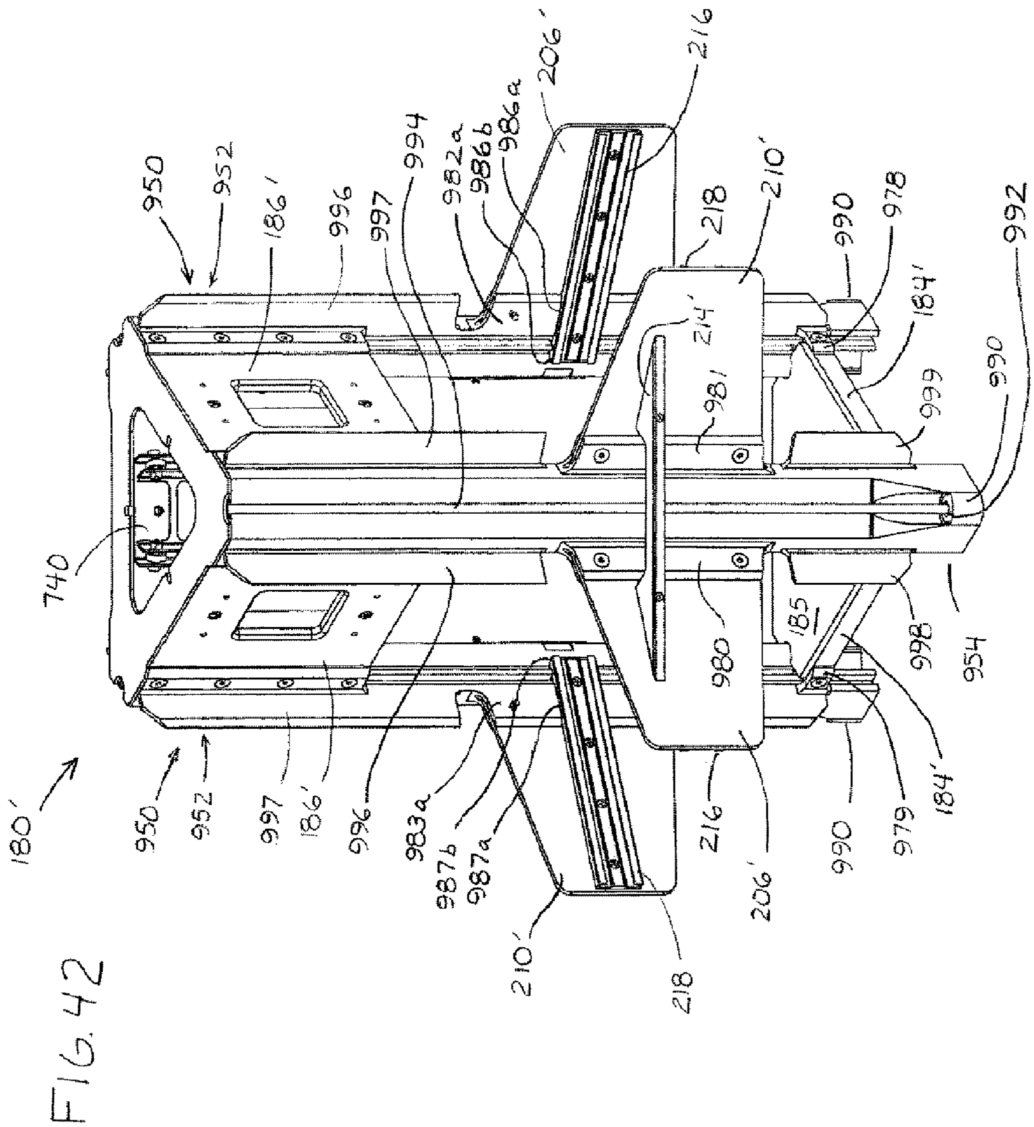
FIG. 42 is a perspective view of an outer frame that may be used with the embodiment of FIG. 41.

An outer frame 180' that may be used in conjunction with the tower assembly 118' is shown in FIGS. 41-42. The outer frame 180' or reaction ring 180' may include a plurality of vertical support posts 950, with each support post 950 having an inner facing surface 951 (FIGS. 43-44), an outer facing surface formed by members 953*a* and 953*b*, an upper end 952 and a lower end 954. The upper end 952 includes at least one first portion 955*a* to which a transverse upper brace member 186' may be connected. In some embodiments, the first portion of the upper end is in the form of a flange that includes at least one transverse aperture that receives a fastening element that is used to connect the first portion of the post 950 to the upper brace member 186'. In an illustrative embodiment, the first portion is in the form of a pair of flanges 956, 958 (FIG. 43) that form a slot 960 that is able to receive the portion of the upper brace member 186' therein, with the first portion and the upper brace member secured to each other by one or more fastening elements that are received in apertures 962 (see also FIGS. 43 and 44). In some embodiments, the upper end 952 may be provided with a second portion 955*b* to which a second transverse upper brace member 186' may be connected. In some embodiments, the second portion may be in the form of a flange that includes at least one transverse aperture that receives a fastening element that is used to connect the second portion of the post to a second brace. In an illustrative embodiment, the second portion 955*b* is in the form of a pair of flanges 957, 959, that form a slot 961 that is able to receive a portion of the second upper brace member 186' therein, with the second portion and the second upper brace member secured to each other by one or more fastening elements that are received in apertures 963. With embodiments that include first and second portions with first and second slots, the slots are angled with respect to each other. The angle that the slots define depends upon how many sides there are in a column. In the case of a three sided tower assembly having three frame posts 950, the first and second slots 960, 961 define an acute angle therebetween of around 60 degrees.

Similarly, the lower end 954 of frame post 950 includes a third portion 971*a* and a fourth portion 971*b* to which third and fourth transverse lower brace members may be connected. In an illustrative embodiment, the third portion 971*a* is in the form of a pair of flanges 972, 974 that form a slot 976 that is able to receive the portion of the lower brace member 184' therein, with the portion and the lower brace member secured to each other by one or more fastening elements that are received in apertures 978 (see also FIGS. 43 and 44). In an illustrative embodiment, the fourth portion 971*b* is in the form of a pair of flanges 973, 975, that form a slot 977 that is able to receive a portion of the second lower brace member 184' therein, with the second portion and the second lower brace member secured to each other by one or more fastening elements that are received in apertures 979 (see also FIGS. 43 and 44). As with embodiments that include third and fourth portions with third and fourth slots, the slots are angled with respect to each other. The angle that the slots define depends upon how many sides there are in a column. In the case of a three sided tower assembly having three frame posts 950, the third and fourth slots define an acute angle therebetween of around 60 degrees. In an illustrative embodiment a platform 185 (FIG. 42) may be supported by one or more lower brace members 184'.

Figure 43:
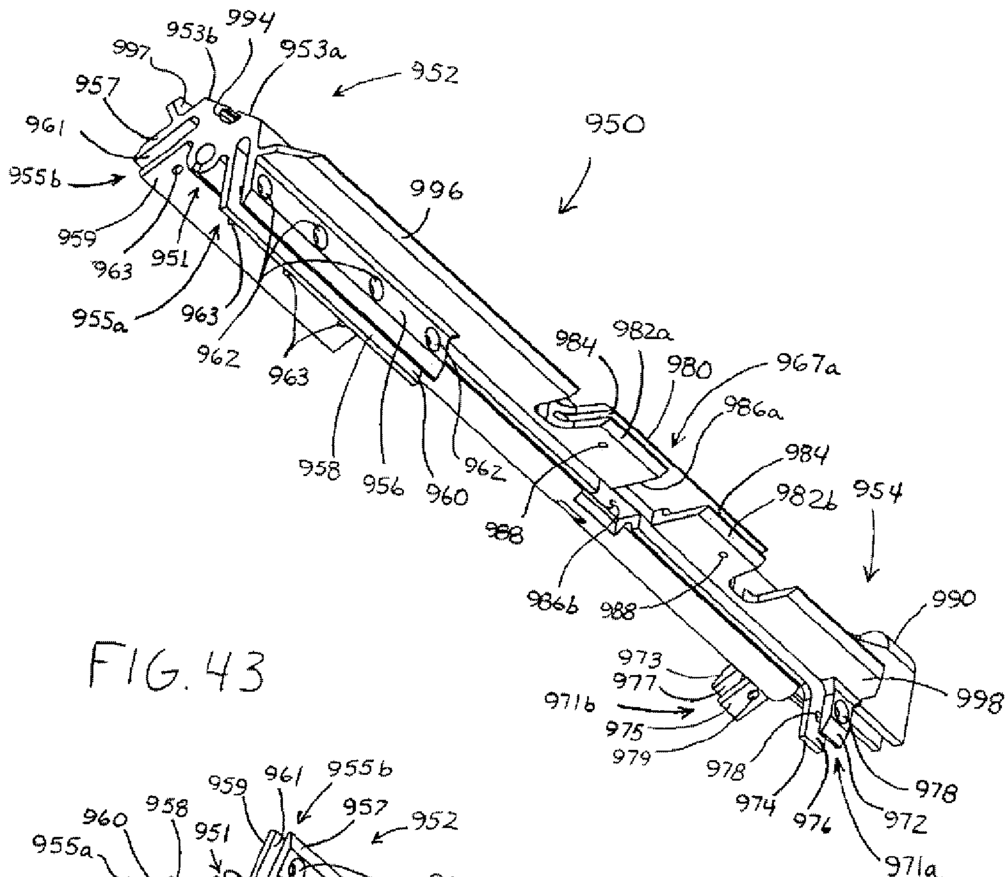
FIG. 43 is a perspective view of an outer frame post that may be used with the outer frame of FIG. 42.

In illustrative embodiments, the frame post 950 may include a fifth portion 967*a* and a sixth portion 967*b*, located between the first and second ends 952 and 954, with the fifth and sixth portions configured and arranged to be connected to freestanding wings or winglets 206', 210' that form parts of two bale support assemblies. The wings or winglets 206' and 210' are secured to a frame post 950 by one or more fastening elements such as threaded screws (FIG. 42). As with other embodiments, the wings or winglets 206' and 210' may be stabilized by a transverse gusset 214' that is removably connected to the wings by one or more fastening elements. In some embodiments, the fifth portion may comprise a single flange. In an illustrative embodiment, the fifth portion 967*a* comprises flanges 980, 982*a* and 982*b* that define two slots 984 that are able to receive the portions of a wing 206' (FIG. 43). Note that the wing 206' includes a guide rail 216). In order to achieve a strong connection between a wing and a frame post, a relief notch 986*a* is provided between flanges 982*a* and 982*b*. The relief notch 986*a* receives a portion of a guide rail that is attached to a wing. Further, the frame post itself may be provided with its own relief notch 986*b* that can receive an end of the guide rail, thus further strengthening the tower assembly construction (FIG. 42). In use, a wing 206' is inserted into the slots 984 and secured to the flanges by fastening elements that are received in one or more apertures 988. Similarly, in an illustrative embodiment, the sixth portion 967*b* comprises flanges 981, 983*a* and 983*b* that define two slots 985 that are able to receive portions of a second wing 210'. Note that the second wing includes a guide rail 218. In order to achieve a strong connection between a second wing and a frame post, a relief notch 987*a* is provided between flanges 983*a* and 983*b*. The relief notch 987*a* receives a portion of a guide rail that is attached to the second wing. Further, the frame post itself may be provided with its own relief notch 987*b* that can receive an end of a guide rail, thus further strengthening the tower assembly construction (FIG. 42). In use, the second wing 210' is inserted into the slots 985 and secured to the flanges by fastening elements that are received in one or more apertures 989. The slots of the fifth and sixth portions define an obtuse angle of around 120 degrees. As with the first and second pair of slots, the angle that the slots of the fifth and sixth portions define will be contingent upon the number of sides that are used to form a column.

In illustrative embodiments, the second or lower end 954 of the post 950 may include an enlarged bottom that forms a foot 990. The foot may include an aperture 992 so that the post 950 may be connected to a support by way of a fastening element such as threaded fastener. As will be understood, the support to which a post may be attached can be a base such as the base 120 of previous embodiments. Alternatively, the support may be an immovable object such as a building or a movable object such as a vehicle. Other supports may be used without departing from the spirit and scope of the invention. In some embodiments, a frame post 950 may include an outwardly opening channel 994 that extends along the longitudinal length of the post and which is bordered by outwardly facing surfaces 953*a* and 953*b*. The channel 994 can be used as an attachment point for accessories or other ancillary equipment. In some embodiments, the channel may have a T-shaped cross-section. In some embodiments, the channel may be used to store a portion of an outrigger. In an illustrative embodiment, a post 950 may include a plurality of outwardly extending ribs 996 and 998, 997 and 999 that may serve as attachment points for one or more protective cowls.

With reference to FIGS. 2*b* and 8, some outer guide frame embodiments may include an upper transverse brace member 186 having one or more inwardly facing slide rails 188. The slide rails 188 are used to position chain section segments as they engage linear drive members of a drive module 141. Alternatively, the slide rails may be replaced with one or more rollers that may be individually connected to the frame, or which may be connected to one or more sub-frames or brackets that are, in turn, connected to the frame. In an illustrative embodiment, as shown in FIGS. 45-47, one or more rollers 764 may be mounted onto a bracket or sub-frame 738 to form a guide module 740. The sub-frame or bracket 738 includes a generally planar base 742 with an inwardly facing surface 744 an outwardly facing surface 746 (FIG. 47) and first and second apertures 748 and 750 (FIG. 45), a plurality of inner rails or walls 754, 758, a plurality of outer rails or walls 752, 756, and one or more platforms 760 (FIG. 46). The rails or walls extend inwardly from the inner surface of the base and are arranged so as to form roller support structures 755 and 759 (FIG. 45). The rails or walls include apertures that are configured and arranged to receive shafts 762 that support one or more rollers 764. In some embodiments, the rails or walls of the support structures 755, 759 are substantially parallel to each other and are in alignment with the longitudinal axis of the sub-frame or bracket. In an illustrative embodiment, the inner and outer rails or walls of each support structure 755, 759 are substantially parallel to each other and as best shown in FIG. 47 are also angled with respect to the base 742 at an angle θ between the outer wall and a line perpendicular to surface 744. In exemplary embodiments, each support structure 755, 759 is angled θ approximately 20 degrees from a perpendicular line extending from the base 742. Such a configuration positions the rollers 764 so that they are better able to maintain a consistent low-friction contact force against the chain section segments as they are extended or retracted.

In some guide module embodiments, inner rails or walls 754 and 758 of the support structures 755 and 759 may be connected to each other by one or more webs 766 to form a unitary piece that can be attached to the inwardly facing surface 744 of the base 742. In illustrative embodiments, the rollers 764 are rotatably mounted on shafts 762 that are connected to the support structures 755 and 759. Some embodiments of the shafts 762 may include a head, a threaded shaft and a nut. In some embodiments, the rollers 764 may be provided with self aligning bearings that enable the rollers to accommodate variations in individual chain section segments. In exemplary embodiments, the rollers 764 include spherical bearings.

The guide module 740 is connected to an inwardly facing surface of an outer frame. A preferred attachment location is at the same vertical level as a drive element of the drive unit. Such a location may include the inner surface of a transverse upper brace member 186'. In an illustrative embodiment shown in FIG. 46, the outwardly facing surface 746 of the base 742 includes one or more platforms 760. Each platform 760 is transversely oriented relative to the base 742 and includes an aperture that is configured and arranged to cooperatively engage the apertures 758, 750 in the base 742. One or more positioning elements (not shown) operatively connect the platform 760 to the upper brace member 186' via the first set of apertures and apertures in the upper brace member 186'. That is, one end of a positioning element (not shown) is movably held by either one of the platform 760 or the transverse brace 186', while the other end of the positioning element threadably engages an aperture in the other one of the platform 760 or the transverse brace member 186'.

In operation one or more positioning elements (not shown) are used to ensure that the guide module 740 engages a chain section segment so that the segment is correctly engaged by a drive element of the drive unit. In some embodiments, the positioning elements are threaded bolts, where one end of the bolt is rotatably connected to the upper brace member 186' and the other end is rotatably connected to the sub-frame or bracket 740. When the positioning element is rotated, the distance between the sub-frame 740 and the upper brace member 186' can be varied. Once the guide module 740 has been properly adjusted and located, it can be secured in position by one or more locking elements (not shown). In some embodiments, the locking elements are threaded bolts that engage threaded apertures in the upper brace member and protrude therethrough until they are able contact the guide module 740 and prevent movement thereagainst. In other embodiments, the locking elements are threaded bolts that are received in through holes, with the threaded ends of the bolts engaging threaded apertures associated with the guide module 740. Preferably, the drive heads of positioning elements and the locking elements face outwardly relative to the upper brace member 186'. Such an arrangement enables a user to adjust the relative location of the guide module without having to dismantle and remove one or more chain sections. It is preferred that the guide module be rigidly connected to the frame, since it will enable the tower to better resist torsional forces that may be exerted against the tower.

Figure 48:
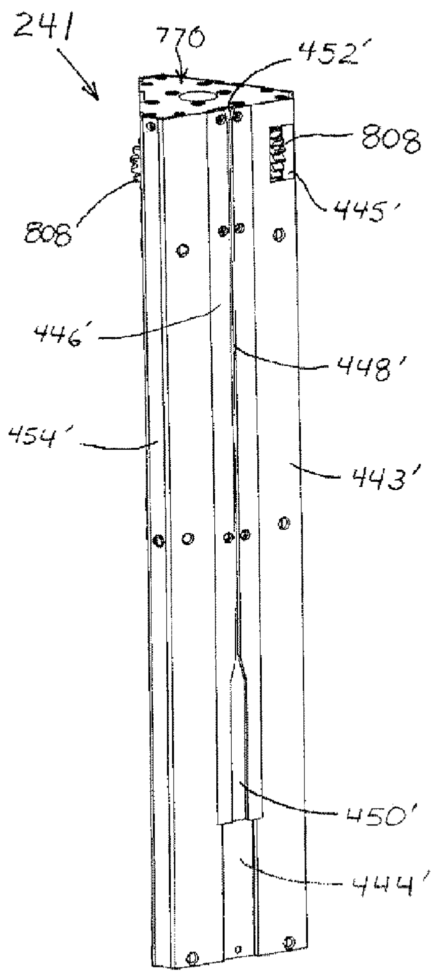
FIG. 48 is a perspective view of an embodiment of a drive module that may be used with the tower assembly of FIG. 41.
Figure 49:
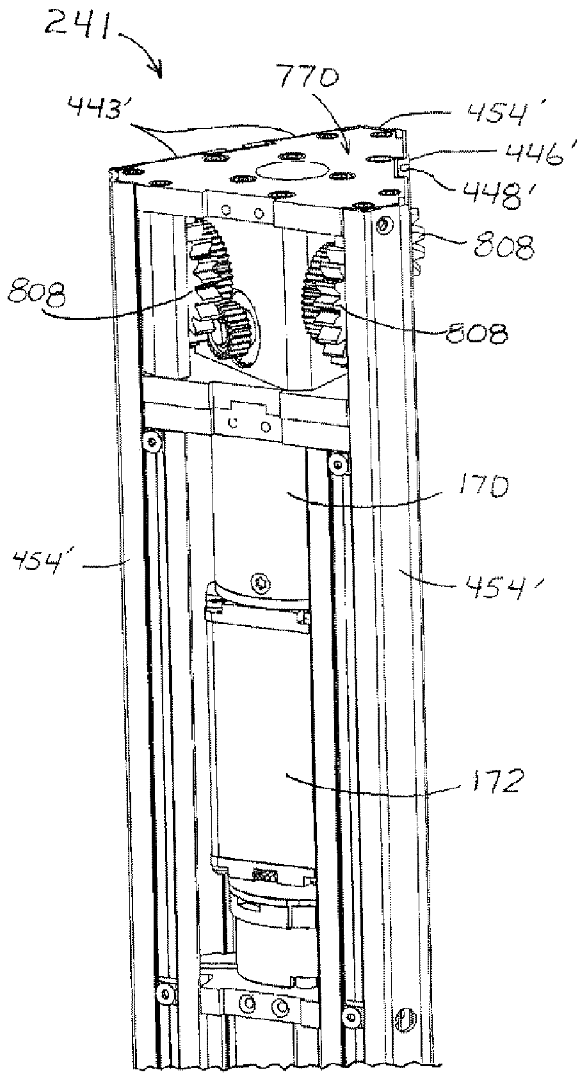
FIG. 49 is a partial enlarged view of the drive module of FIG. 48, in which a side panel has been removed to reveal portions of a drive assembly.
Figure 51:
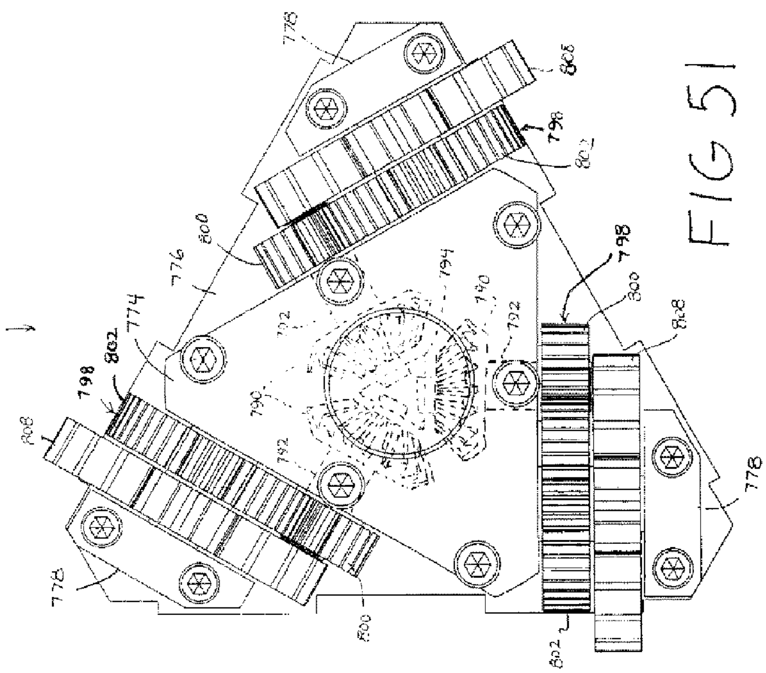
FIG. 51 is a top plan view of the drive assembly of FIG. 50, with the bevel gears their shafts and the center support block shown in phantom.
Figure 56:
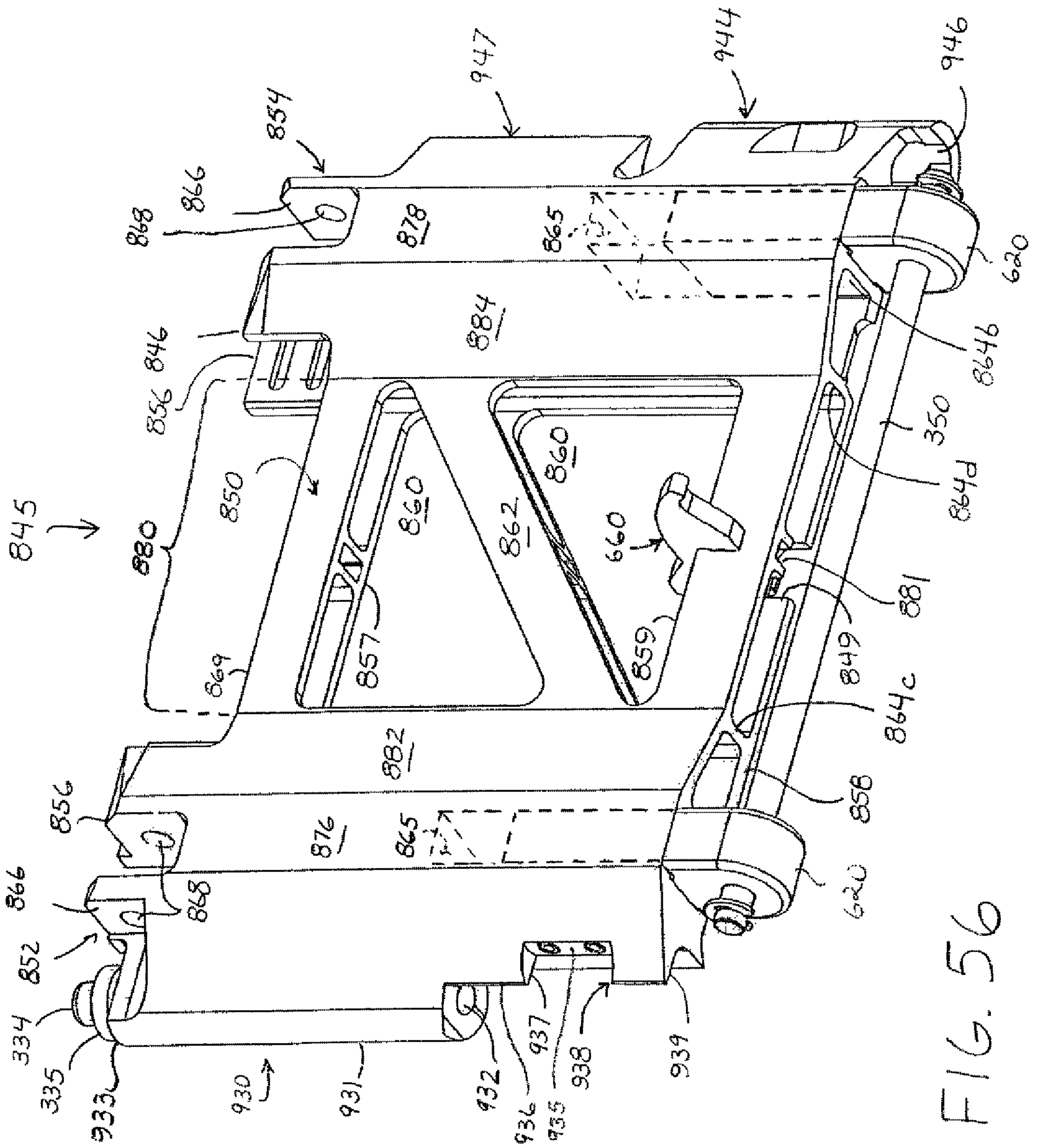
FIG. 56 is a perspective view of an outwardly facing surface of a segment that can be used in conjunction with the drive module of FIG. 48, and an embodiment of pivot support blocks and a pivot shaft connected thereto.
Figure 57:
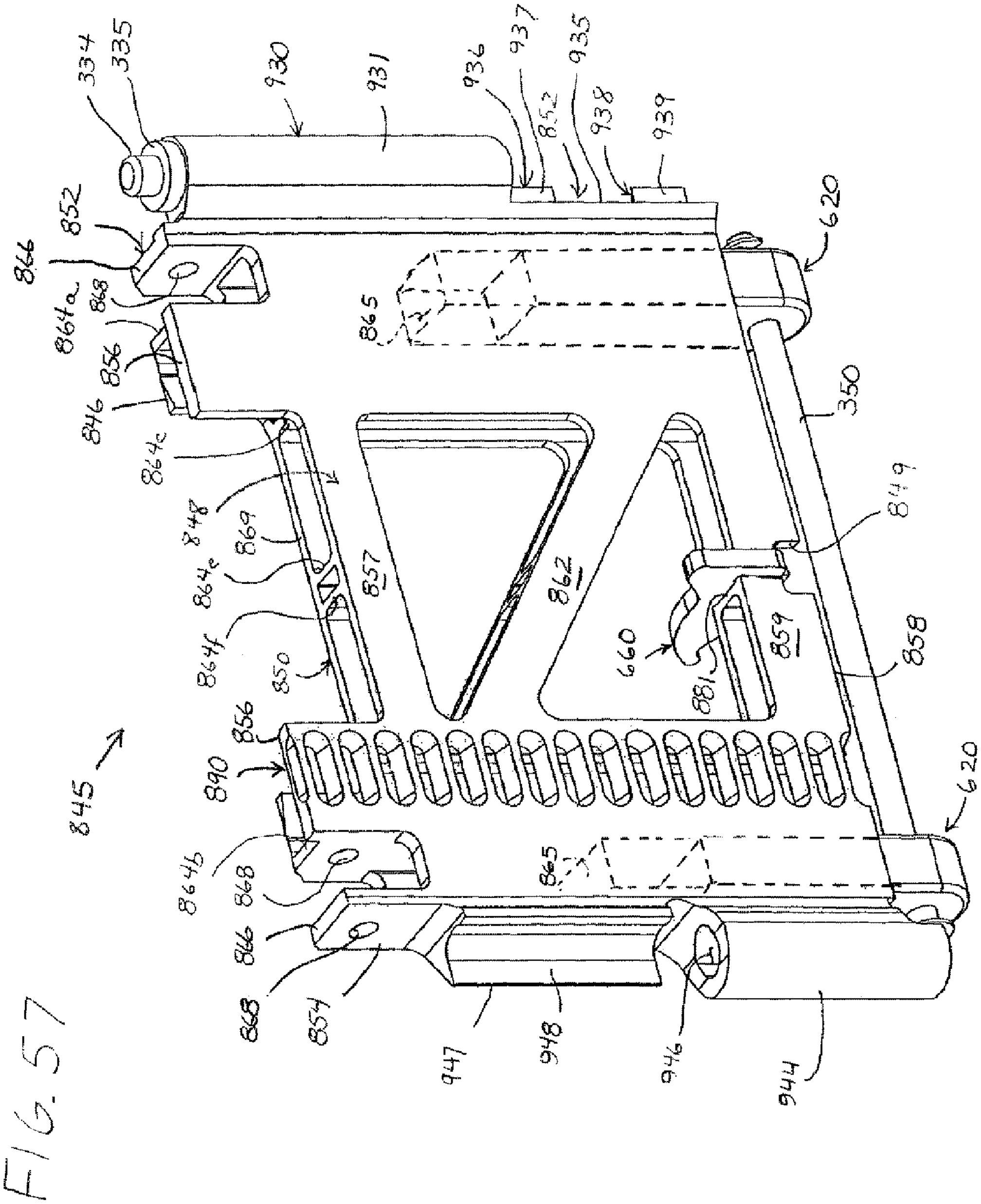
FIG. 57 is a perspective view of a inwardly facing surface of the segment of FIG. 56, the view taken from above and to the side.
Figure 58:
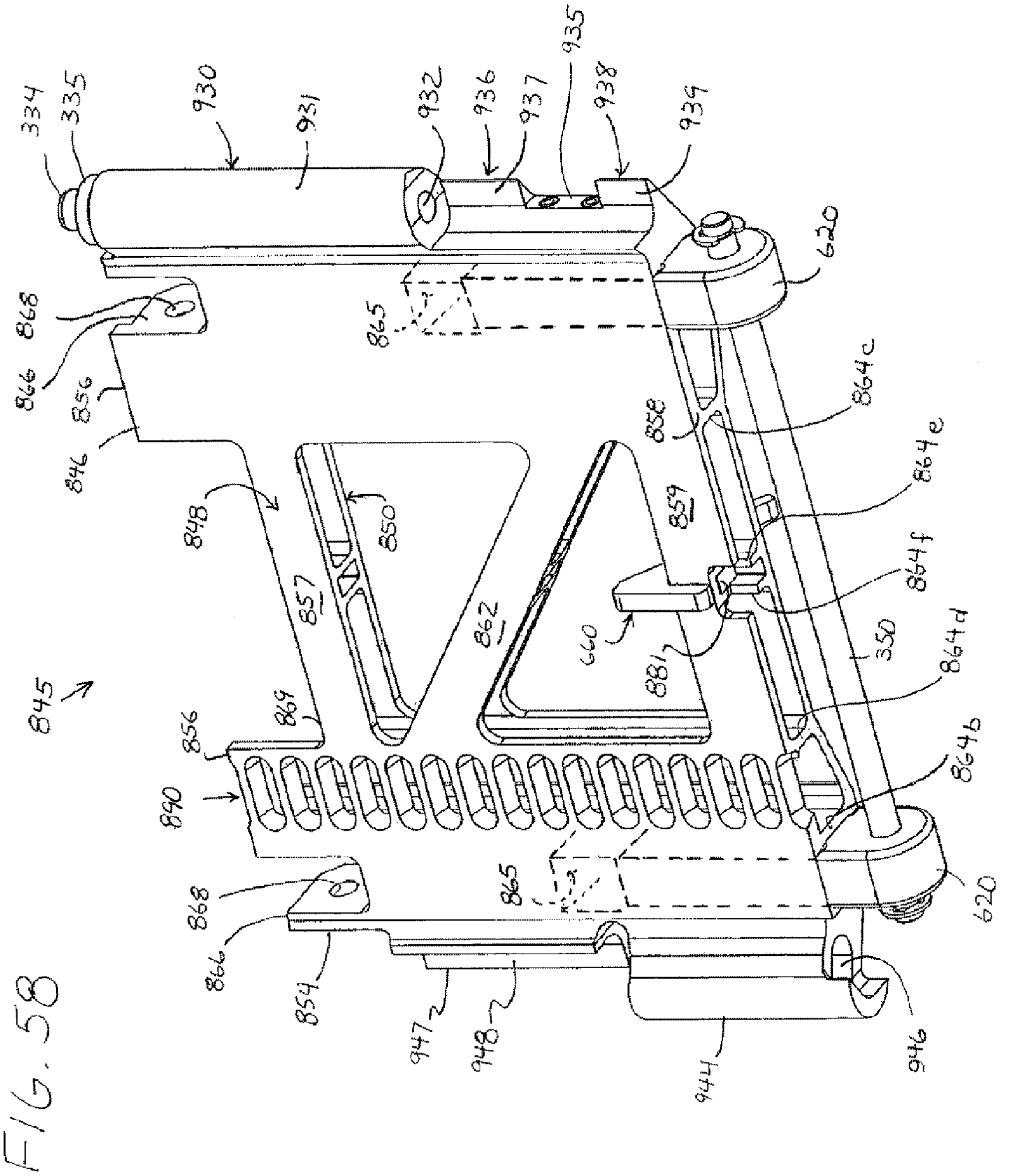
FIG. 58 is another perspective view of the inwardly facing surface of the segment of FIG. 56, the view taken from below and to the side.

With reference to FIGS. 48 and 49, an illustrative embodiment of a drive module 241 of a guide assembly that may be used in association with one or more guide modules 740 is shown. With this embodiment, the drive module 241 may include a drive assembly 770. The drive module 241 has a housing comprised of a plurality of side panels 443' and bars 454', all of which may be removably secured to an inner frame (see, for example the inner frame as shown in FIG. 9*c*) by one or more fastening elements such as set screws or countersunk screws (not shown). Some embodiments of the bars 454' may be elongated and some embodiments of the bars 454' may have generally C-shaped cross-sections. Some embodiments of the bars 454' may extend along the entire length of the drive module 241. In an exemplary embodiment, the bars 454' are connected at the apexes of one or more mounting blocks of an inner frame of a drive module. Some embodiments of the side panels 443' may be configured to operatively engage a chain section segment as it is being retracted or extended (see, for example, segment 845 as shown in FIGS. 56-58). More specifically, one or more side panels 443' may include a channel or slot 448' that is configured to operatively engage a projection that extends from a chain section segment such as 545 or 845. The channel or slot 448', which extends inwardly and which is substantially parallel to the longitudinal axis of the drive module 241, is configured and arranged to slidingly receive and guide a projection 676 of a retaining member 660 that is operatively connected to a segment 845 (c.f. FIGS. 33 and 34). In some embodiments, the channel 448' may have a cross-section that includes a bottom wall and side walls that are substantially parallel to each other. In some embodiments, the channel 448' may have a cross-section that includes side walls that converge towards each other as they extend away from the drive module 241, or which diverge away from each other as they extend away from the drive module 241. With channels having convergent side walls, a projection that extends from a segment could be configured with similarly configured walls, so that the projection may be slidingly retained by the channel. In other embodiments, the channel may have a generally circular cross-section with convergent or divergent ends.

In operation, when a segment 845 is unwound from a bale to form a column and brought into engagement with the drive unit 241, the projection 676 of the retaining member 660 is fed into the channel 448' at bottom end 450' and slid therealong until it exits a top end 452' of the channel 448'. When a column is retracted and a segment 845 is wound onto a bale frame, the interaction between the projection 676 of the retaining member 660 and the channel 448' of the side panel is reversed. That is, the projection 676 is fed into the channel 448' at top end 452' and is slid therealong until it exits the bottom end 450' (c.f. FIGS. 30, 34 and 35). In some embodiments, the bottom and top ends of the channel may be flared to facilitate initial operative engagement between a segment and a side panel. In general, this operative engagement between a chain section segment and a side panel has been found to add rigidity to the tower structure as it is being extended or retracted, and to an erected column as a whole. As depicted in an illustrative embodiment, the channel or slot 448' is formed in an insert 446', which fits into a recess 444' in a side panel 443' (FIG. 48). In some embodiments, the insert may be formed from plastic material, such as an acetal polymer, HVP-13, DELRIN® AF. In other embodiments, materials such as Nylon, polyurethane, polyimide, PPS or PVC may be used. In some embodiments, a channel may be formed by two parallel strips of material. Additionally, each side panel 443' may be provided with side notch 445' that is configured to allow a portion 808 of the drive assembly 770 to extend outwardly beyond the outer surface of the side panel 443' so that it is able to engage a chain section segment 845 (c.f. FIGS. 9*d* and 30).

Figure 50:
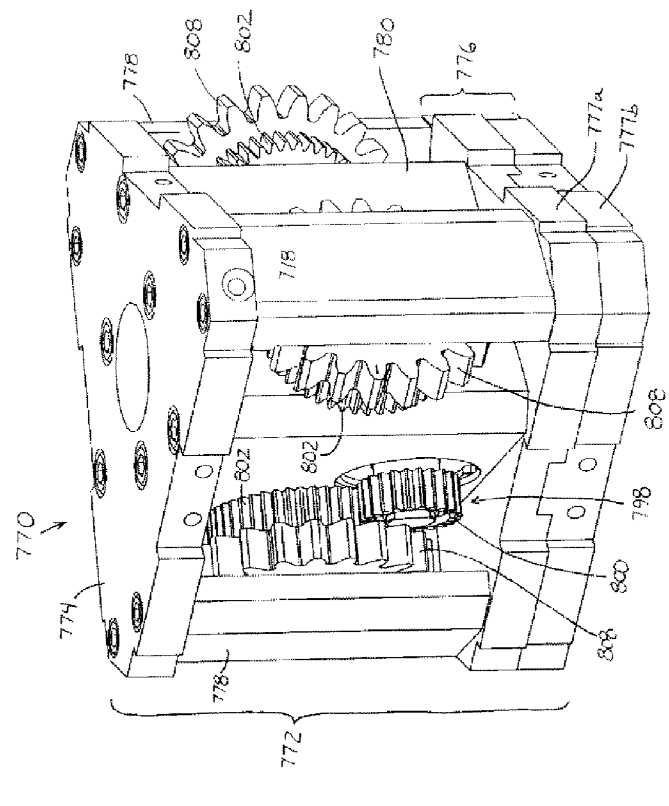
FIG. 50 is a perspective view of the drive assembly of the drive module of FIG. 48.
Figure 53:
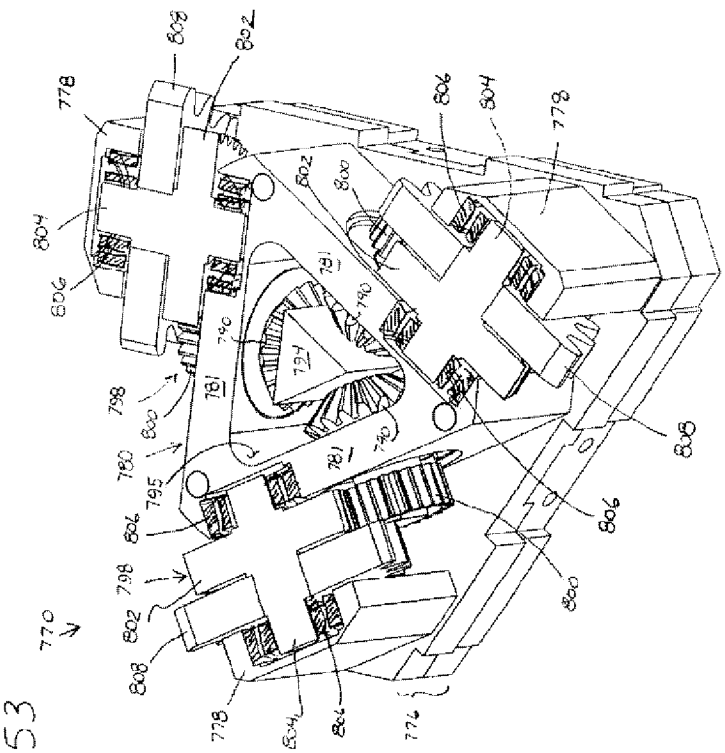
FIG. 53 is a partial, cross-sectional perspective view of the drive assembly of drive assembly of FIG. 50, the view taken from above and to one side.
Figure 52:
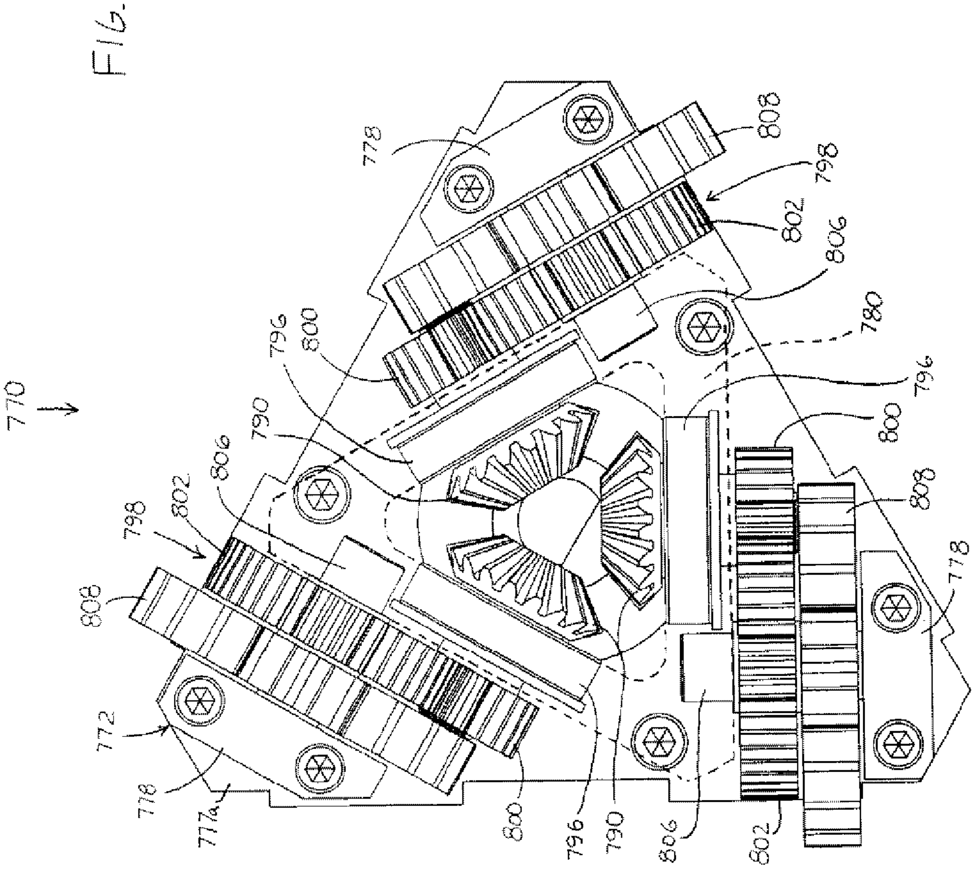
FIG. 52 is a partial, top plan view of some of the internal components of the drive assembly of FIG. 50 and with the inner housing shown in phantom.
Figure 55:
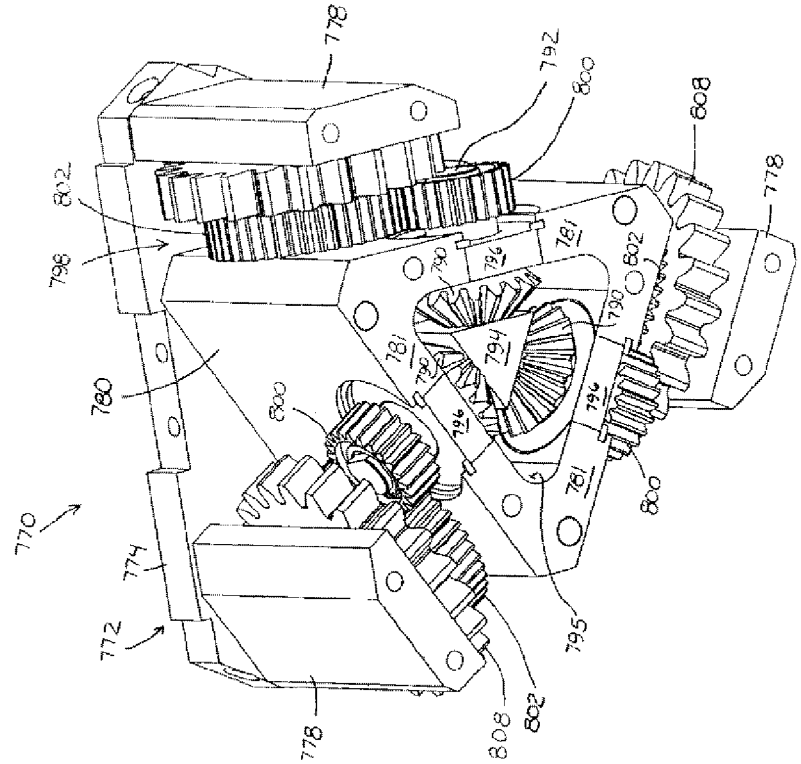
FIG. 55 is a partial, perspective view of the drive assembly of FIG. 50, with the view taken from below and to the side.
Figure 54:
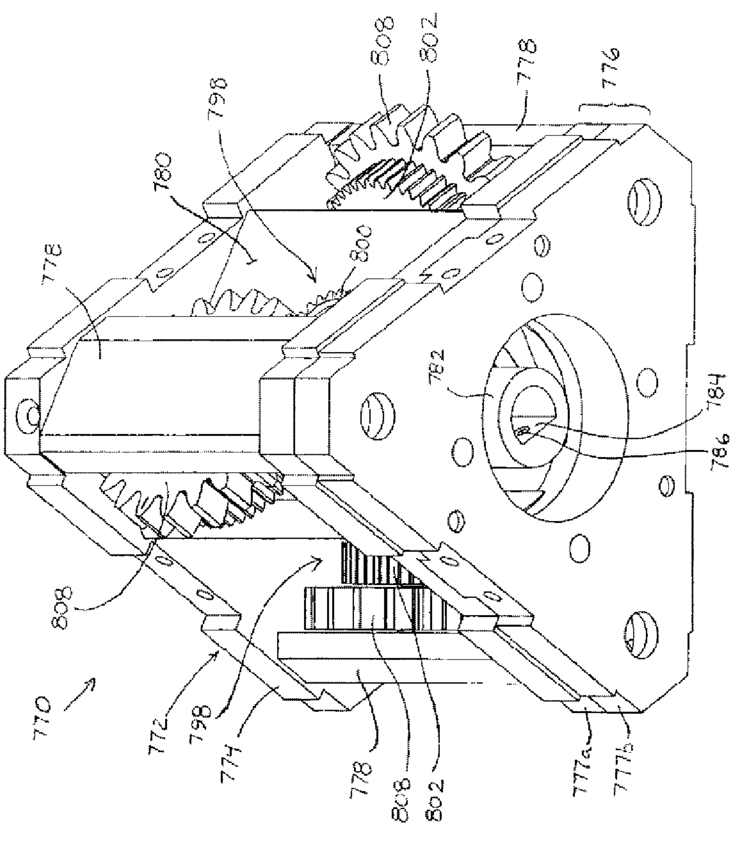
FIG. 54 is a perspective view of the drive assembly of FIG. 50, the view taken from below and to the side.

Turning now to FIGS. 50-55, an embodiment of a drive assembly that may be used in association with a drive module 241 will now be discussed. In this exemplary embodiment the drive assembly may take the form of a self-contained upper gear box 770, which may be connected to the gearbox/motive source 170, 172 located in the drive unit 241 (FIG. 49). In an illustrative embodiment, the upper gear box 770 may include an outer cage 772 that has in interior space that contains an inner housing 780. (FIG. 55) The outer cage 772 may include elements such as an upper plate 774, a base 776 formed by lower plate(s) 777*a* and 777*b*, and a plurality of side walls 778 connecting the upper plate 774 to the base 776 (FIGS. 50 and 54). The inner housing 780 is spaced inwardly from the side walls 778 of the cage 772 and is centrally located within the interior space of the cage 772 (FIG. 55). In an exemplary embodiment, a bevel gear (not shown) is attached to the output shaft of a gearbox/motive source combination 170, 172, for example, by means of a collar 782 that may be keyed to a flat 784 on a D-shaped output shaft and secured with a fastening element 786 such as a set screw (FIG. 54). The bevel gear, which is positioned below the inner housing 780 so that it faces up, is configured to simultaneously engage three bevel gears 790 each of which is attached to a shaft 792 that is rotatably connected to a side wall 781 of the housing 780 and a center support block 794 by inner and outer bearings, bushings or the like 796 (inner bearings of center support block 794 not shown) (FIGS. 53 and 55).

In some embodiments, the center support block 794 depends downwardly from an interior surface of the inner housing 780. In an illustrative embodiment, the bevel gears 790 are protectively positioned within a cavity 795 formed between the inner housing 780 and the center support block 794. In some embodiments, the cavity 795 may be provided with lubricant such as grease, and the cavity 795 itself may be effectively sealed when the bevel gear (not shown) is connected to the bottom of the inner housing 780 (FIG. 54). A portion of each shaft 792 that protrudes through a respective inner housing wall 781 is connected to a first gear 800 of a two gear drive train 798. The second gear 802 of the two gear drive train 798 is attached to a second shaft 804 that is rotatably mounted, via bushings or the like 806, to one of the inner housing side walls 781 and one of the side walls 778 of the cage. A pinion gear 808 is also attached to the second shaft 804 so that it rotates in concert with the second gear 802 (FIG. 53). The pinion gear 808, in turn, engages a chain section segment. Each pinion gear 808 is configured and arranged to engage a column of slots or ribs 890 (see FIGS. 57 and 58) that extend from the top to the bottom of a chain section segment so that as the pinion rotates a segment can be moved in opposite directions and form or disassemble a tower. Each pinion gear 808 is configured to engage only one segment of a chain section, so the need for multiple, parallel, columns of slots is reduced or eliminated. Having only one column of slots or ribs significantly reduces the amount of labor and machining that would otherwise be expended when manufacturing multi-slotted drive engagement columns in a chain section segment. However, the pinion gear drive will be able to work with chain section segments that have multiple columns of slots or ribs. In some embodiments, the gears are formed from the same material as the ribs or slots of the segments that they engage. A preferred material includes metals such as aluminum.

Referring generally to FIGS. 56-58, illustrative embodiments of chain section segments that may be used with a tower assembly are shown. Each of the individual segments 845 may include elements such as a substantially rigid body 846 that includes a first panel 848, a second panel 850, a first side wall, 852, a second side wall, 854, a top end 856 with an upper crossbeam 857, and a bottom end 858 with a lower crossbeam 859. The body 846 may include a center opening 860 and may include a diagonal brace 862. In some embodiments, the panels 848, 850 of the body are spaced apart from each other by one or more webs 864*a*-*f* (see also, for example, FIG. 13*a*). In some embodiments, the webs 864*a*-*f* may be substantially parallel to each other. In some embodiments, the webs 864*a*-*f* may be spaced at intervals between the side walls 852 and 854, and formed by an extrusion or pulltrusion process. In embodiments that are formed by the extrusion process, the center opening 860 may be formed by removal of material, such as by machining.

With reference to FIG. 56, the second panel 850 includes an outer surface and an inner surface. In some embodiments, the outer surface may include spaced-apart raised portions 876 and 878 that are adjacent the side walls 852, 854, respectively, and which extend from the top end 856 to the bottom end 858. The raised portions 876, 878 are configured and arranged so that they are able to be engaged by the slide rails 188 of upper brace members 186 of the outer frame 180 (FIG. 8) as the segments 845 are extended and retracted by a guide assembly. The second panel 550 may also include a recessed portion 880 and transition portions 882, 884 that connect the recessed portion 880 to the raised portions 876, 878. The transition portions 882, 884 are configured and arranged so that if a guide module 740 instead of slide rails 188 is used, the transition portions 882, 884 are able to be engaged by rollers 764 of a guide module 740. When a retaining member 660 is installed on a segment 845 (see, for example, FIGS. 34 and 35), the engagement section 666 will project outwardly with respect to the second panel 850, and inwardly with respect to the center of the bale. In some instances, this may cause the tip of the first end 670 to catch on the lower crossbeam of an adjacent segment when the chain section is being wound or unwound upon the bale frame 220 (FIGS. 15*a*-17*d*). In order to minimize this possibility, a notch or passageway 849 may be provided in the bottom of the lower crossbeam 859, at the first panel 848.

With reference to FIGS. 57 and 58, the first panel 848 includes a plurality of linear drive openings that extend transversely between the side walls 852, 854. In some embodiments, the drive openings are in the form of parallel slots that are arranged in columns that extend from the top end 856 to the bottom end 858. In some embodiments, the slots (which may define ribs therebetween) have lengths that are defined by the side walls and webs. In an illustrative embodiment, the drive openings may include one set of transverse slots 890. In the illustrative embodiment, the lengths of the set of slots 890 are defined, generally, by web 864*b* and web 864*d*. In some embodiments, the slots are formed by machining, with the slots 890 defining ribs (see, for example, FIGS. 11*c*, 11*d*).

Referring now to FIGS. 56-58, the first side wall 852 will now be discussed. An illustrative embodiment of a first side wall 852 includes an upper engagement member 930 that is angled forwardly (or inwardly) relative to the surface of the first panel 850, and which has a peg carrying portion 931 that is located below the top end 856. The peg carrying portion 931 includes an aperture 932 (FIG. 56) and a transversely oriented shoulder 933. The aperture 932 retains a peg 334 that extends above the segment 845 in a vertical direction. In some embodiments, the peg 334 may be formed from plastic material such as acetal, polyacetal or polyformaldehyde (POM), and press-fitted into the member 930. Other embodiments of the peg 334 may include an external thread that can engage an internal thread in the aperture 932. Alternative embodiments of the peg may be formed from other materials such as metal. In some embodiments, the peg 334 may be provided with a collar 335 that abuts the horizontal shoulder 933 of the peg carrying portion 931 when the peg is seated in aperture 932. The first side wall 852 also includes a middle engagement member 936 that is also forwardly (or inwardly) angled and includes a curved vertical surface 937 against which a lower engagement member 944 of a laterally adjacent segment 845 is brought into an abutting engagement as a peg 334 of a vertically adjacent engagement member 930 is translated into and engages a respective slot 946 from below. The first side wall 852 also includes a lower engagement member 938 that is also forwardly (or inwardly) angled and includes a curved vertical surface 939 against which a lower engagement member 944 of a laterally adjacent segment 845 is brought into an abutting engagement as a peg 334 of a vertically adjacent engagement member 930 is translated into and engages a respective slot 946 from below (see, for example, FIGS. 20-26*e*).

Referring again to FIGS. 56-58, the second side wall 854 will now be discussed. The second side wall 854 of each segment includes engagement members that enable laterally and vertically adjacent segments to be coupled together. An embodiment of a second side wall 854 includes a lower engagement member 944 that is forwardly (or inwardly) angled and which has a slot 946 that is located at the bottom thereof (FIG. 58), and which is configured to receive a vertically extending peg 334 that is connected to a segment that becomes part of an adjacent lower course of segments as the segments 845 are coupled together to form a column. Some embodiments of the side wall 854 may include an additional upper engagement member 947 that is also forwardly (or inwardly) angled and includes a curved vertical surface 948 that engages and positions an upper engagement member 930 of a laterally adjacent segment when adjacent segments are formed into a columnar structure.

Figure 59:
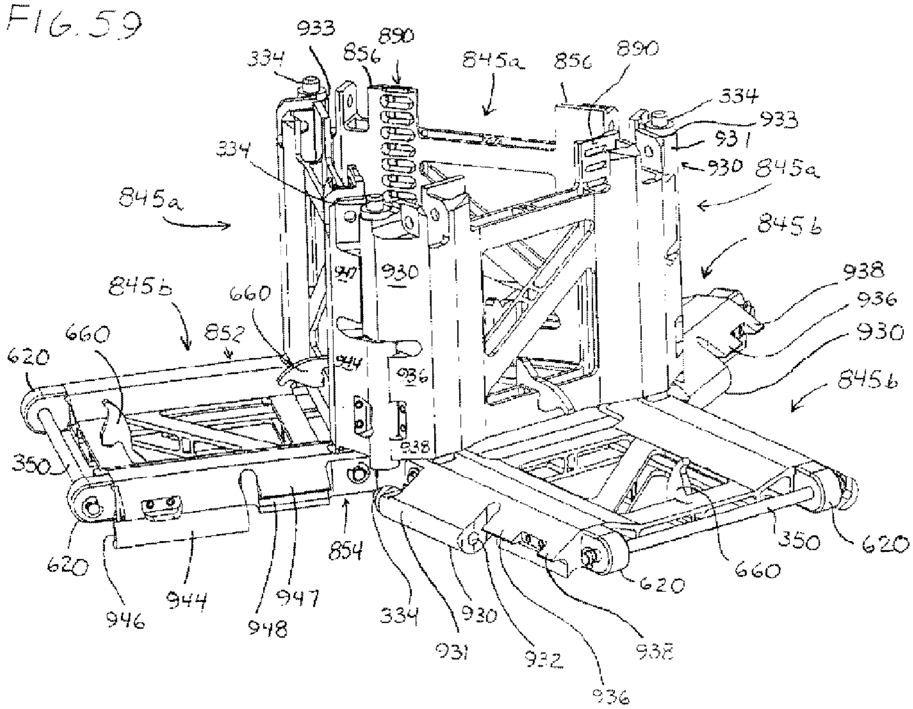
FIG. 59 is a partial, isometric view of three partial chain sections of segments of FIG. 56, with upper segments of the sections interconnected with each other into a tower/column configuration and with lower segments of the sections splayed away from each other.
Figure 60:
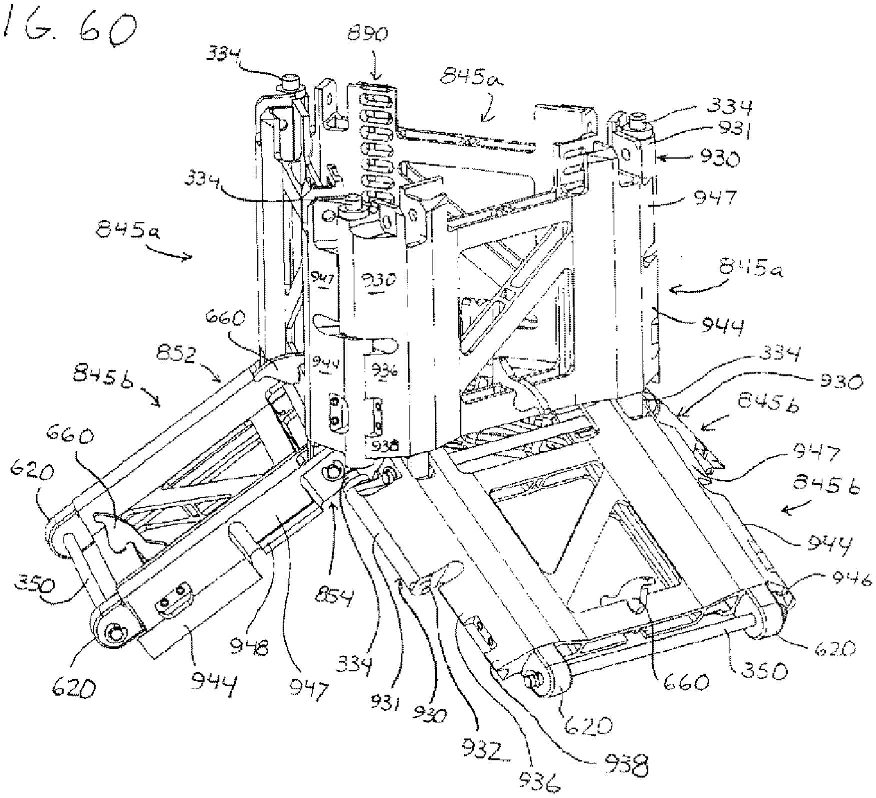
FIG. 60 is a partial, isometric view of the partial chain sections of FIG. 59, wherein the tower has been extended and the lower segments are being positioned for engagement with each other.
Figure 61:
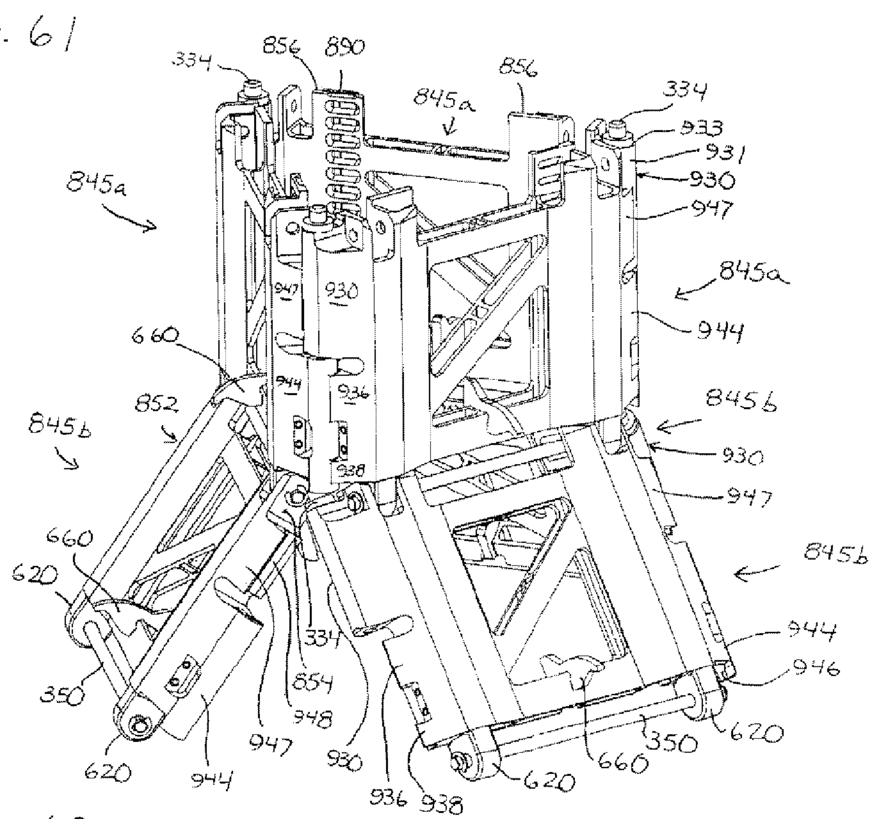
FIG. 61 is a partial, isometric view of the partial chain sections of FIG. 60, wherein the tower has be further extended and the lower segments are beginning to engage upper segments.
Figure 62:
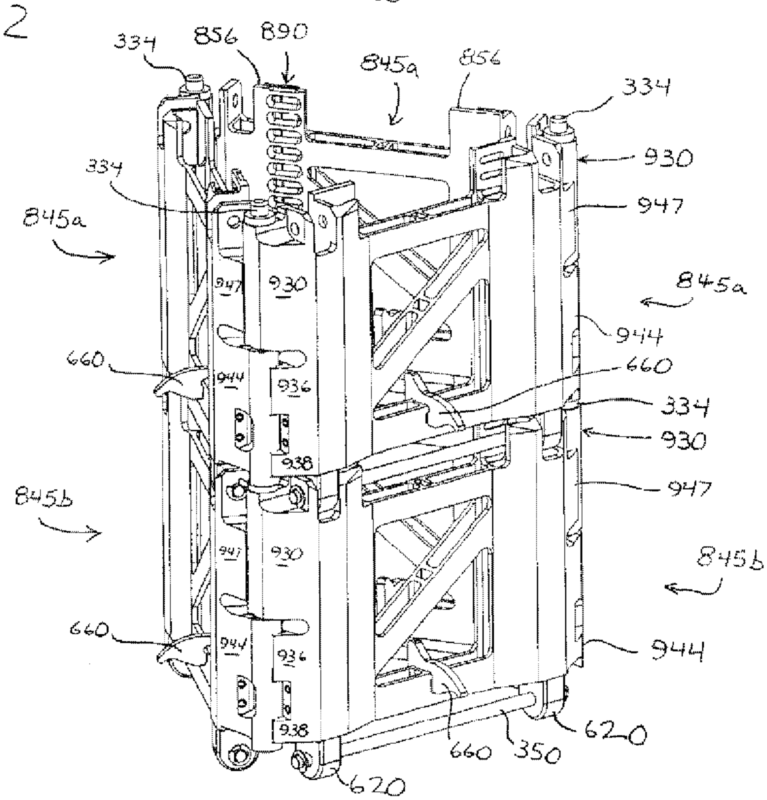
FIG. 62 is a partial, isometric view of the partial chain sections of FIG. 61, wherein the tower has been extended further and the lower segments have engaged each other both vertically and laterally to form a tower that is two courses tall

Referring now to FIGS. 59-62, note that the upper end of the starter course of segments 845*a* may be provided with a cap that can be removably attached thereto (see, for example, cap 302 of FIG. 2*a*). A cap such as cap 302 serves to connect and tie the upper ends of the first course of the segments 845*a* together. However, in FIGS. 59-62 everything but three partial chain sections have been omitted to provide a clearer understanding of the interaction between the segments and chain sections. In FIG. 59 the upper ends of the first course would normally be connected to each other by, for example, a cap, while the lower ends of the first course have yet to be connected to each other. As will be apparent from the figures, the lower ends of the first course of the segments will be tied to each other by interaction with the next, successive course of segments, as shown in FIGS. 60-62. In one mode of operation, the first segment of each bale is initially fed into one of the three portals of the guide assembly and positioned so that it is substantially vertically oriented and so that it can be engaged by the drive module (see, for example, FIGS. 2*a*, 2*b* and 3*a*). In this preferred starting position, the set of first segments 845*a* represent the starter course of a column. As will be noted, these first segments 845*a* will be positioned furthest from the guide assembly when the column is extended (see, for example, FIG. 3*a*). In another mode of operation, a starter course may comprise a preassembled, unitary, rigid frame that is pre-positioned in the tower assembly so that the segments are in engagement with the drive module. With the above modes of operation, the upper end of the starter course may extend above the top of the drive module and may be provided with a cap that can be removably attached thereto (see, for example, cap 302 of FIG. 2*a*). A cap such as cap 302 serves to connect and tie the upper ends of the first course of the segments together. With such embodiments the chain sections will not be able to be fully withdrawn out of the portals of the guide assembly.

Coupling of adjacent segments is as follows. With reference to FIG. 59, the upper ends of segments 845*a* of adjacent chain sections have already been interconnected (as explained above, the cap that would normally bind or tie the upper ends together, has been omitted from the figure). In FIG. 59, the engagement members of the first side wall 852 of segment 845*a* of a first chain section are coupled to the engagement members of the second side wall 854 of segment 845*a* of a laterally adjacent second chain section. Engagement members of the first side wall 852 of segment 845*a* of the second chain section are coupled to the engagement members of the second side wall 854 of segment 845*a* of a third chain section. And, engagement members of the first side wall 852 of segment 845*a* of the third chain section are coupled to the engagement members of the second side wall 854 of segment 845*a* of the first chain section. Thus, forming a column having a height of one course.

As the starter course 845*a* is engaged by a drive module, segments 845*b* (FIG. 60) of the three chain sections are pulled into portals of the guide assembly (not shown). In doing so, the orientation of the segments 845*b* translates from a generally horizontal orientation to a substantially vertical orientation. As can be seen in FIGS. 60-62 when segments 845*b* are translated from horizontal to vertical, the pegs 334 are brought into registry with slots 946 of the lower engagement members 944 of the segments of the preceding course of segments, which in these figures are labeled as segments 845*a*. As the segments continue to be coupled together as shown in FIGS. 61 and 62, the engagement members of the first and second side walls are brought into contact with each other. As mentioned above, when a peg 334 engages the angled slot 946 of a vertically and horizontally adjacent segment, the peg 334 will snug the lower engagement member 944 of segment 845*a* of a chain section up against the vertical or stop surfaces 937 and 939 of middle and lower engagement members 936 and 938 of a segment 845*a* of a laterally adjacent chain section. The resulting interconnection allows vertically adjacent chain sections (or courses) to be effectively pinned together along the longitudinal axes of the pegs 334. This adds to the rigidity of a column and allows it to better resist torsional and bending forces that may be exerted on the column. This interconnection is further strengthened with the provision of an upper engagement member 947 of a second sidewall 854 that engages the upper engagement member 930 of a first side wall 852 as the side walls of all of the chain sections come into registry with each other to form a column.

In the illustrative embodiment, segments 845 may be connected to each other by one or more pivot support blocks, where one end of a block may be insertable into a longitudinally aligned aperture 865 located at the bottom end of each segment 845. The support block(s) need only be connected at one end of each segment 845. The other end of each segment may include connecting arms 866 that are formed by extending the side walls 852, 854 and webs 864*a*, 864*b*, respectively. In some embodiments, the arms 866 receive a first end of the pivot support block 620 therebetween. The arms 866 include transverse apertures 868 that are configured and arranged to be aligned with the transverse aperture of the first end of the support block 620, so that a pivot rod 350 may be inserted therethrough and adjacent segments may be pivotally connected together.

Figure 63:
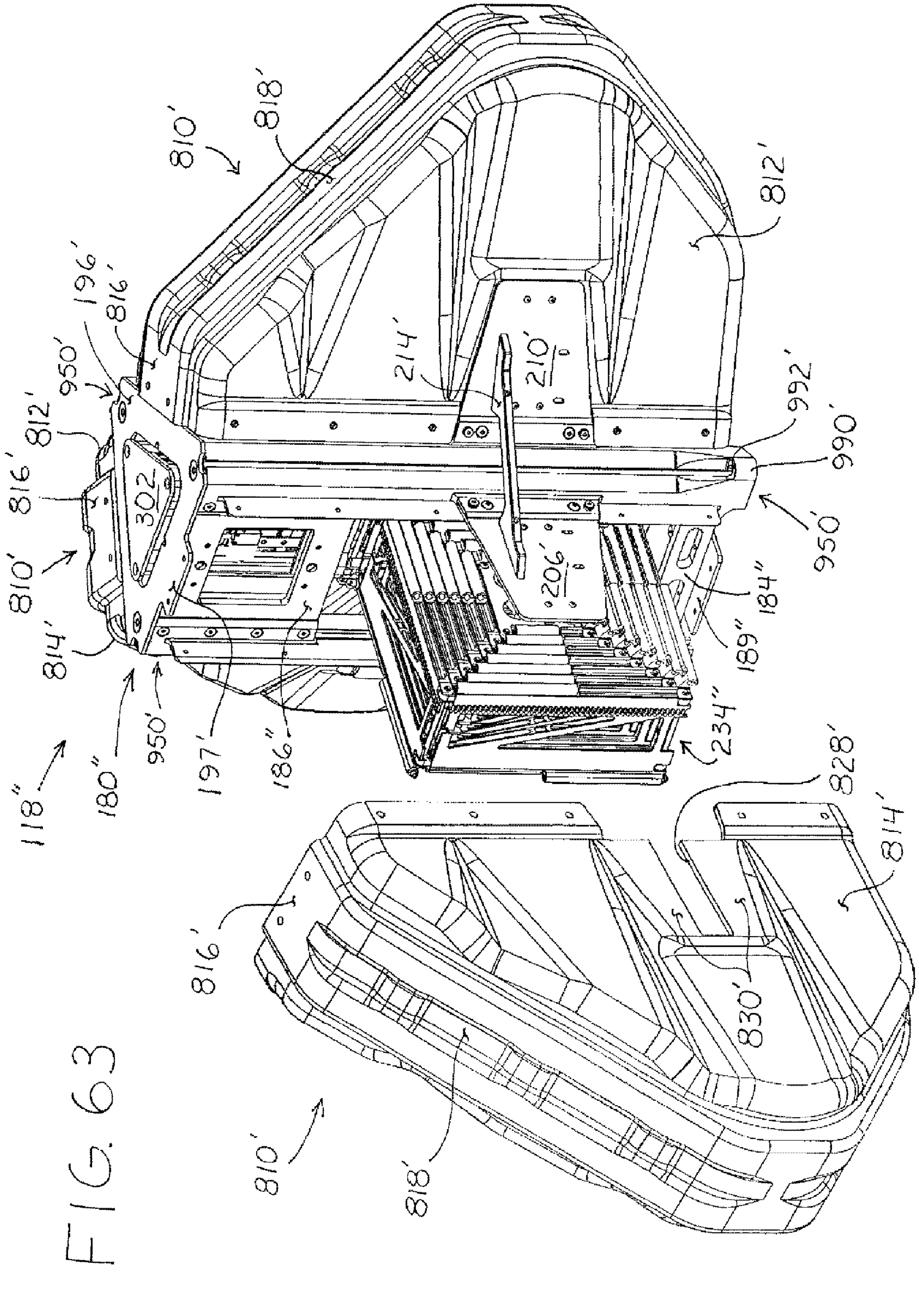
FIG. 63 is a perspective view of an alternate embodiment of a tower assembly that may include one or more protective cowls, with one of the cowls detached from the tower assembly to reveal a bale and other mechanical components of the tower assembly.
Figure 64:
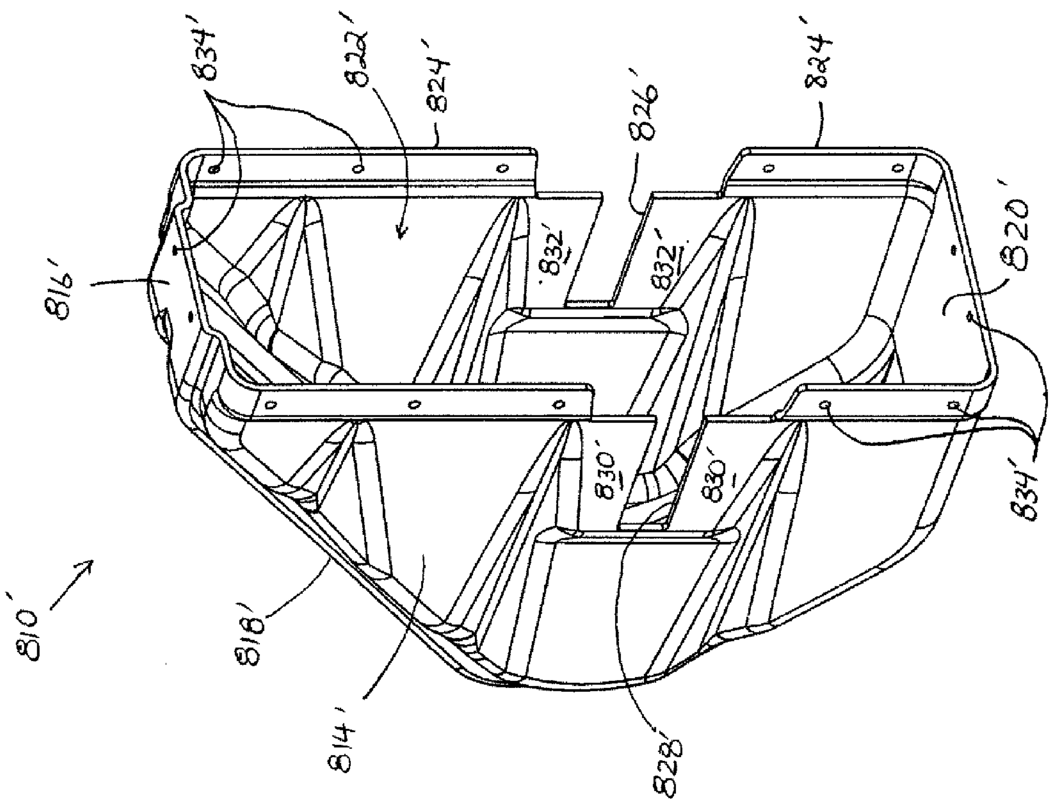
FIG. 64 is a perspective view of the interior of one of the cowls of FIG. 63; and, FIG. 65 is a perspective view of an outer frame that may be used with the embodiment of FIG. 63.

An illustrative embodiment of a tower assembly 118" is depicted in FIG. 63. In this embodiment, the tower assembly 118" may include elements such as one or more protective cowls or shrouds 810'. Each cowl or shroud 810' includes a protective shell that substantially encloses a chain section 234" and its associated bale assembly and provides a safety barrier between the chain section and nearby personnel. In addition, the cowl protects the internal components from externalities such as inclement weather, sand and dirt contamination, foreign objects, animals, insects, etc. In exemplary embodiments, a single cowl covers and protects a single bale assembly. However, if there is more than one bale assembly, each bale assembly may be provided with its own cowl, if desired. In an illustrative embodiment (FIGS. 63 and 64), a cowl 810' may include a first side wall 812', a second opposing side wall 814', a top portion 816' an edge portion 818' and a bottom portion 820', with the top, edge and bottom portions, and the first and second side walls forming an enclosure with an internal cavity 822' having an opening 824' into which the bale is received. The cavity 822' is configured and arranged so as to be able to protectively cover a bale frame and a chain section of tower assembly 118" as a tower is extended and retracted. To that end, each side wall of the cowl may be provided with a slot 826', 828', which accommodates a guide rail 216, 218 that is attached to an inner surface of a wing or winglet 206', 210'. In some embodiments, each side wall 812', 814' may also be provided with a recess 830', 832' that is sized to receive a wing 206', 210' in a nesting relation. With such an embodiment, the inner surfaces of the wings 206', 210' are in a confronting relation with portions of the external surfaces of the first and second side walls 812', 814'. If desired, the wings 206' and 210' may be secured to the cowl 810 by one or more fastening elements. The cowl or shroud 810' may include one or more apertures 834' located adjacent the opening 824 (FIG. 64). The apertures 834' are positioned to come into registry with threaded apertures in an outer guide frame 180" (to be discussed hereafter) when the cowl is positioned about a bale frame and chain section, prior to connecting the cowl to the tower assembly 118'. In an exemplary embodiment edges of the opening 824' are sized so that they are able to confront two vertical frame posts 950 and upper and lower transverse brace members 184" and 186" (see FIGS. 63 and 65). In an illustrative embodiment, a cowling 810' may be attached to upper ribs 996' and 997', lower ribs 998' and 999' of adjacent frame posts 950' (see FIG. 65), an extension 197' of a top plate 196', and a bottom flange 189" that is connected to lower transverse brace member 184". As will be understood, the cowl may be removably attached to the tower assembly by fastening elements such as threaded screws.

Figure 65:
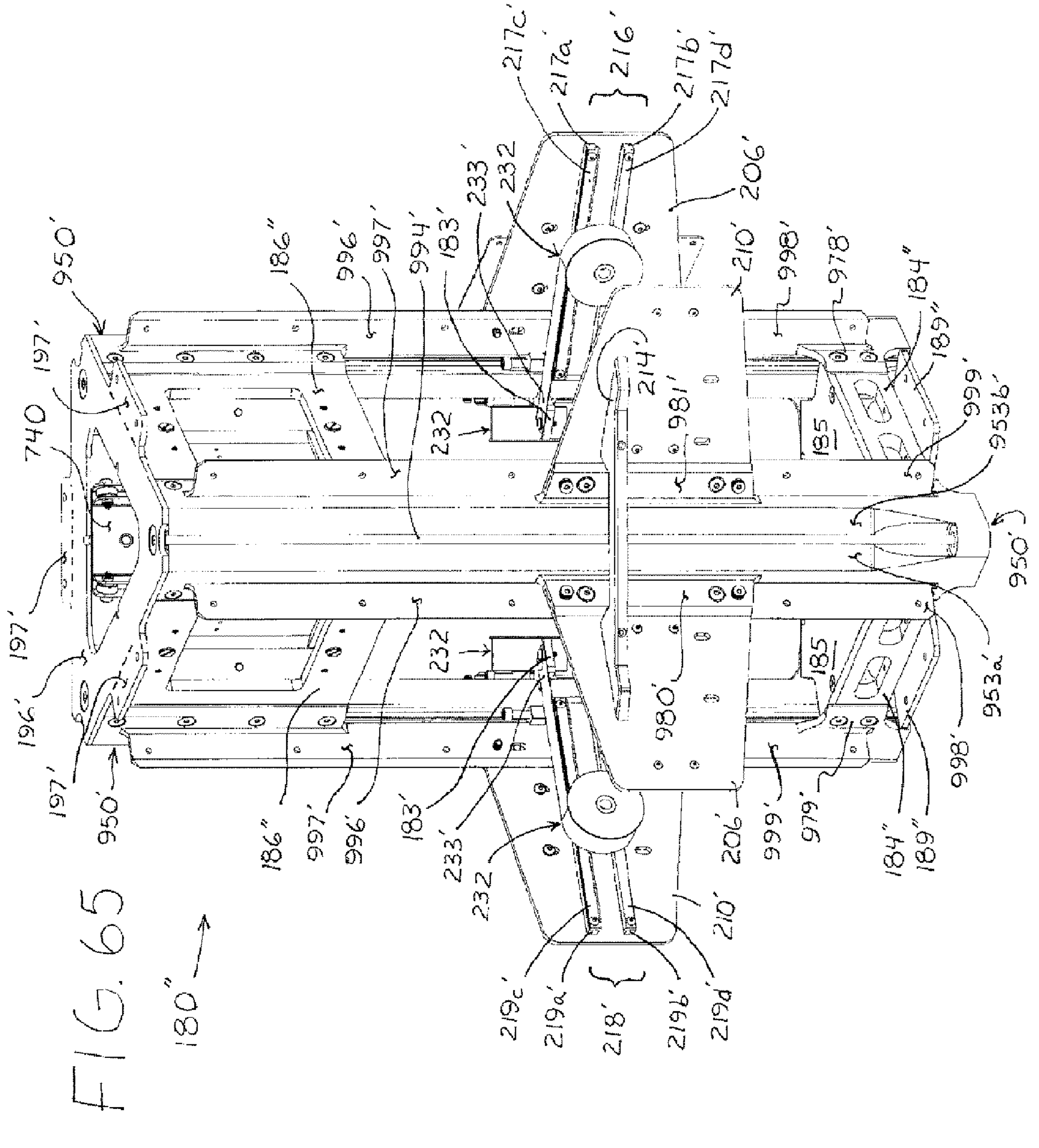

An outer frame 180" that may be used in conjunction with the tower assembly 118" is shown in FIGS. 63 and 65. The outer frame 180" (also called a reaction ring) may include a plurality of vertical support posts 950', with each support post 950' having an inner facing surface (see, for example, 951 of FIGS. 43-44), an outer facing surface formed by members 953*a*' and 953*b*' (FIG. 65), an upper end and a lower end (see, for example 952 and 954 of FIGS. 43, 44). The upper end includes at least one first portion to which a transverse upper brace member 186" may be connected. The first portion of the upper end is in the form of a flange that includes at least one transverse aperture that receives a fastening element that is used to connect the first portion of the post 950' to the upper brace member 186". As with the previously described embodiment shown in FIGS. 43 and 44, the first portion is in the form of a pair of flanges (see 956, 958 of FIG. 43) that form a slot that is able to receive the portion of the upper brace member 186" therein, with the first portion and the upper brace member secured to each other by one or more fastening elements that are received in apertures (see, for example, 963 of FIGS. 43 and 44). The upper end may be provided with a second portion to which a second transverse upper brace member 186" may be connected. In some embodiments, the second portion may be in the form of a flange that includes at least one transverse aperture that receives a fastening element that is used to connect the second portion of the post to a second brace member 186". In an illustrative embodiment, the second portion is in the form of a pair of flanges (see 957, 959 of FIGS. 43, 44), that form a slot that is able to receive a portion of the second upper brace member 186" therein, with the second portion and the second upper brace member secured to each other by one or more fastening elements that are received in apertures (see, for example 961, 963 of FIGS. 43, 44).

Similarly, the lower end of frame post 950' includes a third portion and a fourth portion to which third and fourth transverse lower brace members may be connected (see, for example, 954, 971*a* and 971*b* of FIG. 43). In an illustrative embodiment, the third portion is in the form of a pair of flanges (see, 972, 974 of FIG. 43) that form a slot that is able to receive the portion of the lower brace member 184" therein, with the portion and the lower brace member secured to each other by one or more fastening elements that are received in apertures (see, for example, 978 of FIGS. 43 and 44). In an illustrative embodiment, the fourth portion is in the form of a pair of flanges (see, for example 973, 975 of FIG. 43), that form a slot that is able to receive a portion of the second lower brace member 184" therein, with the second portion and the second lower brace member secured to each other by one or more fastening elements that are received in apertures (see, for example, 979 of FIG. 43). In an illustrative embodiment a platform 185 (FIG. 42) may be supported by one or more lower brace members 184". The lower brace member may also provide support for a flange 189" that is attached thereto (FIGS. 63 and 65) and which can serve as an attachment point for a cowl 810'.

Figure 44:
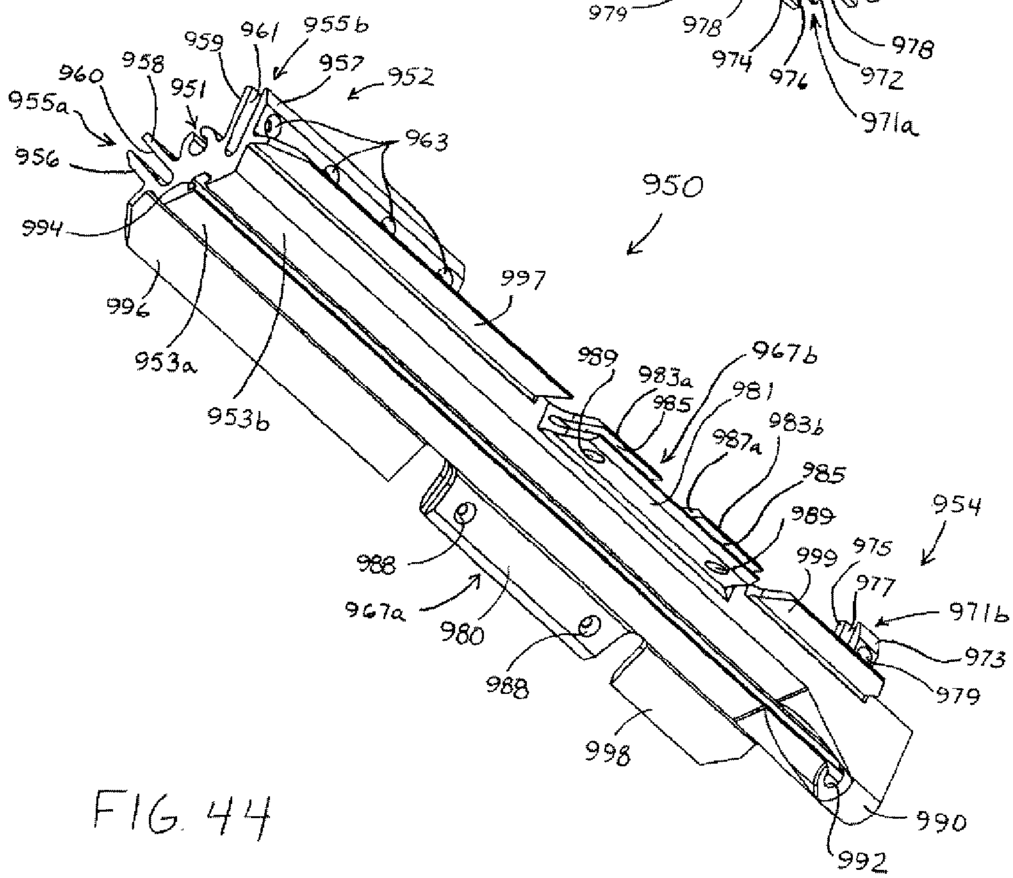
FIG. 44 is another perspective view of the outer frame post of FIG. 43.

The frame post 950' of FIGS. 63 and 65 may include a fifth portion and a sixth portion, located between the first and second ends, with the fifth and sixth portions configured and arranged to be connected to freestanding wings or winglets 206', 210' that form parts of two bale support assemblies (see, for example, 967*a*, 967*b*, of FIGS. 43, 44). The wings or winglets 206' and 210' are secured to a frame post 950' by one or more fastening elements such as threaded screws (FIGS. 63, 65). As with other embodiments, the wings or winglets 206' and 210' may be stabilized by a transverse gusset 214' that is removably connected to the wings by one or more fastening elements. The fifth portion may comprise a single flange or it may comprise a pair of flanges (see, for example, 980, 982*a* and 982*b* of FIG. 43) that define two slots that are able to receive the portions of a wing 206' (984 of FIG. 43). Note that the wing 206' includes an embodiment of a guide rail 216' that includes separate parallel rails 217*a*', 217*b*' that each includes an overlying retainer strip 217*c*', 217*d*'. The parallel rails, retainer strips, and a portion of the wing form channels that are configured to receive the feet 231 of a follower 230 (discussed above and at FIGS. 3*d* and 3*e*) that carries a biasing element 232. In an illustrative embodiment, an end 233' of biasing element 232 is attached to tab 183', which is located adjacent an upper rail of guide rail 216'. In order to achieve a strong connection between a wing and a frame post, a relief notch is provided between adjacent flanges (see, for example, 982*a* and 982*b* of FIG. 43). The relief notch receives a portion of a guide rail that is attached to a wing. Further, the frame post 950' itself may be provided with its own relief notch that can receive an end of the guide rail, thus further strengthening the tower assembly construction (see, for example, 986*b* of FIG. 42). In use, a wing 206' is inserted into the slots and secured to the flanges by fastening elements that are received in one or more apertures. Similarly, the sixth portion comprises flanges (see, for example, 981, 983*a* and 983*b* of FIG. 44) that define two slots that are able to receive portions of a second wing 210'. Note that the second wing includes an embodiment of a guide rail 218' that includes separate parallel rails 219*a'*, 219*b'* that each includes an overlying retainer strip 219*c'*, 219*d'*. The parallel rails, retainer strips and a portion of the wing form channels that are configured to receive the feet 231 of a follower 230 (discussed above and at FIGS. 3*d* and 3*e*) that carries a biasing element 232. In an illustrative embodiment, an end 233' of biasing element 232 is attached to tab 183', which is located adjacent an upper rail of guide rail 218'. In order to achieve a strong connection between a second wing and a frame post, a relief notch is provided between adjacent flanges (see, for example, 983*a* and 983*b* of FIG. 44). The relief notch receives a portion of a guide rail that is attached to the second wing. Further, the frame post 950' itself may be provided with its own relief notch that can receive an end of a guide rail, thus further strengthening the tower assembly construction (see, for example 987*b* of FIG. 42). In use, the second wing 210' is inserted into the slots (see, for example 985 of FIG. 44) and secured to the flanges by fastening elements that are received in one or more apertures.

The second or lower end of the post 950' may include an enlarged bottom that forms a foot 990' (FIG. 63). The foot may include an aperture 992' so that the post 950' may be connected to a support by way of a fastening element such as a threaded fastener. As will be understood, the support to which a post may be attached can be a base such as the base 120 of previous embodiments. Alternatively, the support may be an immovable object such as a building or a movable object such as a vehicle. Other supports may be used without departing from the spirit and scope of the invention. In some embodiments, a frame post 950 may include an outwardly opening channel 994' (FIG. 65) that extends along the longitudinal length of the post and which is bordered by outwardly facing surfaces such as surfaces 953*a* and 953*b* of FIGS. 43 and 44. The channel 994' can be used as an attachment point for accessories or other ancillary equipment. In some embodiments, the channel may have a T-shaped cross-section. In some embodiments, the channel may be used to store a portion of an outrigger. In an illustrative embodiment, a post 950' may include a plurality of outwardly extending ribs 996' and 998', 997' and 999' that may serve as attachment points for one or more protective cowls.

Although the descriptions of the exemplary embodiments have been quite specific, it is contemplated that various modifications could be made without deviating from the spirit and scope of the invention. Accordingly, the scope of the invention is intended to be limited by the appended claims rather than by the description of the illustrative embodiments.

The following is claimed:

1. A tower assembly comprising:

a base;

a guide assembly connected to the base, the guide assembly comprising a drive module and an outer frame, with the drive module having a drive member that is operatively connected to a gearbox the is operatively connected to a motor, with the outer frame comprising:

a plurality of parallel support posts;

a plurality of transversely oriented lower brace members connected adjacent to first ends of the support posts;

a plurality of transversely oriented upper brace members connected adjacent to second ends of the support posts, with the upper brace member substantially parallel to the lower brace members, and with the support posts, the lower brace members and the upper brace members forming a substantially triangularly shaped structure;

with the outer frame configured and arranged to substantially encircle the drive module;

a plurality of bale support brackets connected to the outer frame of the guide assembly, with at least one of the plurality of the bale support brackets removably connected to one of the parallel support posts; and a plurality of chain sections of linked segments, with at least one of the plurality of chain sections able to be engaged by the drive member of the drive module so as to be able to form an extensible and retractable column, and with at least one of the plurality of chain sections able to be configured into a compacted form of a bale that can be retained by one of the bale support brackets.

2. The tower assembly of claim 1, wherein each of said linked segments comprises a body having a first panel, a second panel, a first side wall, a second side wall, a top end and a bottom end, with the first and second panels oriented next to each other in a substantially parallel relation and with the first and second panels connected to each other by a plurality of webs.

3. The tower assembly of claim 2, wherein the first panel of each of said linked segments includes a first set of vertically aligned, transversely oriented slots.

4. The tower assembly of claim 3, each of said linked segments further comprising a second set of vertically aligned, transversely oriented slots.

5. The tower assembly of claim 2, wherein the first side wall includes an upper engagement member that supports a peg such that the peg is positioned substantially parallel to the first side wall, above the upper end, laterally outward from the first side wall, and substantially within a plane defined by the outer surface of the first panel.

6. The tower assembly of claim 1, further comprising a cowl, with the cowl configured and arranged to be positioned over the bale and an associated bale support bracket.

7. The tower assembly of claim 6, wherein the outer frame comprises a plurality of vertically oriented support posts, and wherein the cowl is connectable to at least one of the vertically oriented support posts.

8. The tower assembly of claim 7, wherein the cowl comprises a plurality of walls, and wherein the plurality of walls include spaced apart side walls, that are connected to each other by a top portion, an edge portion and a bottom portion.

9. The tower assembly of claim 1, wherein the drive member comprises a transversely oriented pinion gear, and wherein the pinion gear is configured and arranged to engage vertically aligned, transversely oriented slots in at least one of the plurality of chain sections.

10. The tower assembly of claim 1, wherein the guide assembly includes a vertically oriented channel that operatively engages a section of a chain section as the chain section moves vertically with respect to the guide assembly.

11. The tower assembly of claim 10, wherein the vertically oriented channel of the guide assembly opens outwardly relative thereto.

12. The tower assembly of claim 1, wherein said one of the plurality of the bale support brackets includes a pair of wings that extend outwardly from the tower assembly.

13. The tower assembly of claim 12, wherein at least one wing of the pair of wings includes an inner surface, and each inner surface with a guide rail attached thereto.

14. The tower assembly of claim 1, further including a bale frame for use in forming a bale, the bale frame comprising:

a first plate, a second plate; and a plurality of rods that connect the first plate to the second plate in a parallel relation, with each of the first and second plates having a centrally located transverse aperture that receives a central shaft, with each of the first and second plates including a tab with a transverse aperture, wherein the tab is configured and arranged to receive a pivot shaft that is used to connect the frame to a segment suitable for use in forming a column of a tower.

15. The tower assembly of claim 14, wherein the bale frame further comprises a center shaft, wherein the center shaft includes opposing ends, and wherein each end of said opposing ends is configured and arranged to slide within a guide rail of a bale support bracket.

16. The tower assembly of claim 1, wherein the base Comprises:

a top surface, a skirt extending downwardly from the top surface;

a plurality of radially extending feet, with at least one of said plurality of radially extending feet including a flange with an aperture, and with the aperture configured to receive a fastening element, wherein the base may be secured to another object.

17. A tower assembly comprising:

a base;

a guide assembly connected to the base, the guide assembly comprising a drive module and an outer frame, with the drive module having a drive member that is operatively connected to a gearbox that, is operatively connected to a motor, and with the outer frame configured and arranged to substantially encircle the drive module;

a plurality of bale support brackets connected to the outer frame of the guide assembly;

a bale frame operatively connected to two of the plurality of bale support brackets, the bale frame comprising a first plate, a second plate; and a plurality of rods that connect the first plate to the second plate in a parallel relation, with each of the first and second plates having a centrally located transverse aperture that receives a central shaft, with each of the first and second plates including a tab with a transverse aperture, wherein the tab is configured and arranged to receive a pivot shaft that is used to connect the bale frame to a segment of a chain section that is suitable for use in forming a column of the tower assembly; and a plurality of chain sections of linked segments, with at least one of the plurality of chain sections able to be engaged by the drive member of the drive module so as to be able to form an extensible and retractable column, and with at least one of the plurality of chain sections able to be configured into a compacted form about the bale frame.

18. The tower assembly of claim 17, wherein the bale frame further comprises a center shaft, wherein the center shaft includes opposing ends, and wherein each end of said opposing ends is configured and arranged to slide within a guide rail of a bale support bracket.

19. The tower assembly of claim 17, wherein the bale support brackets extend in an outward direction relative to the guide assembly.

20. A tower assembly comprising:

a base;

a guide assembly connected to the base, the guide assembly comprising a drive module and an outer frame, with the drive module having a drive member comprising a transversely oriented pinion gear, with the transversely oriented pinion gear operatively connected to a gearbox that is operatively connected to a motor, and with the outer frame configured and arranged to substantially encircle the drive module;

a plurality of bale support brackets connected to the outer frame of the guide assembly; and a plurality of chain sections of linked segments, with at least one of the plurality of chain sections including vertically aligned, transversely oriented slots that are configured and arranged to be engaged by the transversely oriented pinion gear so as to be able to form an extensible and retractable column, and with at least one of the plurality of chain sections able to be configured into a compacted form of a bale that can be retained by one of the bale support brackets.

* * * * *